US006556282B2

United States Patent
Jamieson et al.

(10) Patent No.: US 6,556,282 B2
(45) Date of Patent: Apr. 29, 2003

(54) COMBINED LOAS AND LIDAR SYSTEM

(75) Inventors: James R. Jamieson, Savage, MN (US); Mark D. Ray, Burnsville, MN (US); Clinton T. Meneely, Eagen, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

(21) Appl. No.: 09/946,057

(22) Filed: Sep. 4, 2001

(65) Prior Publication Data

US 2003/0043363 A1 Mar. 6, 2003

(51) Int. Cl.⁷ .............................. G01C 3/08; G01P 3/36; G01B 11/26; G02B 27/14
(52) U.S. Cl. .................. 356/4.01; 356/28.5; 356/141.1; 356/5.01; 359/629
(58) Field of Search ................................ 359/629–640; 356/3.01–152.3, 28.5

(56) References Cited

PUBLICATIONS

Article "Oasys Is High–Tech Obstacle Avoidance", HAI Convention News—www.aiononline.com (no date).
Article "Radar for Rotorcraft Defects Obstacles" Aerospace America, Nov. 2000.
Brochure "HELLAS—Obstacle Warning System for Helicopters", published by Dornier GmbH (No date).
Article "Dornier Delivers Modern Helicopter Obstacle Warning Systems", published by Defense and Civil Business Unit of Dornier GmbH, Jan. 26, 1999.

Primary Examiner—Stephen C. Buczinski
(74) Attorney, Agent, or Firm—James M. Rashid; Calfee, Halter & Griswold LLP

(57) ABSTRACT

A combined system of a LOAS and a LIDAR system comprises: a LIDAR arrangement of optical elements for generating a first coherent beam of light at a first predetermined wavelength; a LOAS arrangement of optical elements for generating a second coherent beam of light at a second predetermined wavelength; a dichroic filter optical element for directing the first and second coherent beams of light substantially on a first common optical path towards an aperture of a beam expander; at least one output optical element which directs both of the expanded first and second coherent beams of light from the system, the at least one output optical element also for receiving and directing reflections of the first and second coherent beams of light to the beam expander wherein the beam reflections are collected; and wherein the dichroic filter optical element separates and directs the collected light corresponding to the first coherent beam back to the LIDAR arrangement of optical elements for use in determining flow velocity, and separates and directs the collected light corresponding to the second coherent beam back to the LOAS arrangement of optical elements for use in detecting at least one object.

64 Claims, 32 Drawing Sheets

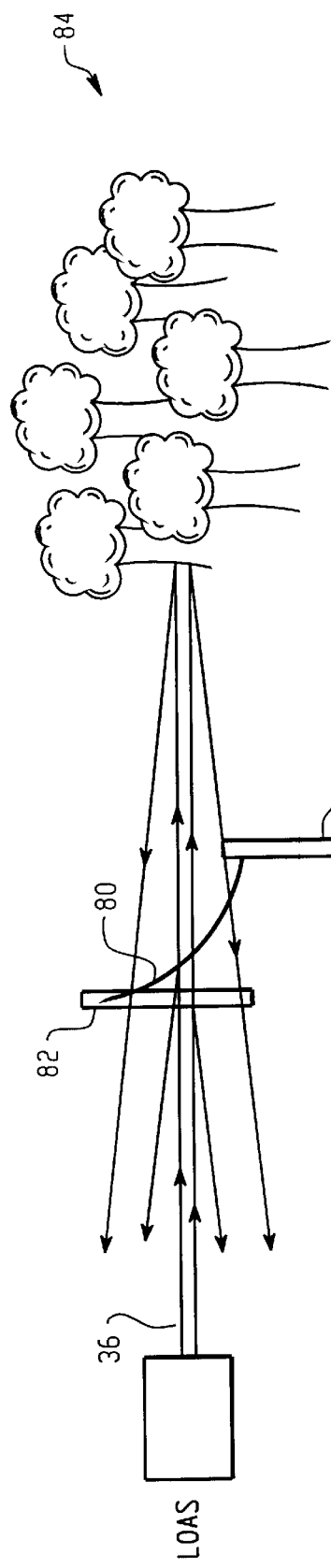
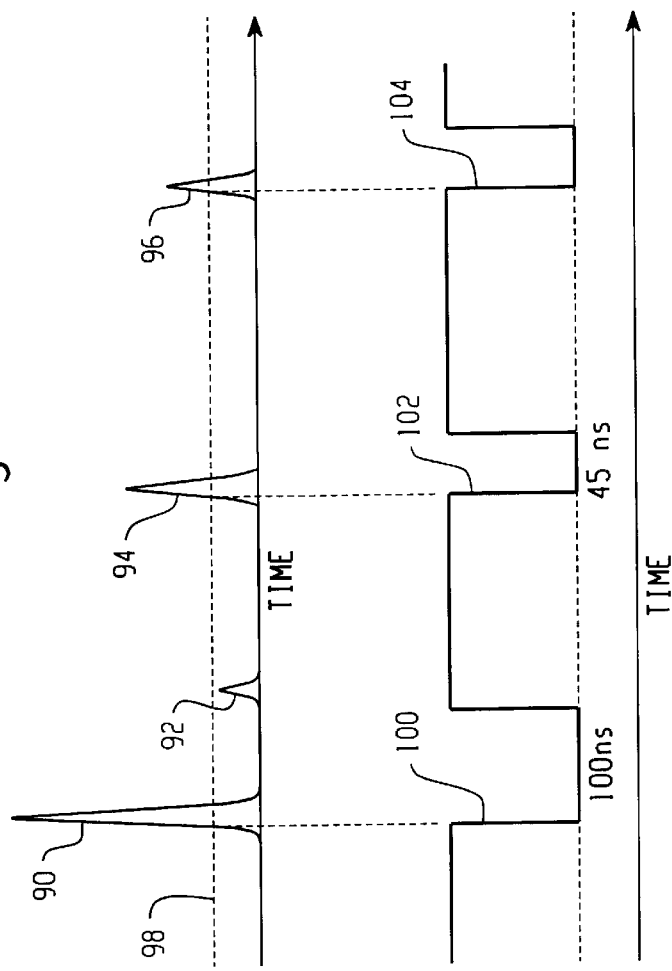
Fig. 4
Fig. 5A
Fig. 5B

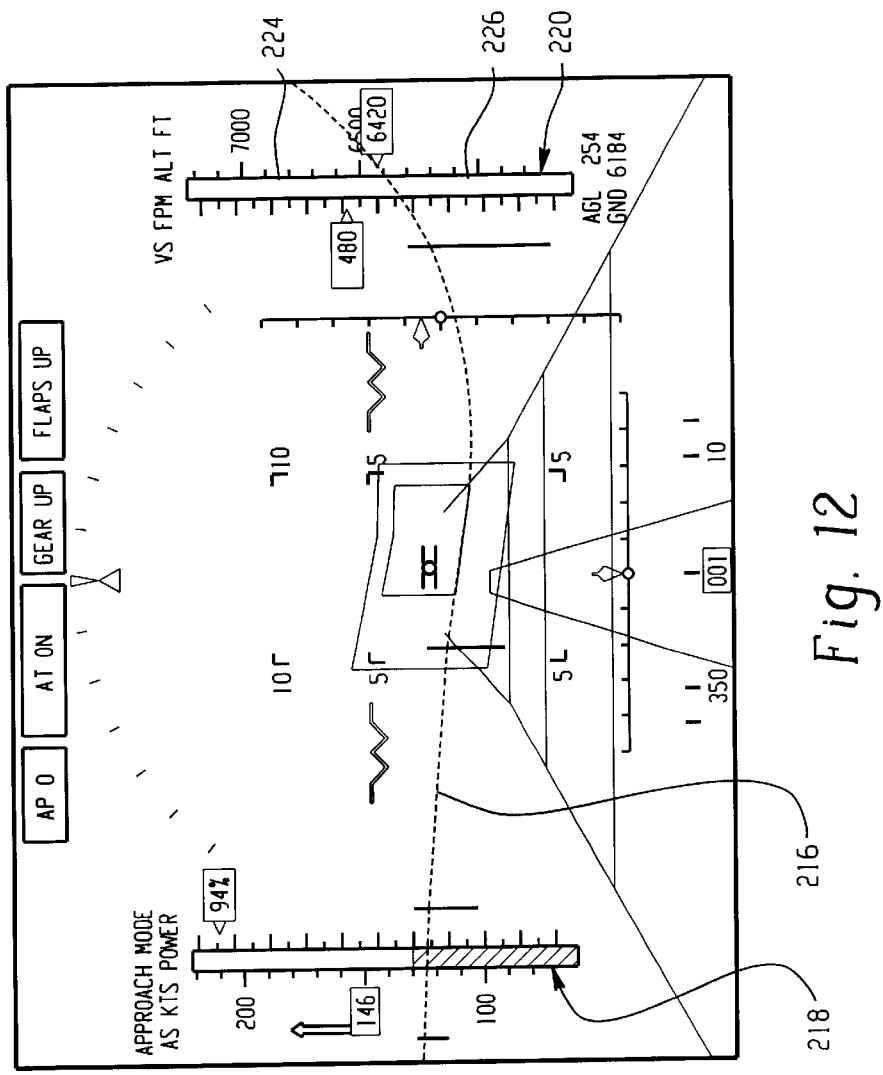
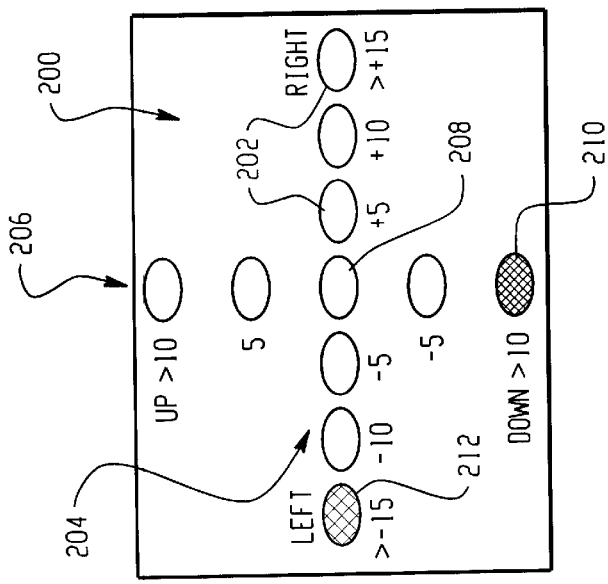
Fig. 12
Fig. 11

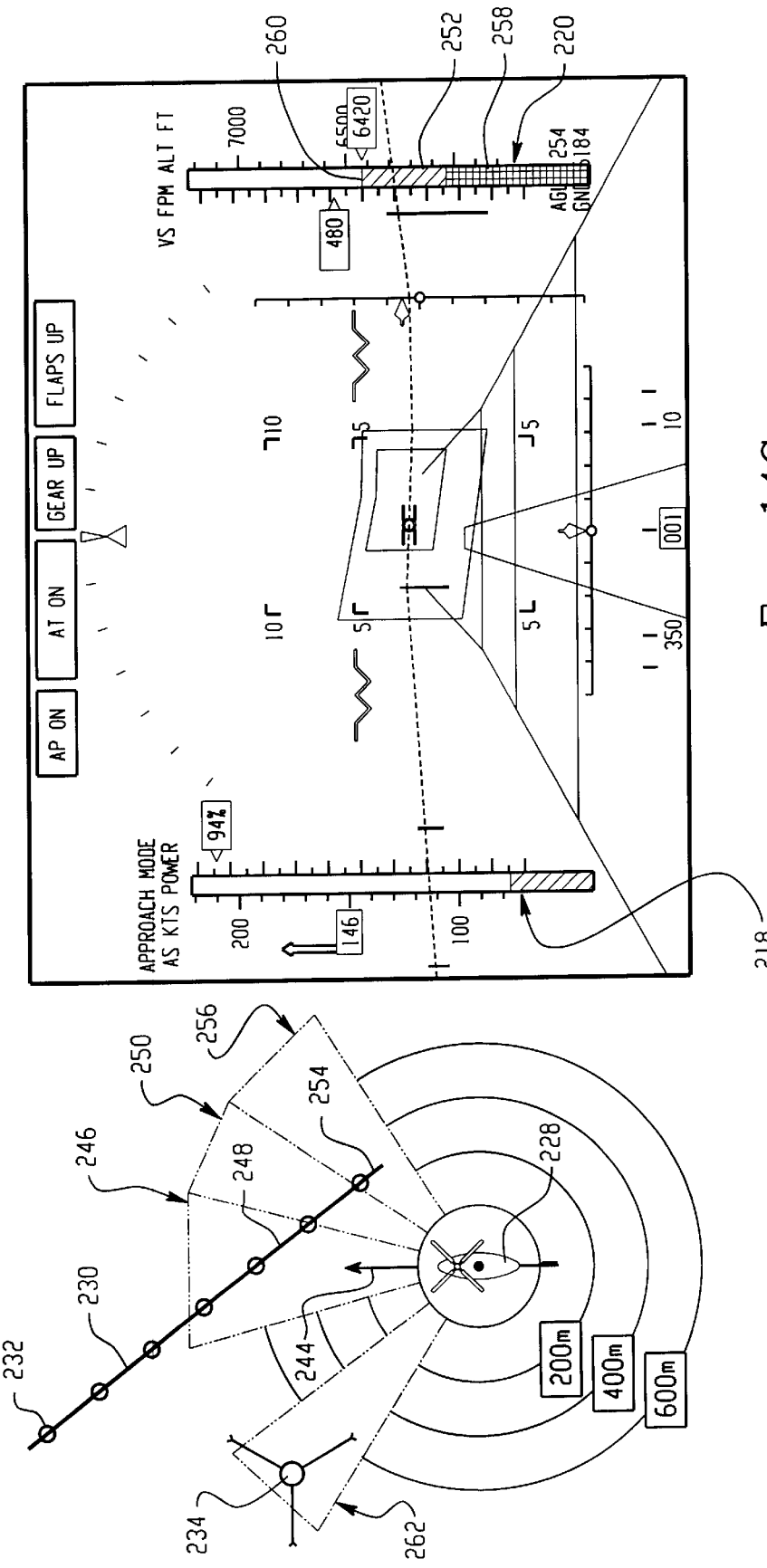

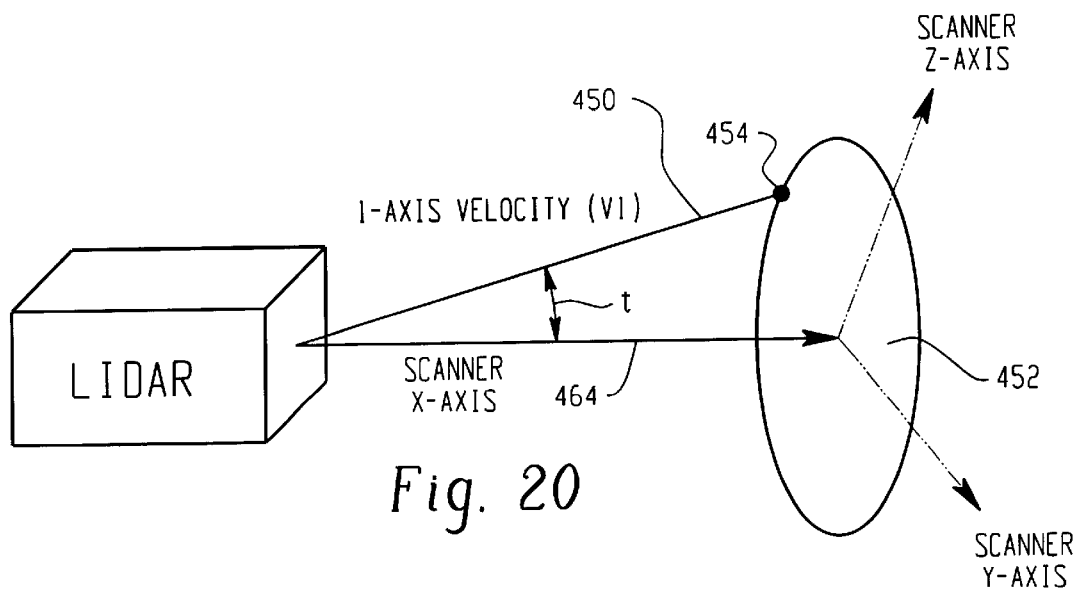
*Fig. 20*
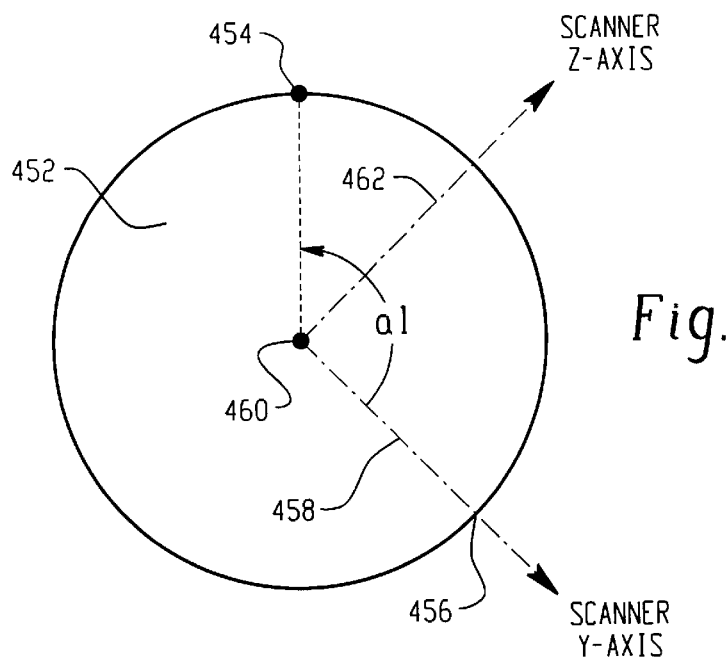
*Fig. 20A*
$$\begin{bmatrix} \sin(t)\cos(a1) & \sin(t)\sin(a1) & \cos(t) \\ \sin(t)\cos(a2) & \sin(t)\sin(a2) & \cos(t) \\ \sin(t)\cos(a3) & \sin(t)\sin(a3) & \cos(t) \end{bmatrix} \times \begin{bmatrix} Vsx \\ Vsy \\ Vsz \end{bmatrix} = \begin{bmatrix} V1 \\ V2 \\ V3 \end{bmatrix}$$
*Fig. 20B*

$$\begin{bmatrix} Vax \\ Vay \\ Vaz \end{bmatrix} = \begin{bmatrix} a11 & a21 & a31 \\ a12 & a22 & a32 \\ a13 & a23 & a33 \end{bmatrix} \begin{bmatrix} Vsx \\ Vsy \\ Vsz \end{bmatrix}$$

COMBINED LOAS AND LIDAR SYSTEM

CROSS REFERENCE TO RELATED APPLICATIONS

The following patent applications include a specification and drawings common to the instant application:

U.S. patent application Ser. No. 09/946,058; entitled "Wide Field Scanning Laser Obstacle Awareness System"; and U.S. patent application Ser. No. 09/946,048; entitled "System and Method Of Measuring Flow Velocity In Three Axes", both of which being filed on even date with and assigned to the same assignee as the instant application.

BACKGROUND OF THE INVENTION

The present invention is directed to laser measurement systems, in general, and more particularly, to a combined laser obstacle awareness (LOAS) and light detection and ranging (LIDAR) system.

A common flight hazard of any aircraft operating near the Earth is the potential for collision with ground structures and obstacles. Helicopters, in particular, and now new classes of aircraft known as unmanned air vehicles (UAVs), often operate less than five hundred feet above ground level (AGL). In this environment, it is not uncommon for these aircraft to collide with electrical power lines, support wires for radio towers, or various structures and obstacles. These collisions typically result in loss of life, significant aircraft damage, damage to the structures or obstacles themselves, subsequent loss of power distribution on the electrical grid, and danger to persons and property on the ground. Aircraft, such as helicopters and UAVs, for example, typically operate in these low altitudes for take-off and landing, various low-level military maneuvers, and commercial applications, such as electrical utility inspection or emergency rescue missions.

Inspecting electrical power lines from an aircraft requires flying close to the Earth along high tension power lines and support structures looking for damaged equipment. Use of helicopters permit electric utility inspection crews to cover a large area of the power grids over a short period of time. Other helicopter applications which require low flying flight profiles include emergency and rescue missions, medical emergencies, border surveillance, and supply of floating oil platforms, for example. Likewise, UAV applications require autonomous control for surveillance, take-off, landing and delivery of munitions. In all of these applications, the flight crew and aircraft are at risk of colliding with obstacles like power lines, cables, towers, and other similar support structures. The risk becomes even greater with poor visibility and flights over unknown terrain. Depending on the type of aircraft canopy, the lighting, and the environmental conditions, many obstacles may become effectively invisible to the pilot and crew due to background clutter even under daylight conditions. Also, because of the narrow field of view offered the pilot by the aircraft, some obstacles may not be seen until it is too late for avoidance. Surprisingly, the highest accident rates are typically associated with clear conditions which indicates that during reduced states of pilot situational awareness, identification of hazardous ground obstacles may occur less regularly.

Some helicopters are equipped with structural wire strike protection kits which are fitted on the front end of the aircraft and intended to force a wire in the path of the aircraft to slide over the top or under the bottom of the aircraft. However, for this device to be effective, a contacted wire must slide across the canopy and into the wire cutters. When this occurs, the wire is likely to be severed by the wire cutter(provided it meets certain size and strength envelopes), freeing the aircraft from the hazards. It is not uncommon for electrical utility companies to identify cut wires but have no report of a wire strike accident. In some cases this indicates the flight crew did not know they hit a wire, much less cut it, or are reluctant to report the incident. However, if the wire does not slide across the canopy, and impacts other areas of the helicopter such as the rotors or landing skids, the wire cannot be severed by the wire strike protection system. As tension builds in the wire due to the forward motion, damage to the aircraft ensues with penetration into the canopy and flight crew, damage to the main rotor resulting in an imbalance, or loss of tail rotor control. In all these cases, the flight crew is in immediate life threatening danger. Depending upon the degree of interaction, fatalities can be attributed to the high-g accelerations of the rotor imbalance, blunt force trauma due to subsequent impact with the ground/aircraft, or harmful interactions with the wire resulting in significant lacerations or electrocution. Accordingly, due to the many low-level flying applications and the increasing risks posed thereby, obstacle avoidance warning systems for these aircraft have become of paramount importance for the safety of the pilot and crew of the aircraft. These devices are intended to warn the flight crew in advance of the collision with the obstacle, so that they(or an automated flight control system) can take evasive action prior to collision.

Amphitech International of Montreal, Canada, has developed a radar based obstacle awareness system named OASYS which was presented at the Quebec HeliExpo 2001. While it is proposed that OASYS can detect small obstacles, such as power lines, for example, up to two kilometers away even in adverse weather conditions, it is a rather heavy, bulky and costly unit, which may render it prohibitive for small aircraft usage.

Another obstacle awareness warning system is being developed by Dornier GmbH, in its Defense and Civil Systems Business Unit of Friedrichshafen, Germany under the tradename of HELLAS (Helicopter Laser Radar). In this unit, a laser beam is sequentially scanned through a line series of approximately one hundred optic fibers to create a raster line scan which is projected from the system. The line scan is steered vertically by a pivoted, oscillating mirror. The field-of-view is approximately plus and minus 32 degrees in azimuth and elevation with respect to a line of sight of the system. While Dornier promotes HELLAS as being an effective obstacle detection unit, it remains a relatively narrow field of view device that is rather complex and costly. In addition, the large number of optic fibers required for effective obstacle detection resolution, appears to render the device difficult to repeatedly align which may lead to manufacturing difficulties.

Another problem encountered in these low-level flight profile aircraft applications is the wind or air flow conditions surrounding the aircraft while it is carrying out its tasks. In some cases, an aircraft may encounter substantially different air-flow conditions from side to side. For example, when flying in a canyon, the aircraft may have a mountain wall on one side and open spaces on the other. Landing on the flight deck of an aircraft carrier poses similar risks. Such uneven air flow conditions may have an adverse affect on the responsiveness of the aircraft to the avoidance of detected obstacles.

Accordingly, it is desireable to have a wide field scanning laser based obstacle awareness system which is simpler in design and less costly than its predecessors to render it an economically attractive safety system for low-level flight profile aircraft. Combining air flow and obstacle measurements in a common system would provide the knowledge of air conditions surrounding the aircraft when an obstacle is detected in its flight path allowing a pilot to make his avoidance decisions based on such air data information. An enhanced situational awareness display would augment the peripheral vision of the flight crew to potential collision obstacles. The present invention is intended to provide for these desirable features in a laser based obstacle awareness system as will become more evident from the description thereof found herein below.

SUMMARY OF THE INVENTION

In accordance with one aspect of the present invention, a combined system of a laser obstacle awareness system (LOAS) and a light detection and ranging (LIDAR) system for obstacle detection and flow velocity measurement comprises: a LIDAR arrangement of optical elements for generating a first coherent beam of light at a first predetermined wavelength; a LOAS arrangement of optical elements for generating a second coherent beam of light at a second predetermined wavelength; a dichroic filter optical element for directing the first and second coherent beams of light substantially on a first common optical path towards an aperture of a beam expander which is aligned to accept and expand the first and second coherent beams and exit the expanded first and second coherent beams along a second common optical path at an output thereof; at least one output optical element, the second common optical path being incident on the at least one output optical element which directs both of the expanded first and second coherent beams of light from the system, the at least one output optical element also for receiving reflections of the first and second coherent beams of light and directing the reflections to the beam expander wherein the beam reflections are collected; and the dichroic filter optical element for separating the collected light corresponding to the first coherent beam from the collected light corresponding to the second coherent beam, the separated light corresponding to the first coherent beam being directed back to the LIDAR arrangement of optical elements for use in determining flow velocity, and the separated light corresponding to the second coherent beam being directed back to the LOAS arrangement of optical elements for use in detecting at least one object.

In accordance with another aspect of the present invention, a block arrangement of optical elements for use as a transmitter/receiver for a light detection and ranging (LIDAR) system comprises: a plurality of glass modules aligned together as a block to form a plurality of optical paths therein and secured together to maintain the alignment; a collimated light source secured to the block for generating a coherent beam of light over at least one optical path in the block which guides the coherent beam of light to an exit point of the block; and a light detector secured to the block; the block for receiving a return coherent beam of light and configured to conduct the return coherent beam of light to the light detector over at least one other optical path formed in the block.

In accordance with yet another aspect of the present invention, the combined system comprises: at least one scan head, each scan head including the beam expander and the at least one output optical element, for directing both of the expanded first and second coherent beams of light from the scan head, the at least one output optical element of each scan head also for receiving reflections of the first and second coherent beams of light and directing the reflections to the beam expander wherein the beam reflections are collected and returned to the dichroic filter optical element along an optical path.

BRIEF DESCRIPTION OF THE DRAWINGS

FIG. 4 is an illustration of an exemplary environment in which the LOAS embodiment of FIG. 1 may operate.

FIGS. 5A and 5B are time graphs exemplifying the signal processing of the LOAS embodiment of FIG. 1.

FIG. 11 is a sketch of a light indicator display suitable for use in the embodiment of FIG. 3.

FIG. 12 is a sketch of an exemplary screen of a multifunction video display (MFD) alternately suitable for use in the embodiment of FIG. 3.

FIGS. 13A–13E are plan view illustrations in time progression (time slices) of an aircraft approaching obstacles near and in its flight path shown by way of example.

FIGS. 14A–14E are illustrations of exemplary MFD screen displays of the time slices of FIGS. 13A–13E, respectively.

FIGS. 20, 20A and 20B illustrate functionally by way of example the processing involved in determining the 3-axis flow velocity by the embodiment of FIG. 19.

DETAILED DESCRIPTION OF THE INVENTION

Figure 1:
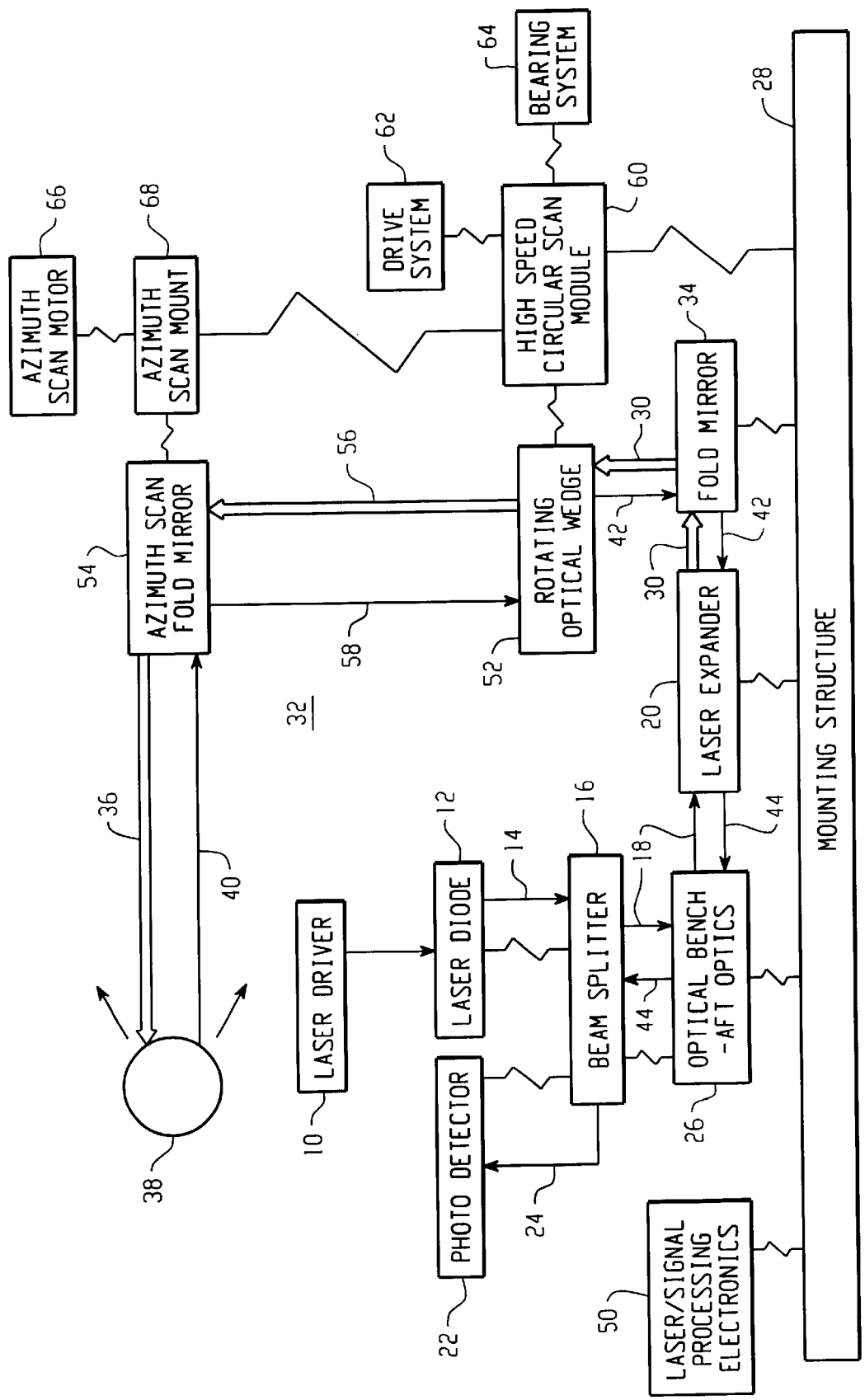
FIG. 1 is a block diagram schematic of a wide field scanning laser obstacle awareness system (LOAS) suitable for embodying at least one aspect of the present invention.

FIG. 1 is a block diagram schematic of a wide field scanning laser obstacle awareness system (LOAS) suitable for embodying at least one aspect of the present invention. Referring to FIG. 1, a light source for generating a pulsed bean of light is comprised of a laser driver circuit 10 and a laser source 12 which is driven by the circuit 10.

In the present embodiment, the laser source 12 comprises a micro chip laser diode which may be of the type manufactured by Nanolase bearing model number NP-10320-100, for example.

The laser source 12 is driven by the circuit 10 to emit a pulsed light beam with a pulse width of approximately one to two nanoseconds (1–2 nsec.) or longer, and at a pulse repetition rate on the order of ten kilohertz (10 kHz) or more. The light beam of the present embodiment is generated with a diameter of approximately three hundred micrometers (300 microns), with a wavelength of fifteen hundred and fifty nanometers (1550 nm) or one thousand sixty four nanometers (1064 nm), for example, and in a state of linear polarization. The laser source 12 may include beam conditioning optics (not shown) for collimating and enlarging the laser beam diameter from 300 microns to three millimeters (3 mm).

The pulsed laser beam of light is guided over an optical path 14 to a polarizing beam splitter optical element 16 which passes most of the pulsed beam 14 along an optical path 18 to the input of a laser beam expander 20. A small amount of the pulsed beam 14 is reflected by the beam splitter 16 to a light detector 22 along an optical path 24 to act as a transmission time synchronization pulse as will become more evident from the further description found herein below. In the present embodiment, the light detector 22 comprises an avalanche photodiode (APD) which may be of the type manufactured by Analog Modules bearing model number 756, for example, and may include a variable gain circuit for increasing sensitivity to pulses of small amplitude. In addition, the beam splitter 16 may include a quarter wavelength ($\lambda/4$) plate at the output thereof which converts the linearly polarized beam passed by the beam splitter 16 to a circularly polarized beam which is passed along optical path 18 to the beam expander 20.

In the present embodiment, the circuit 10, laser source 12, light detector 22 and beam splitter 16 are all mounted on an optical bench 26 in a proper alignment to create the optical paths 14, 18 and 24, for example. The optical bench is then affixed structurally to a mounting structure 28 which supports the entire LOAS in the present embodiment. The laser beam expander 20 which may be of the type manufactured by Special Optics bearing model number 52-71-10X-905-1064, for example, is also mounted to the structure 28 such that its input or entrance aperture is aligned with the optical path 18 to receive the pulsed beam from the beam splitter 16. The beam expander 20 enlarges the diameter of the pulsed light beam with a 10× magnification, for example, and passes the enlarged pulsed collimated light beam along an optical path 30 to at least one rotationally operated optical element 32 for directing the expanded pulsed laser beam from the LOAS along an optical path 36 with a predetermined pattern scanned azimuthally over a wide field. A conventional fold mirror optical element 34 may be mounted to the structure 28 and aligned for guiding the expanded light beam from the expander 20 to the at least one rotationally operated optical element 32 along the path 30. It is understood that the use of the fold mirror 34 in the present embodiment is merely by design choice.

Pulsed light reflected along an optical path 40 from an obstacle or object 38, like a wire, for example, along the predetermined pattern is received by the at least one rotationally operated optical element 32 and directed back to the beam expander 20 along an optical path 42 via fold mirror 34. If there are more than one object in the path of the predetermined pattern, then the LOAS will receive pulsed light reflections from each of the detected objects. In the beam expander 20, the pulsed light reflections are collected into a condensed collimated beam in the vicinity of its input aperture. The light reflections from the object 38 are reversed in circular polarization from the transmitted light beam. For example, if the transmitted beam was polarized with a clockwise polarization, then the light reflections would have a counter-clockwise polarization and vice versa. Aft optics in the optical bench 26 guide the light reflections from the beam expander 20 along an optical path 44 to the λ/4 plate and beam splitter 16. The λ/4 plate reconverts the circularly polarized reflected light to linearly polarized light at right angles to the transmitted light beam which causes the polarizing beam splitter to reflect the returned light pulses to the light detector 22, which may be coupled to signal processing circuits 50 that are also mounted to the common structure 28. The operation of the light detector 22 and circuits 50 in connection with the detection of an obstacle will be explained in greater detail herein below.

More specifically, in the present embodiment, the at least one rotationally operated optical element 32 comprises a first rotationally operated optical element 52 for receiving the expanded pulsed laser beam from the expander 20 and directing it to a second rotationally operated optical element 54 along optical path 56 with the predetermined pattern as will become more evident from the following description. The second element 54 receives the pulsed light beam from the first element 52 and directs the received beam with the predetermined pattern azimuthally over a wide field which may be on the order of plus and minus ninety degrees or more with respect to a reference axis of the LOAS. Pulsed reflections from objects along the predetermined pattern are directed from the second element 54 to the first element 52 over an optical path 58. One or both of the elements 52 and 54 may be configured as fold mirrors.

The optical element 52 may be a rotating optical wedge which has one surface inclined at a predetermined angle relative to an opposite surface and is rotated about an axis normal to the opposite surface, or a wobble mirror rotated about an axis at a predetermined nutation angle from its normal axis (e.g. a Palmer scan mirror), for example, wherein the expanded pulsed laser beam may be reflected from the mirrored surface of the optical element with the predetermined pattern. In either case, the element 52 is coupled to and driven by a conventional high speed circular scan module 60 which may include a drive system 62, like an electric motor, for example, and a conventional bearing system 64. In the present embodiment, the module 60 with its drive 62 and bearing system 64, which may be a Palmer mirror assembly, for example, is mounted to the common structure 28 and properly aligned thereon. The drive 62 rotates the element 52 about its intended axis at an angular speed of approximately fifty (50) cycles per second, for example, which creates a cyclical conical pattern of pulsed laser beam projected from the LOAS via element 54.

Figure 2:
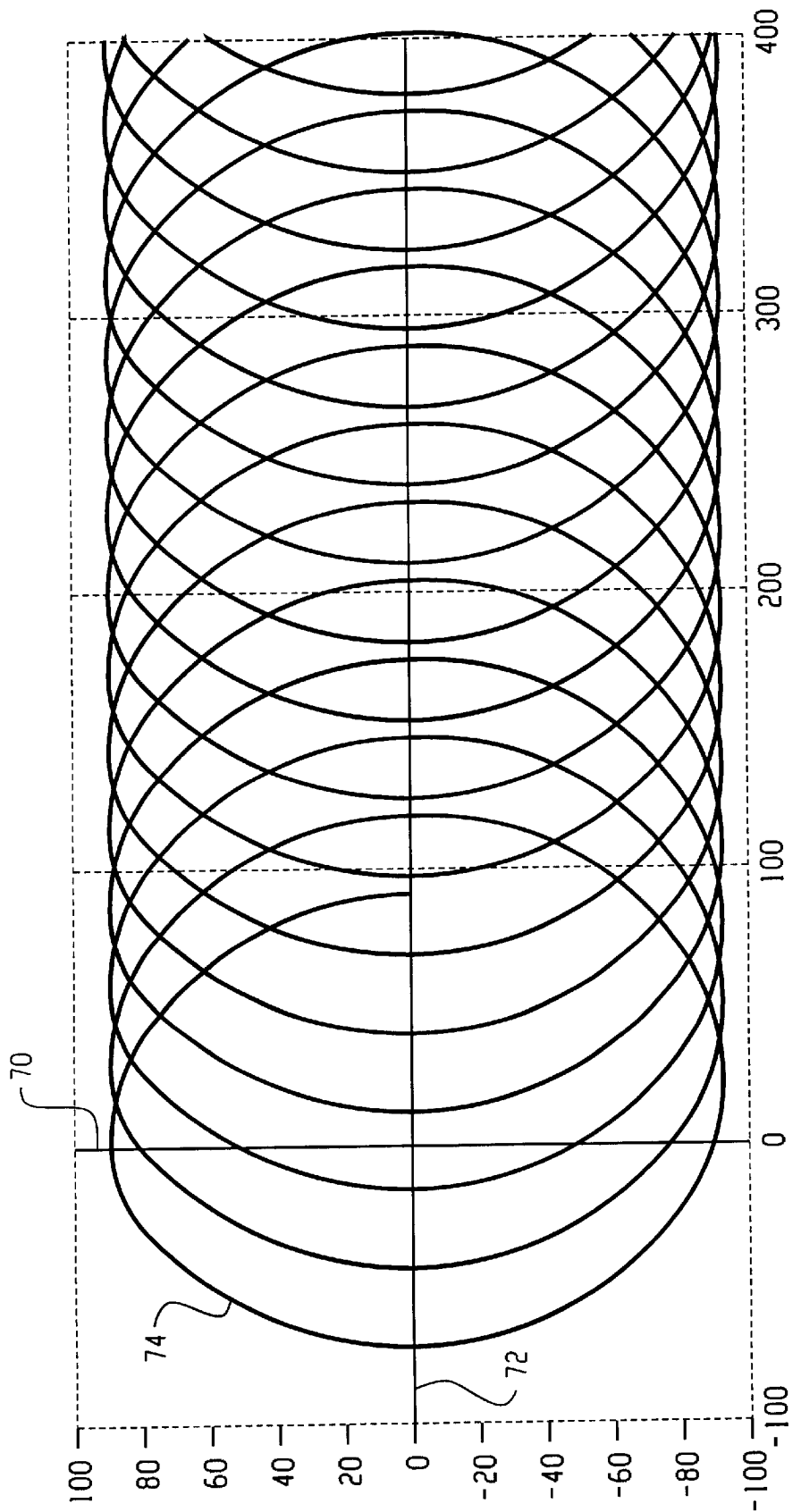
FIG. 2 is a graph of an exemplary scan pattern generated from the LOAS embodiment of FIG. 1.

Element 54 may also be a mirrored optical element which is driven by an azimuth scan motor 66, which may be a stepper motor, for example, to rotate and scan the conical pattern of the element 52 azimuthally through an arc of approximately 180°, i.e. ±90° or more with respect to the reference axis of the LOAS, over a time period of 0.5 seconds, for example. Thus, the predetermined pattern will include an elevation variation in relation to a line of sight axis of the system. An exemplary scan pattern at 500 meters from the system is illustrated in the graph of FIG. 2. Referring to FIG. 2, the reference axis of the system is shown by the vertical axis 70 and the line of sight axis of the system is shown by the horizontal axis 72. The helical-like line 74 represents the scan pattern as it is being rotated by the first element 52 and scanned azimuthally by the second element 54. In this example, the first element 52 is an optical wedge mirror with a wedge angle of ten degrees and rotated at approximately 115 Hz. The graph of FIG. 2 only depicts an azimuth translation from 0° to ±90°. It is understood that the azimuth translation from −90° to 0° would appear as the mirror image to what is depicted in FIG. 2. The azimuth scan rate of the illustration of FIG. 2 is approximately 2 Hz.

Note that with each scan pattern cycle of the illustration of FIG. 2, the light beam pattern 74 moves in elevation in relation to the line of sight or horizontal axis 72 and in azimuth in relation to the reference or vertical axis 70. Also, since the pattern 74 takes approximately 9 msec. to complete a cycle and since the LOAS generates light beam pulse every 0.1 msec., then there would be approximately 90 light beam pulses uniformly generated per scan pattern cycle. As will become more evident from the following description, the LOAS of the present embodiment may determine a location of each detected obstacle along the path of the predetermined scan pattern in range, azimuth, and elevation.

Returning to FIG. 1, in the present embodiment, the azimuth scan mirror optical element 54 is coupled to the azimuth scan motor 66 in a scan mounting assembly 68 which is also mounted to the common structure 28 via the scan module 60, for example. Accordingly, all of the elements of the present embodiment may be mounted and fixedly aligned on the common mounting structure 28. In some systems, an element of the LOAS may be adjustably realigned at its mounted position from time to time should the need arise. In addition, while the present embodiment is described as having two rotationally operated optical elements 52 and 54, it is understood that it is possible to combine the scan pattern and the azimuth rotations into one optical element which is driven by two motors, one for the cyclical scan pattern and the other for the azimuth scan without deviating from the broad principles of the present invention. Also, more than two mirrors may be used as will be described in connection with an alternate embodiment herein below. In addition, a single mirror can be used to scan in elevation, using a resonant oscillating motion of the mirror in the vertical plane, for example, while simultaneously being driven in azimuth by a motor, producing a raster scan pattern.

Figure 3:
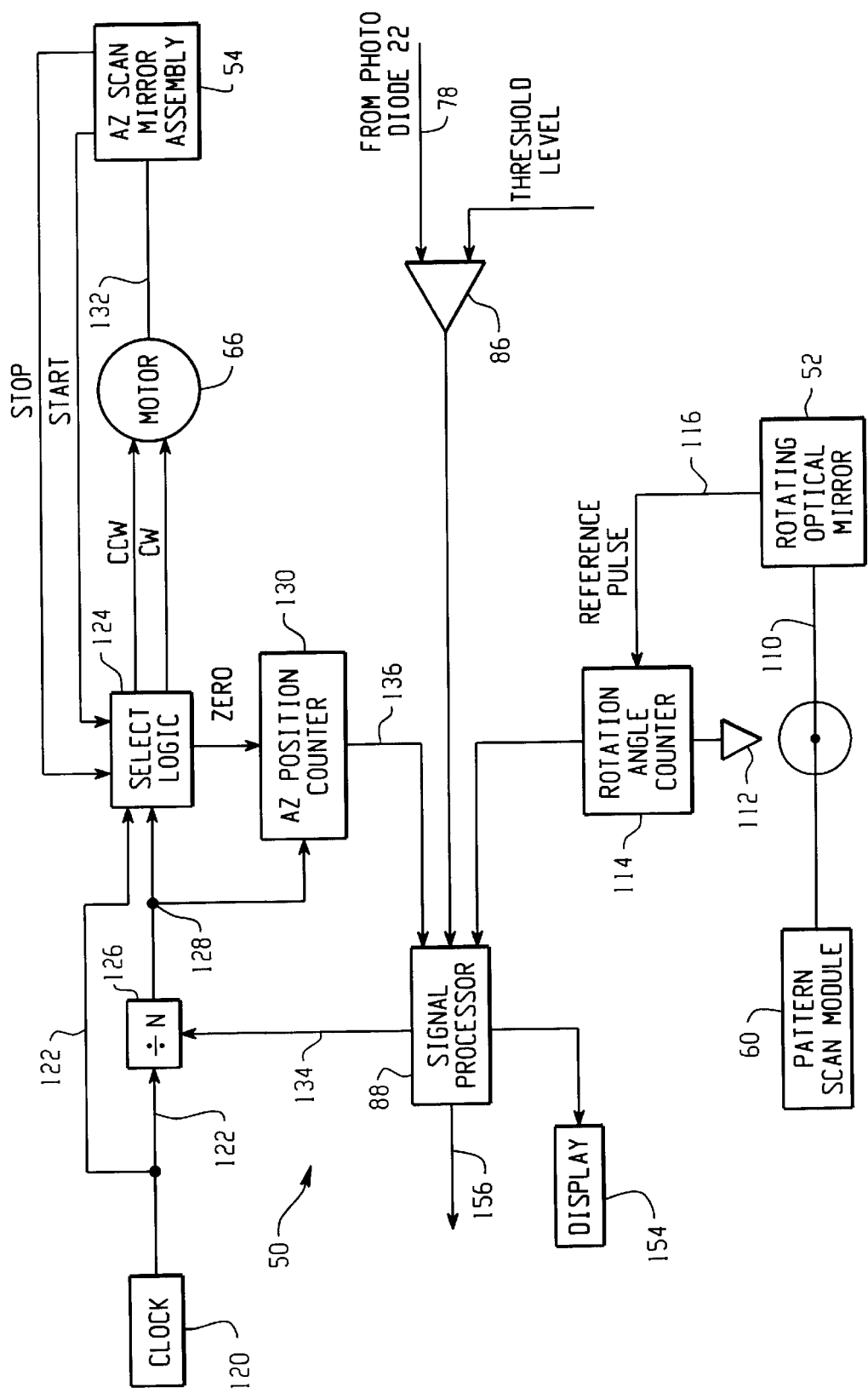
FIG. 3 is a block diagram schematic of a light beam scan pattern generator/receiver suitable for use in the embodiment of FIG. 1.

A block diagram schematic of a wide field light beam scan pattern generator/receiver suitable for use in the present embodiment is shown in FIG. 3. Like reference numerals will be maintained for those elements already described for the embodiment depicted in FIG. 1. Referring to FIG. 3, electrical signals generated over signal line 78 by the photodiode 22 are representative of received light beam reflections from objects along the predetermined pattern of the transmitted pulsed light beam. FIG. 4 illustrates an exemplary environment in which the LOAS embodiment may operate. Referring to FIG. 4, the pulsed light beam projected from the LOAS along the path 36, for example, may be reflected from such obstacles as a cable 80, cable support towers or structures 82 and background clutter which may take the form of trees and bushes 84, for example. The light reflections from the obstacles are received by the LOAS and directed to the light detector 22 as described in connection with the embodiment of FIG. 1 wherein the light reflections are converted to electrical signals representative thereof.

The time graph of FIG. 5A is illustrative of such electrical signals produced by the light detector 22 from the pulsed light beam reflections during an interpulse period of the transmitted pulsed light beams. FIG. 5A illustrates only the first approximately ten microseconds of a one hundred microsecond interpulse period, for example. In FIG. 5A, the first pulse 90 may be representative of the transmitted beam for time synchronization; the second pulse 92 which is close in range may be just an electrical noise pulse; the third pulse 94 may be representative of a reflection from a first obstacle, like the cable 80 or structure 82 as shown in the illustration of FIG. 4, for example; and the fourth pulse 96 may be representative of a reflection from a second obstacle further in range, like one of the trees 84, for example.

Referring back to FIG. 3, the electrical signals from the photodiode 22 over signal line 78 may be coupled to one input of a circuit 86 which is configured as a comparator circuit. An electrical signal representative of a threshold level may be coupled to another input of the comparator 86 for comparison with the electrical signals from the photodiode 22. The threshold level is shown by the dashed line 98 in FIG. 5A. FIG. 5B is a time graph which exemplifies the operation of the comparator 86 in response to incoming electrical signals from the photodiode 22. For example, as pulse 90, the sync pulse, exceeds the threshold 98, the output of the comparator 86 is caused to change state from a high potential (+5V) to a low potential (+2V). Note that in the embodiment of FIG. 3, the output of the comparator 86 is coupled to a signal processor 88 which may be part of the signal processing electronics 50. The processor 88 may be a digital signal processor of the type manufactured by Texas Instruments bearing model number TMS-320C6711, for example. Accordingly, the processor 88 may be programmed to detect the change in state at 100 in the time graph of FIG. 5B caused by the sync pulse 90 and measure the time of all subsequent detected pulses with respect to the sync pulse or first change in state 100 of the comparator 86. In the present embodiment, the comparator 86 may have a predetermined response time before it may return its output to a high level to detect the next pulse or detected obstacle. Thereafter, in the example of FIG. 5B, the comparator changes state at 102 in response to pulse 94 representative of the detection of one obstacle and again at 104 in response to pulse 96 representative of another obstacle. Note that no change of state occurs in response to pulse 92 which falls below the threshold level 98, and thus, is considered electrical noise. With preprogrammed data of the speed of light, the processor 88 may be also programmed to determine the range to a detected obstacle from the time difference between the sync pulse and the pulse representative of the obstacle. The processor may also determine the azimuth and elevation location of the obstacle as well, as will be described in connection with the following paragraphs.

Referring back to FIG. 3, the scan pattern module 60 may be coupled to and drive the rotationally operated optical element 52 through a shaft 110 which may include an indication of its angle position with respect to a reference angle. In one embodiment for sensing the angular position of the optical element 52, the shaft may be marked with indicia representative of its relative angle or include a wheel thereon or attached thereto with such angle markings. In either case, the indicia may be read by a conventional reader and digitally provided to the processor 88 as a measure of the angle of rotation of the scan pattern optical element. Thus, the processor will have stored at any time the measured angle of the scan pattern which it may use to calculate azimuth and elevation of a detected obstacle. In another embodiment, the shaft 110 may include markings like grooved teeth, for example, or have affixed thereto a wheel with teeth grooved therein. A conventional proximity device 112 may detect each grooved tooth and generate an electrical pulse in response. These electrical pulses may be counted in a counter 114 which count may be a measure of the current scan pattern angle of optical element 52. The element 52 may include a mechanical, proximity or optical switch positioned to generate a reference pulse 116 each time the element 52 is rotated past the reference angle. The reference pulse 116 may be coupled to the counter 114 to reset it to zero so that it may start counting with respect to the reference angle with each rotation cycle. Accordingly, as the processor 88 detects an obstacle in time, it may read the contents of the counter 114 which is a measure of the concurrent angular position of the optical element 52 and from which the processor may determine elevation of the detected obstacle.

In yet another embodiment for sensing angular position of the scan pattern, the processor 88 may include a clock of a predetermined rate for counting up in a designated register thereof a count that is a time based measure of the angular position. The reference pulse 116 may be provided to the processor for resetting the count in the designated register. Each time the reference pulse 116 is received, the processor 88 saves the total count in the counting register and resets the register to start counting up from a zero count. In this embodiment, when an obstacle is detected, the processor 88 merely reads the concurrent count in the counting register and compares it to the saved total count to obtain a ratio from which it may determine the angular position of the scan pattern. The elevation of the obstacle with respect to the line of sight of the LOAS may be determined by taking, for example, the sine of the sensed scan pattern angle of the detected obstacle and multiplying it by the maximum elevation amplitude at the measured range of the detected obstacle. That is, one half of the diameter of the plane section of the conical scan pattern at the range of the detected obstacle will be the maximum elevation amplitude. This is illustrated in the scan pattern example of FIG. 2 for a range of 500 meters.

The embodiment of FIG. 3 also exemplifies a way for determining substantially the azimuth position of the directed pulsed laser beam for determining the location of a detected object in at least range and azimuth. Referring to FIG. 3, a conventional digital clock circuit 120 generates a clock signal 122 at a predetermined rate. Signal 122 is coupled to select logic circuitry 124 and to a rate divider circuit 126 which divides the rate of clock signal 122 by a factor N. The divided rate signal 128 from the circuit 126 is coupled to the select logic circuitry 124 and to an azimuth position counter 130 which increases its count with each received pulse. The select logic circuitry 124 generates a clockwise signal (CW) and a counter-clockwise signal (CCW) for use in controlling the electric motor 66, which may be a stepper motor, for example. The motor 66 is coupled to the azimuth scan mirror assembly 54 by a shaft 132 for rotating the mirrored element 54 through its 180° rotation. The azimuth mirror assembly 54 may include a first switch positioned to activate and generate a START signal at substantially the 0° azimuth position, and a second switch positioned to activate and generate a STOP signal at substantially the 180° azimuth position, for example. The START and STOP signals are provided to the select logic circuitry 124. In some applications, the signal processor 88 may be coupled to the divider circuit 126 over signal line 134 for setting the number N by which the rate of signal 122 will be divided. The signal processor 88 is also coupled to the counter 130 over signal line 136 for reading the azimuth position count thereof.

In operation, the signal processor 88 may set the number N of the divider 126 which ultimately sets the rate at which the laser beam scan pattern is rotated azimuthally. It is understood that this number N may be preprogrammed into the rate divider circuit 126 as well. So, the select logic 124 receives both a fast rate signal 122 and a slower rate signal 128 and selects one of the rate signals to control or step the motor 66 through its rotation. For example, when the select logic 124 receives the START signal from the scan mirror assembly 54, it selects the slow rate signal 128 to control the motor 66 via the CW control line to rotate clockwise through its 180° rotation in a predetermined time, like 0.5 seconds, for example. When the STOP signal is generated, the select logic 126 responds by selecting the fast rate signal 122 to control the motor 66 via the CCW signal to rotate counter-clockwise back to its starting position whereupon the process is repeated. It is understood that the azimuth scan may be controlled to rotate at the slower rate in a counterclockwise rotation and returned to its starting angular position at a much faster rate as well without deviating from the broad principles of the present invention.

Each time the select logic receives the START signal, it generates a ZERO signal to the counter 130 for resetting the count thereof to zero. The STOP signal may be also coupled to the signal processor 88 which responds to the signal by reading and storing the total count in the counter 130 which is representative of an azimuth angular position of 180°, for example. So, each time an obstacle is detected by the signal processor 88, it may read the concurrent count in the azimuth position counter 130 and use the read count together with the total count to determine the azimuth position of the detected obstacle. In the present embodiment, the circuits 120, 124, 126 and 130 may be part of the signal processing circuitry 50. It is understood that the functions of these circuits may also be programmed into the signal processor 88.

In some applications, the azimuth scan may be controlled to rotate at the programmed rate for both of the clockwise and counterclockwise directions in which case, the counter 130 will count up from the starting position in one direction and count down from the stop position in the opposite direction. In these applications, the counter may still be reset to zero by the select logic 124 in response to the START signal and the processor 88 may read the total count of the counter 130 in response to the STOP signal. And, similarly, each time an obstacle is detected by the signal processor 88, it may read the concurrent count in the azimuth position counter 130 and use the read count together with the total count to determine the azimuth position of the detected obstacle.

Figure 6:
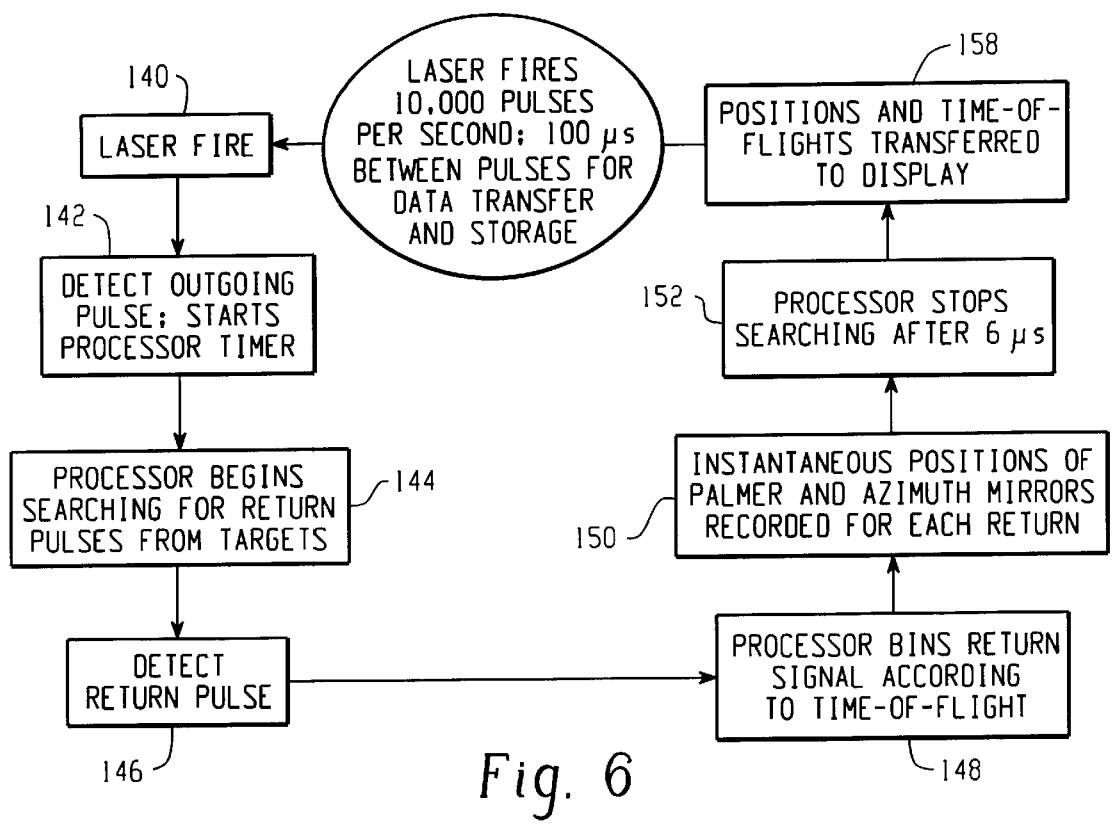
FIG. 6 is a flowchart illustrating an exemplary programmed operation of a processor suitable for use in the LOAS, embodiment of FIG. 1.

The flowchart of FIG. 6 illustrates a programmed operation of the signal processor 88 by way of example. Referring to FIG. 6, the diode laser source 12 may be controlled to fire periodically at a rate of 10 KHz or 10,000 pulses per second, for example, with an interpulse period of 100 $\mu$sec. autonomously by the driver circuit 10 or may be controlled to fire by the programmed processor 88 as shown by the block 140. In either case, the processor detects the sync pulse as described supra and starts a processor range timer in block 142. Thereafter, the processor begins searching for return pulses of reflections from the targets or obstacles along the predetermined scan pattern in block 144. When a return pulse is received in block 146, which is representative of a detected obstacle, the processor bins the return signal according to its time of flight in block 148. That is, the return pulse is indexed and stored in a designated memory location of the processor along with its recorded range processor time which is the count in the timer concurrent with the time of detection. This count is representative of the range of the detected obstacle. Concurrent with the detection of the obstacle, the instantaneous positions of the Palmer scan pattern and azimuth mirrors are recorded as described supra, preferable in the designated memory location for the indexed detected obstacle, in block 150. Each time an obstacle is detected by the processor in the interpulse period of laser firing, the blocks 146, 148 and 150 are repeated and the obstacle index and its range and location representative data for azimuth and elevation are recorded in a designated memory location or bin.

After, the initial approximately 6 $\mu$sec. of the interpulse period between laser firings or some other appropriate initial time period ends, the processor stops searching for detected obstacles in block 152. Thereafter, the processor may use the remaining time before another laser firing to compute the range and location in azimuth and/or elevation for each obstacle detected and indexed in the current interpulse period from the recorded data thereof. In block 158, this range and position location information for the detected obstacle(s) may be configured for display and transferred to a display 154 such as shown in the block diagram schematic of FIG. 3, for example. This information may also be provided by the processor 88 over a signal line 156 to other systems for use therein. At the end of the interpulse period, the laser source 12 may be controlled to fire again in block 140 and the process as just described is repeated. In this manner, each obstacle along the predetermined scan pattern may be detected and its location determined and the detected obstacles and their respective locations may be displayed to an operator for awareness purposes as will become more apparent from the description found herein below.

Figures 7A, 7B:
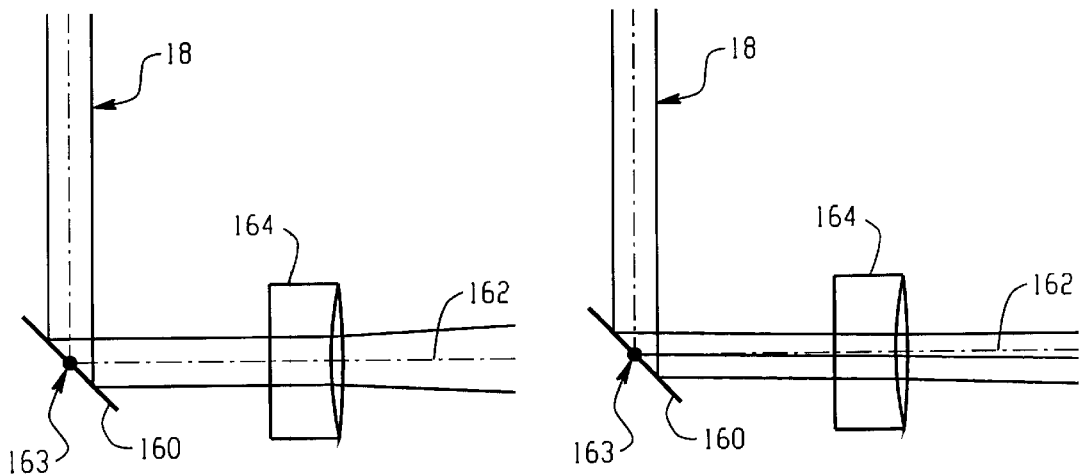
FIGS. 7A and 7B are sketches illustrating an exemplary dithering operation of a perturbation mirror suitable for use in the embodiment of FIG. 1.

The wide field scanning LOAS embodiment described in connection with FIGS. 1–6 detects obstacles along a predetermined scan path using a pulsed laser beam spot size on the order of a meter in diameter at about a kilometer in range, for example. As shown by the pattern example of FIG. 2, obstacles will not be detected in the cusp areas between the scan paths of the pattern 74. To improve the obstacle detection effectiveness of the wide field LOAS embodiment, a beam perturbation or dither mirror may be disposed in the optical path 18 between the beam splitter 16 and input or entrance aperture of the expander 20, preferably in the aft optics of the optical bench 26, for example. The perturbation mirror 160 as shown in FIGS. 7A and 7B, which is configured as a fold mirror, may be supported on a pivot and rotated back and forth across a center axis of the optical path 18. In so doing, it will change the beam approach angle into the entrance aperture of the beam expander 20. For example, in the present embodiment, a ±1° pivot or tilt of the perturbation mirror 160 with respect to the central axis of the optical path 18 is expected to move the laser beam spot ±5 meters at a kilometer in range. If the mirror is dithered in this manner at a high rate, like on the order of one to ten Kilohertz (1–10 kHz), for example, the 1 meter laser beam spot size would be smeared to become effectively 5 meters at 1 kilometer. Accordingly, a greater percentage of the scene would be observed by an effectively wider laser beam spot size. That is, the width of the path of the scan pattern would be increased effectively five fold.

FIGS. 7A and 7B illustrate by way of example the dithering operation of the perturbation mirror 160. In FIG. 7A the mirror 160 is at shown configured as a fold mirror pivoted about an axis 163 looking into the drawing sheet. In FIG. 7A, the mirror 160 is shown at a zero angle tilt. Note that in this position of the mirror 160, the rays of the beam guided through the optical path 18 are centered about a central axis 162 of the entrance aperture 164 of the beam expander 20. In FIG. 7B, the mirror 160 is tilted or pivoted downward approximately 1° from its zero angle position of FIG. 7A causing the rays of the beam to move off the central axis 162 downward at an approach angle to the entrance aperture of approximately minus one degree. Similarly, as the mirror 160 is tilted upward 1° from the zero angle position, the rays of the beam will move off the central axis 162 upward at an approach angle to the entrance aperture of approximately plus one degree. A rapid movement of the mirror 160 rotating between the ±1° tilt positions will result in the effective spread of the laser beam spot along the scan pattern.

Figure 8A:
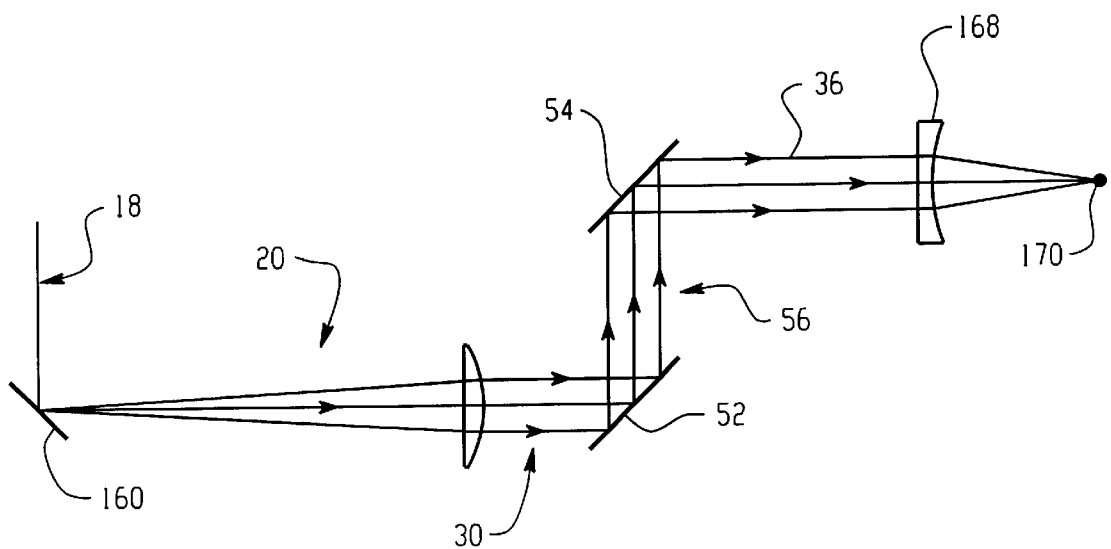
FIGS. 8A and 8B are sketches illustrating the effects of a predetermined angle tilt of the perturbation mirror on an image projected in space.
Figure 8B:
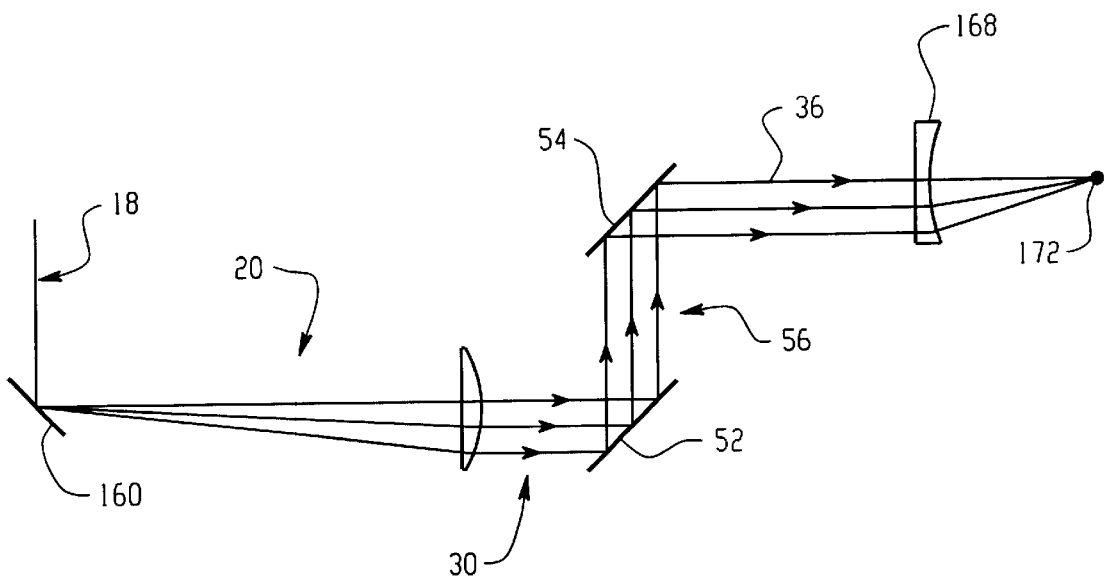

FIGS. 8A and 8B show the effect of the 1° tilt of the mirror 160 on an image projected in space. In FIG. 8A, the mirror 160 is at the zero degree tilt position. Note that the laser beam reflected along path 18 expands through the beam expander 20 as shown by the departing rays. As the beam exits the expander 20, it becomes collimated with parallel rays at path 30. The expanded collimated beam is reflected from mirror 52 along path 56 to the mirror 54 where it is again reflected along path 36 and directed from the system along the predetermined scan path. To better illustrate the effects of the dithering of the perturbation mirror 160 on a projected image, like the spot size, for example, a converging lens 168 is disposed at the output of the system to focus the beam to a focal point or spot 170 in space a predetermined range from the system. This converging lens 168 is used in the present example merely for image analysis purposes. In FIG. 8B, the mirror 160 is tilted downward 1° causing the collimated beam exiting the expander 20 to shift downward which results in a deflection of the focal spot to a new position 172 that is only slightly away from the original focal position 170 as shown in FIG. 8A. In the present example, a 1° tilt resulted in only a 1.6 meter deflection of the focal spot at a range of one kilometer. Thus, a minor perturbation of the mirror 160 will not result in substantial defocusing or distortion of an obstacle image detected at substantial distances from the system.

A perturbation mirror 160 suitable for use in the embodiment of FIG. 1 may be any one of a variety of commercially available mirrors, like a Palmer or wobble mirror assemble or a scan mirror, for example. But to effect the speeds of pivoting or dithering desired for the present embodiment which may be on the order of 200–600 Hz, for example, a mirror assembly that has a low inertia, like a mirror assembly made using micro electromechanical systems (MEMS) technology, is preferred. These type of low inertia mirror assemblies may use a small piezoelectric power supply. The area of mirrored surface of the perturbation mirror 160 may be made quite small, like on the order of the width of the laser beam it is reflecting. Several commercially available "fast" dither mirrors operated by piezoelectric drivers for optical image stabilization would be suitable for this purpose.

Figure 9:
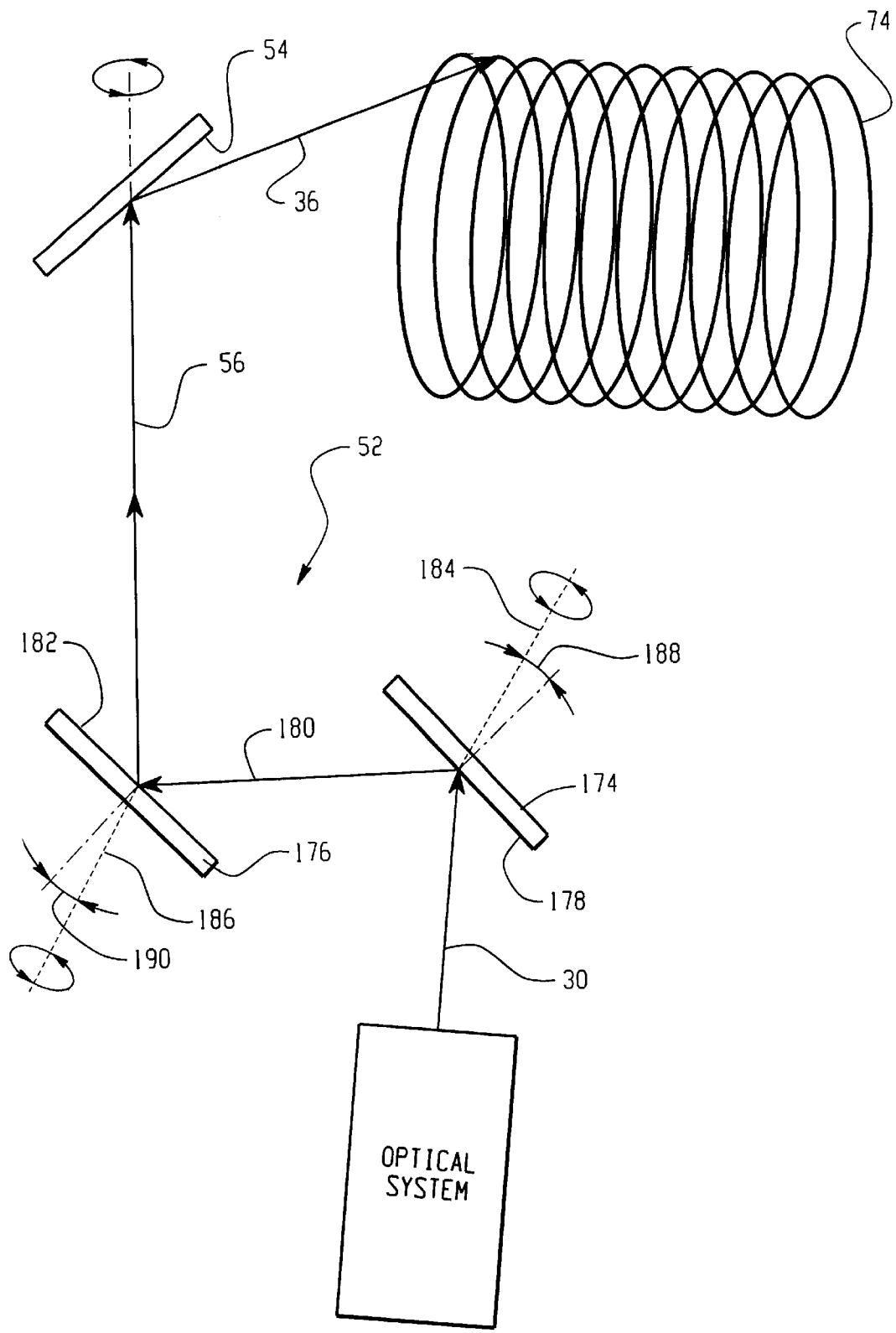
FIG. 9 is a sketch of two rotationally operative optical elements suitable for use in embodiment of FIG. 1 for effecting a variety of beam scan patterns.

In accordance with another aspect of the present invention, the rotationally operative scan optical element 52 may comprise two rotationally operative scan mirrors 174 and 176 configured as fold mirrors with respect to each other as shown in the illustration of FIG. 9 to project a plurality of different output scan patterns of the laser beam along the optical path 56 to the azimuth scan mirror 54 wherein the scan pattern is steered azimuthally through a wide field as described herein above in connection with the embodiment of FIGS. 1–6. A single scan mirror 52 generates the helical pattern 74 when steered across the wide azimuth field as illustrated in FIG. 2. But, this pattern may not be an ideal or a preferred scan pattern for the application at hand. Therefore, it would be desirable to have the option of tailoring an appropriate scan pattern for a particular application or be able to change the pattern due to varying conditions. The dual fold mirror assembly of this aspect of the present invention permits the tailoring of a scan pattern by setting and/or varying the phase, direction and rotational speed of one mirror 174 with respect to the other mirror 176. In the present embodiment, the mirrors 174 and 176 may comprise Palmer or wobble mirror assemblies, each rotationally operative at a predetermined nutation angle, like on the order of 5°, for example. However, it is understood that optical wedge type mirrors may be configured to function just as well without deviating from the broad principles of the present invention.

Figure 10A:
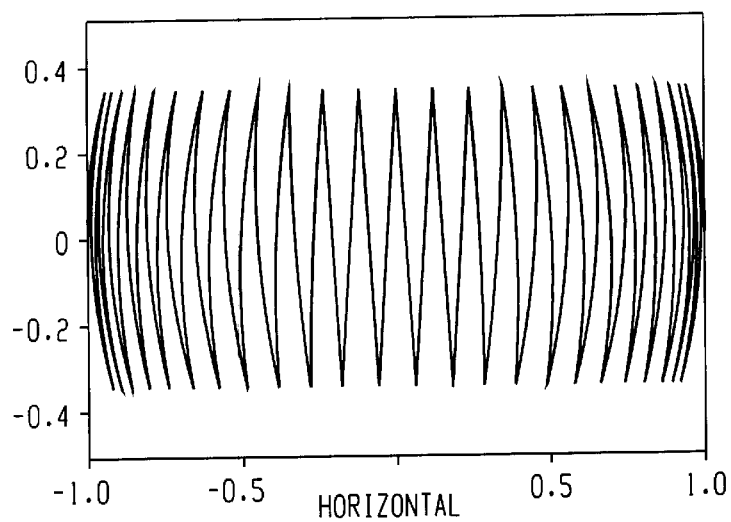
FIGS. 10A–10C are illustrations of exemplary beam scan patterns that may be effected by the rotationally operative optical elements of the embodiment of FIG. 9.
Figure 10B:
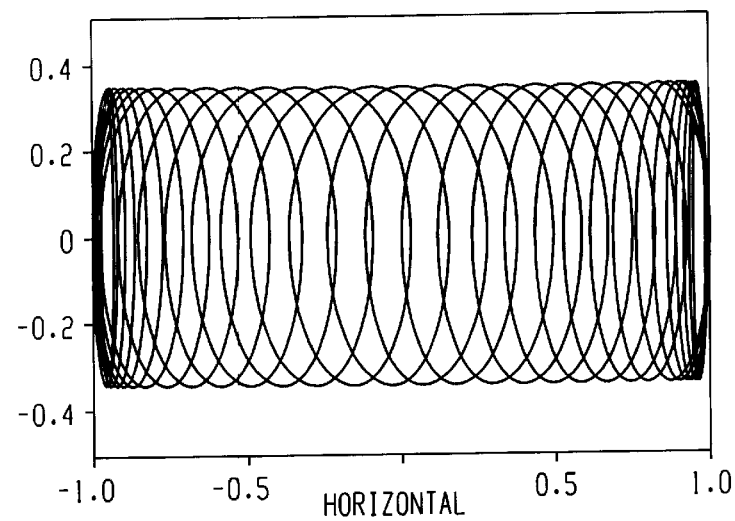
Figure 10C:
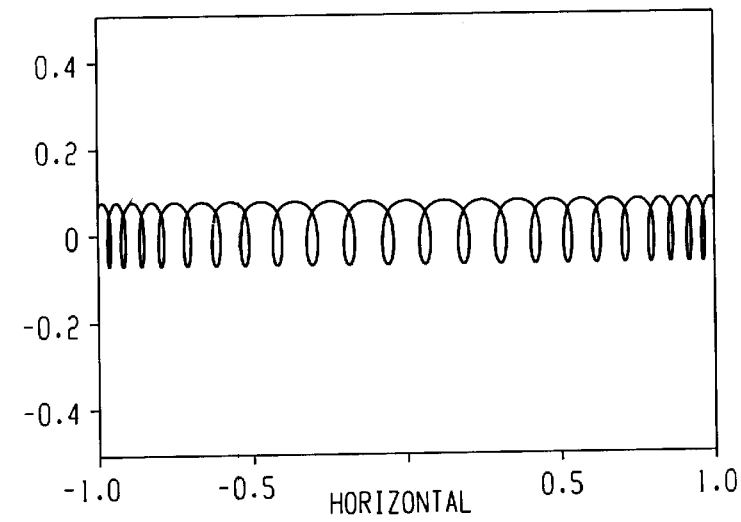
Figure 14A:
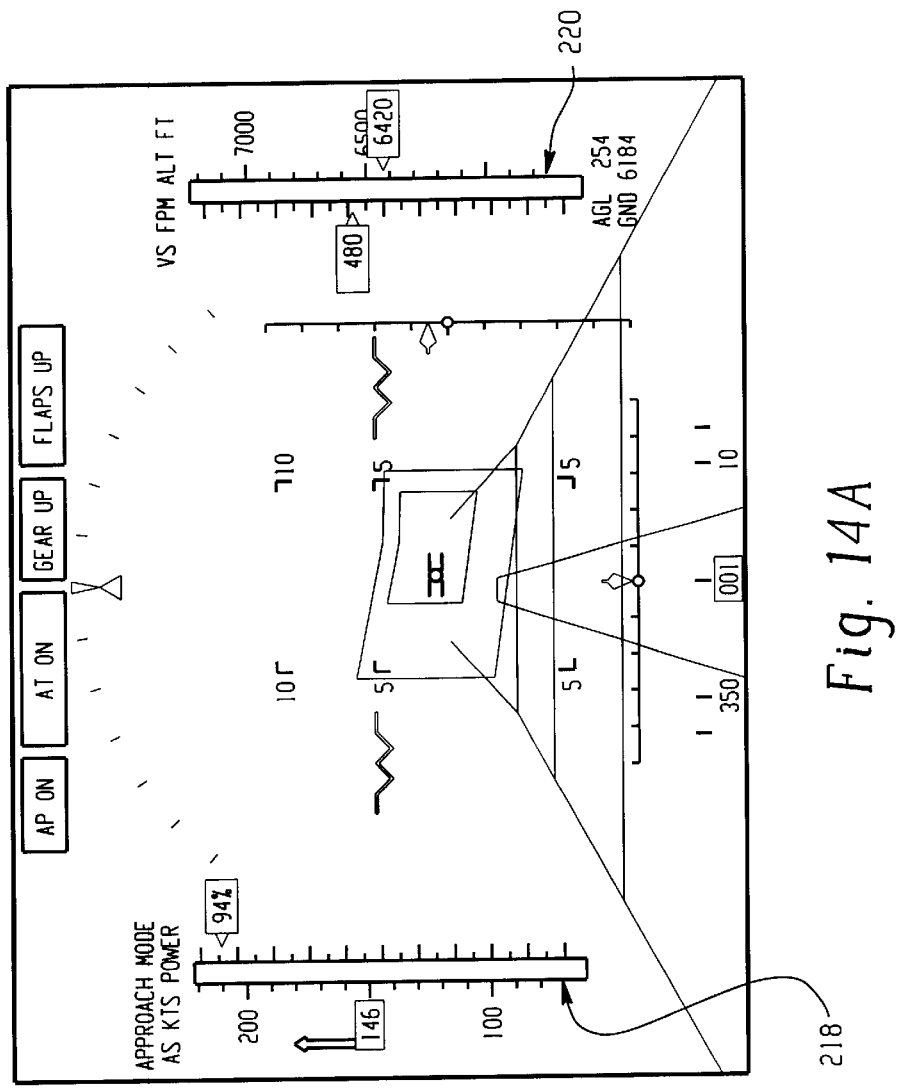

In the illustration of FIG. 9, the rotationally operative mirror 174 is configured for directing the laser beam which is incident to a surface 178 thereof along optical path 30, for example, to the other rotationally operative mirror 176 along an optical path 180 with an intermediate scan pattern. The other rotationally operative mirror 176 is configured for directing the laser beam which is incident to a surface 182 thereof along path 180 to the azimuth scan mirror 54 over path 56 with the desired scan pattern. The mirrors 174 and 176 are adjustably rotationally operative about respective axes of rotation 184 and 186 in speed, direction and phase angle in relation to each other to effect the desired output scan pattern of the plurality of output scan patterns of the laser beam. In the present embodiment, an electric scanner motor may be coupled to each mirror and controlled to rotate each mirror at a predetermined nutation angle (angle 188 for mirror 174, and angle 190 for mirror 176) with the desired speed, direction and phase angle in relation to the other mirror to effect the desired output scan pattern. FIGS. 10A, 10B, and 10C illustrate exemplary scan patterns which may be effected by the rotationally operative mirrors 174 and 176. Other scan patterns are also possible with different combinations of rotations and speeds.

In FIG. 10A, a sawtooth scan pattern is shown generated by the dual mirror assembly embodiment of FIG. 9 by operating mirror 174 at a rotational speed of 50 Hz in a clockwise direction with a nutation angle of 5°, and operating mirror 176 at a rotational speed of 50 Hz in a counter-clockwise direction in relation to mirror 174, with a nutation angle of 5°. In this example, the azimuth steering rate is approximately 360° per second. This scan pattern may be better suited for detecting vertical or horizontal shaped obstacles. In FIG. 10B, a large circular scan pattern is shown generated by the dual mirror assembly embodiment of FIG. 9 by operating mirror 174 at a rotational speed of 50 Hz in a clockwise direction with a nutation angle of 5°, and operating mirror 176 at a rotational speed of 50 Hz also in a clockwise direction, but 180° out of phase to mirror 174, with a nutation angle of 5°. In this example, the azimuth steering rate is approximately 360° per second. Finally, in FIG. 10C, a small circular scan pattern is shown generated by the dual mirror assembly embodiment of FIG. 9 by operating mirror 174 at a rotational speed of 50 Hz in a clockwise direction with a nutation angle of 5°, and operating mirror 176 at a rotational speed of 50 Hz also in a clockwise direction, but with a 22° phase difference to mirror 174, with a nutation angle of 5°. In this example, the azimuth steering rate is also approximately 360° per second. Accordingly, the size of the pattern, as shown by FIGS. 10B and 10C, may be varied by changing the phase angle of one mirror in relation to the other while maintaining the rotational speed substantially fixed. It is also possible to change the density of the pattern in azimuth scan by altering the speed of the azimuth scan mirror. Note that the side edges of the patterns of FIGS. 10A–10C appear somewhat compressed because the pattern is projected onto a flat surface disposed directly in front of the system. The horizontal and vertical units shown in the Figures are normalized to a ±90° azimuth scan and a predetermined target range, respectively.

In accordance with yet another aspect of the present invention, the wide field scanning LOAS embodiment described above in connection with FIGS. 1–6 may be disposed on-board an aircraft, like a helicopter, for example, for use in alerting an operator or pilot of the aircraft of obstacles posing a risk of collision with the aircraft. The processor 88 described above in connection with the embodiment of FIG. 3 determines the location of one or more detected obstacles in range, elevation and azimuth in relation to a flight path of the aircraft and drives the display 154 which may be located in the cockpit of the aircraft, for example, to display to the pilot or an operator an indication representing the one or more obstacles or objects in range, azimuth and elevation. It is understood that the processor 88 may first determine the location of a detected obstacle in relation to the reference axes of the LOAS and then, convert the location to the reference axes of the aircraft. This conversion from one set of reference axes to another will be explained in greater detail herein below.

One embodiment of the display 154 comprises a panel 200 of light indicators 202 as shown by the illustration of FIG. 11. The light indicators 202 of panel 200 may be light emitting diodes (LEDs), for example. In this embodiment, the panel 200 includes at least one row 204 and at least one column 206 of indicators 202. The row 204 may represent a horizontal axis of the flight path of the aircraft and the column 206 may represent an elevation axis thereof. Accordingly, the indicator 208 at the intersection of the row 204 and column 206 represents the line of sight or instantaneous directional path of the aircraft. The light indicators 202 may be controlled to emit light of different colors to indicate the location of the one or more objects in elevation and azimuth in relation to the flight path of the aircraft. A color change from green to yellow to red, for example, may indicate the range of a detected object from the aircraft. In the illustration of FIG. 11, the colors are represented by gray scale. For example, a blackened indicator 210 is indicative of red and indicates that the detected object represented thereby is close in range to the aircraft, but below the aircraft. A gray indicator 212, for example, may represent a detected object at mid range to the aircraft, but substantially off to the left thereof. Those indicators 202 which are not lit or are only slightly gray (green) represent no detected objects of detected objects far in range from the aircraft, respectively. A change in color of an indicator on the panel 200 may also indicate to the operator the risk of a collision of one or more detected obstacles with the aircraft.

Another embodiment of the display 154 comprises a multi-functional video display (MFD), an exemplary screen of which being illustrated in FIG. 12. The screen of the MFD may display a forward looking view, like the view shown in FIG. 12, for example, obtained from a video or forward looking infrared (FLIR) camera or radar unit (not shown) mounted to the front of the aircraft. Generally, radar and video or FLIR cameras have a relatively narrow field of view, on the order of ±thirty degrees (±30°) in azimuth from the flight path of the aircraft, for example. Accordingly, the operator may view only those obstacles in the field of view of the camera to ascertain risks from obstacles in the aircraft's path. Note that in the screen of FIG. 12, the MFD displays a wire stretching horizontally across the path of the aircraft shown by the dotted line 216 which may change in color according to the detected range thereof. Note also that a variety of information obtained from sensors on the aircraft or received from uplinked transmissions to the aircraft is displayed on the screen of FIG. 12 through use of overlay or image integration technology which is well known to all those skilled in the pertinent art. An exemplary MFD for use in the present embodiment is manufactured by Goodrich Avionics Systems, Inc. under the tradename of SmartDeck™ display. These type of MFDs display such information as aircraft velocity, i.e speed and heading, altitude, above ground level (AGL) readings, aircraft power levels and the like.

The present invention enhances the situational awareness of the pilot or operator of the aircraft by displaying the locations of detected obstacles in relation to the aircraft outside of the azimuth field of view of the display screen of the MFD. It does this by overlaying an image in the form of at least one vertical bar 218 onto the screen image of the MFD for representing one or more detected objects and the locations thereof. In the present embodiment, one vertical image bar 218 is overlaid to the far left of the screen image and another vertical image bar 220 is overlaid to the far right of the screen image. Each bar 218 and 220 is split into two areas, one area 222 above the center line of the display screen, which is representative of the current altitude of the aircraft, and the other area 224 below the center line. Each bar 218 and 220 is controlled to light upon the detection of an object azimuthally outside of the field of view of the MFD starting at the bottom area 222 with a color indicative of the range to the detected object. In the present embodiment, the LOAS may have a field of regard of 50 meters to 1 kilometer in range, ±90° in azimuth and ±10° in elevation, for example.

For example, as an object is first detected at a range far from the aircraft, but azimuthally outside the field of view of the MFD, the bottom of the corresponding bar 218 or 220 becomes lit with a green color indicting the elevation of the object is determined to be optically below the altitude of the aircraft and at a far range thereto. As the aircraft approaches the detected obstacle, the image bar will change in color, like from green to yellow, for example, to indicate a change in the range thereof and also may grow vertically in size if the elevation of the obstacle is determined to be optically closer to the altitude of the aircraft. And, as the detected obstacle becomes very close to the aircraft in range, the color of the corresponding image bar will change from yellow to red, for example, and if the obstacle is determined to be above the altitude of the aircraft, the colored portion of the image bar will extend above the center line of the display screen in the portion 224 thereof. In this manner, the pilot or operator will be alerted to detected obstacles outside of the azimuth filed of view of the MFD and their locations in range(color) and elevation (height of bar) in relation to the aircraft.

FIGS. 13A–13E are plan view illustrations in time progression (time slices) of a helicopter 228 containing a wide field scanning LOAS similar in type to the foregoing described embodiments and including an MFD like the type described in connection with FIG. 12, for example, approaching an electrical power line 230 supported by poles 232 and a 200 meter radio tower 234 and connecting support lines 236. Circled lines 238, 240 and 242 are representative of ranges 200 meters, 400 meters and 600 meters, respectively, from the aircraft 228 which is heading in the direction of the arrow 244. The field of view of the MFD is shown by the wedged area 246 and may be on the order of ±15° in relation to the flight heading 244 of the aircraft. Exemplary MFD screen displays of the time progression illustrations of FIGS. 13A–13E are shown in FIGS. 14A–14E, respectively.

Figure 13A:
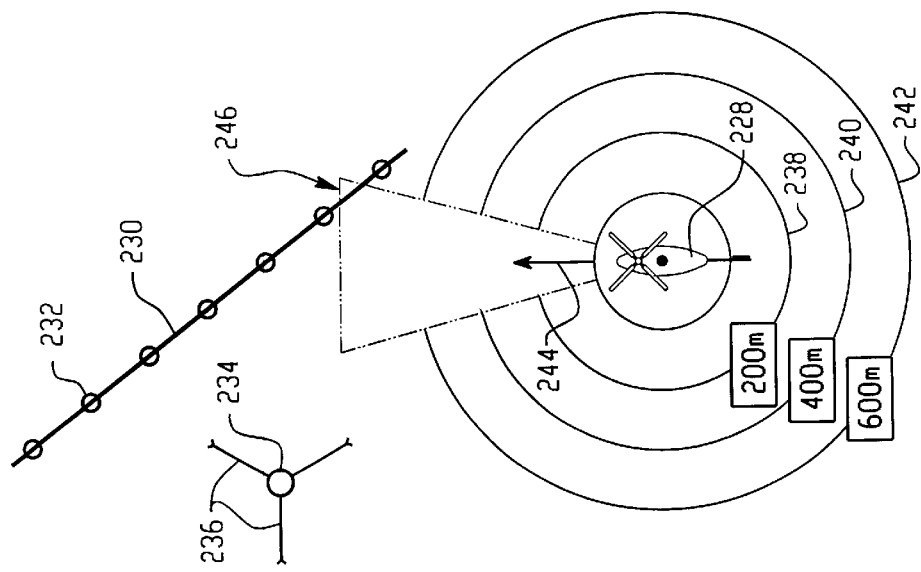
Figure 14B:
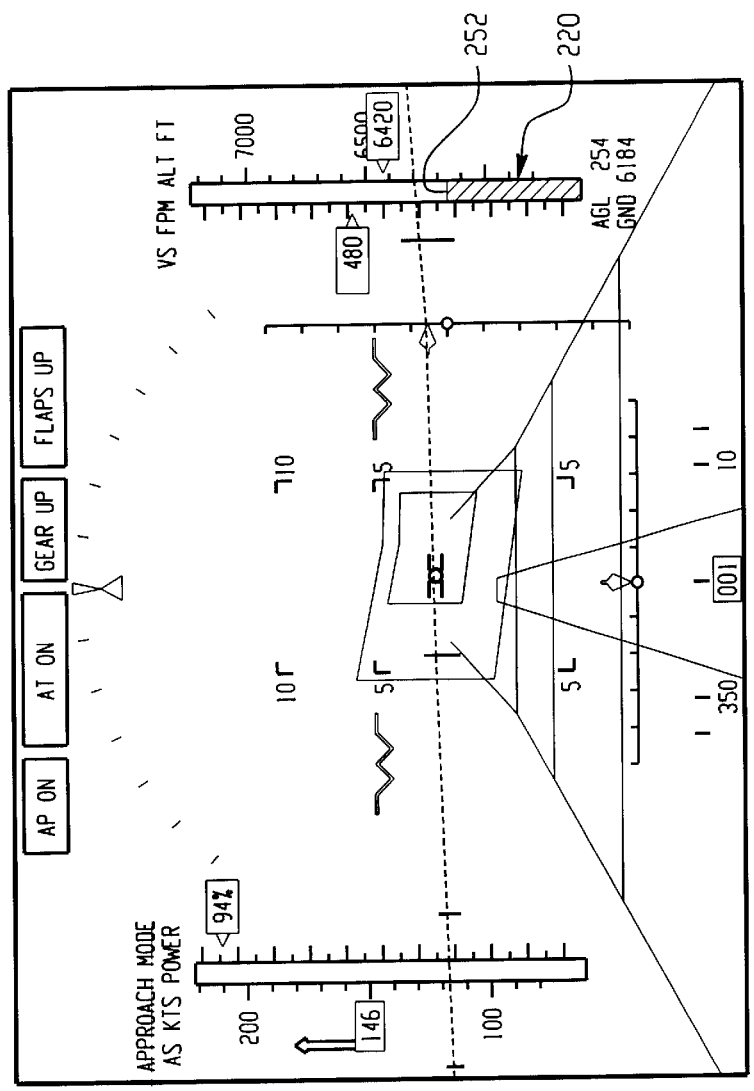
Figure 13B:
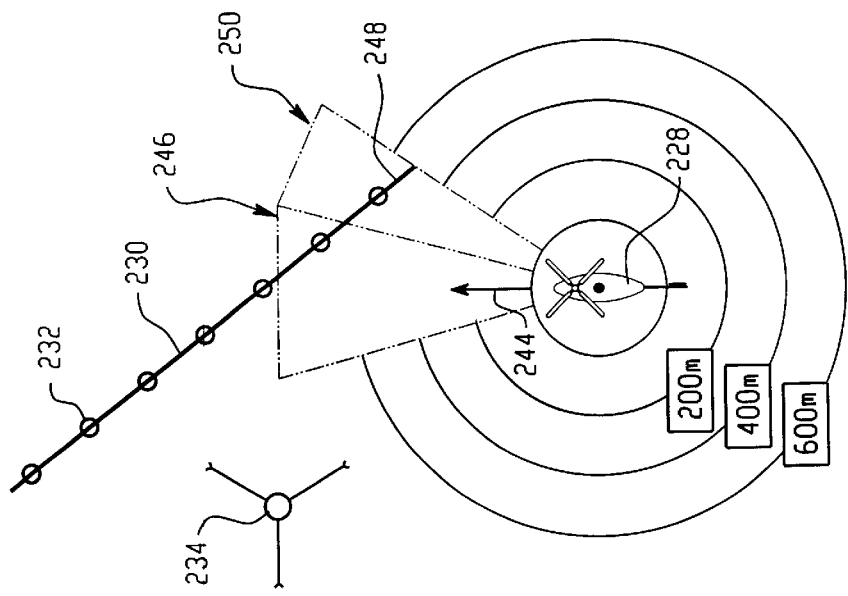

Referring to FIG. 13A, which is the first illustration in time, the aircraft 228 is shown at a range of greater than 600 meters from both of the power line and tower obstacles 230 and 234, respectively. Accordingly, since the power line 230 is partially within the field of view (FOV) of the MFD, it is displayed as an overlaid dotted line in the screen of FIG. 14A. But, since the obstacles 230 and 234 are outside of the 600 meter range, the vertical bar images 218 and 220 are not lit. The 600 meter range is set by design choice for the present example, and it is understood that this range may vary according the specific application at hand. In the next time slice as shown in FIG. 13B, the helicopter has moved closer to the power line 230, poles 232 and tower 234 and a portion 248 of the power line 230 and poles 232 is within the 600 meter range of the LOAS, albeit outside of the azimuth FOV 246 of the MFD. The obstacles 248 are detectable within an azimuth sector 250 of the wide field scanning LOAS of the aircraft 228 and thus, are displayed in the vertical bar 220 with a color green, for example, and at a height 252 indicative of the determined elevation thereof which is shown in the exemplary screen display of FIG. 14B. In the present example, the color green illustrated by light gray is indicative of a range of a detected obstacle between 400 and 600 meters. Note that the height 252 of the lit vertical bar 220 is below the center line of the screen indicating to the operator that the obstacle is below the altitude of the aircraft 228.

In the time slice of FIG. 13C, the aircraft 228 has moved closer to the obstacles to the point where a portion 254 of the power line and poles are within a range between 200 and 400 meters in azimuth sectors 250 and 256. Upon detection by the LOAS of the aircraft 228, the vertical image bar 220 as shown in FIG. 14C displays a green portion (white or light gray) 252 representing the portion 248 of the power line and poles falling between 400 and 600 meters in range, and a yellow portion (darker gray) 258 representing the portion 254 of the power line and poles falling between 200 and 400 meters in range. The height 260 of the vertical bar image 220 of the screen of FIG. 14C reflects the elevation of the detected obstacles in relation to the altitude of the aircraft, i.e. center line of the screen. Note that the obstacle portion 254 is outside of the azimuth FOV 246 of the MFD and would not be observed by the pilot without the aid of the LOAS and its vertical bar image overlay 220 onto the screen image of the MFD. Note also that the LOAS of the aircraft 228 detects the tower 234 in an azimuth sector 262 outside of the FOV 246 and lights the vertical bar image 218 as an indication thereof, albeit beyond the 600 meter range.

Figure 14D:
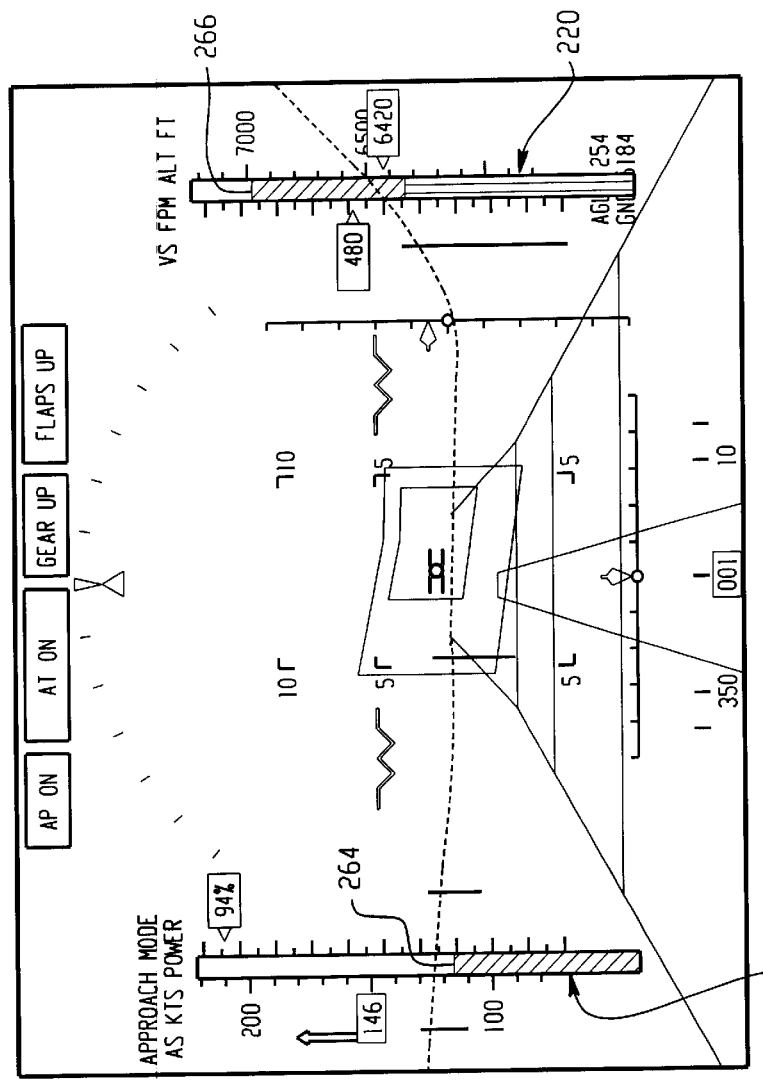
Figure 13D:
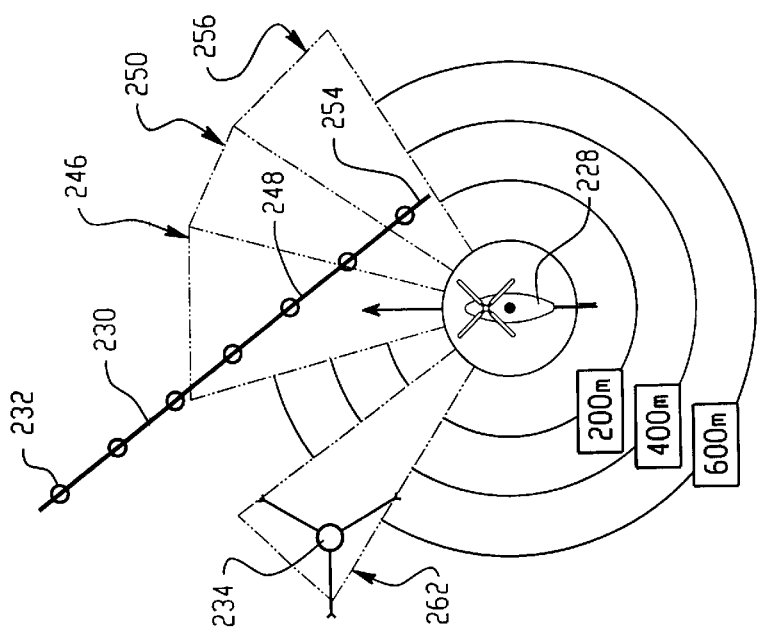
Figure 14E:
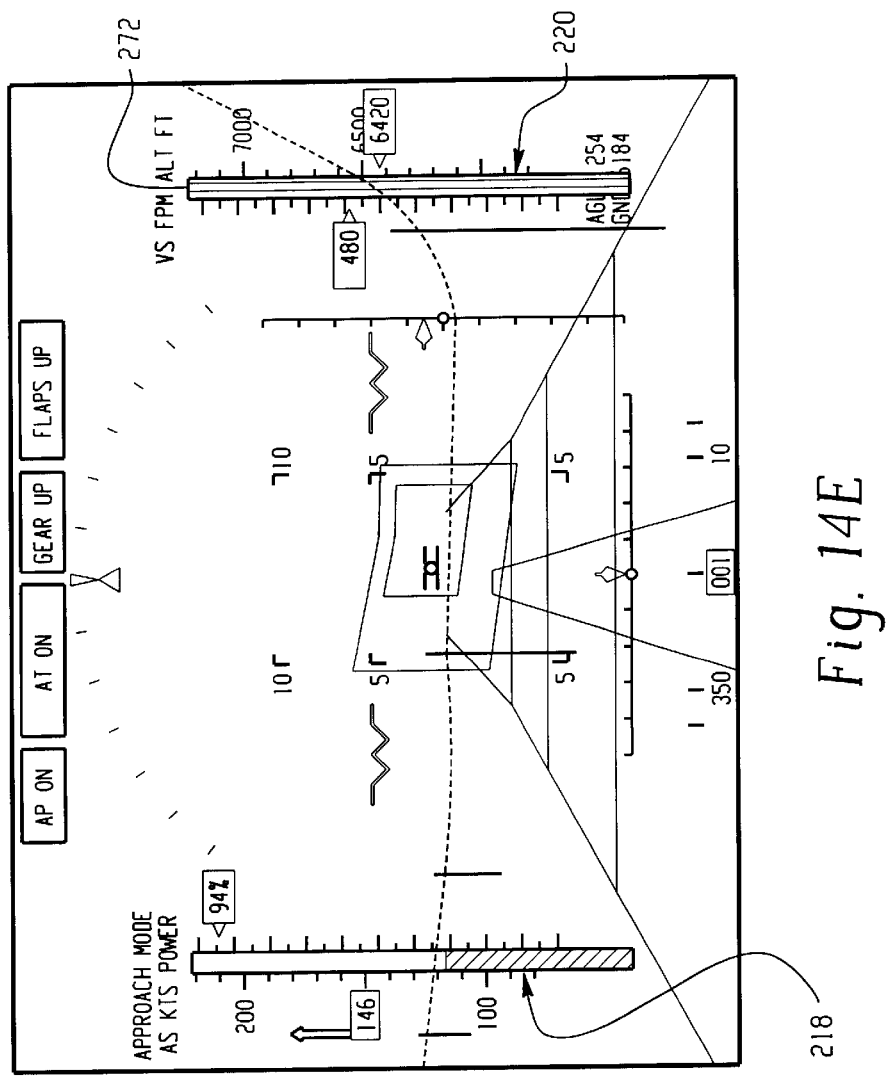
Figure 13E:
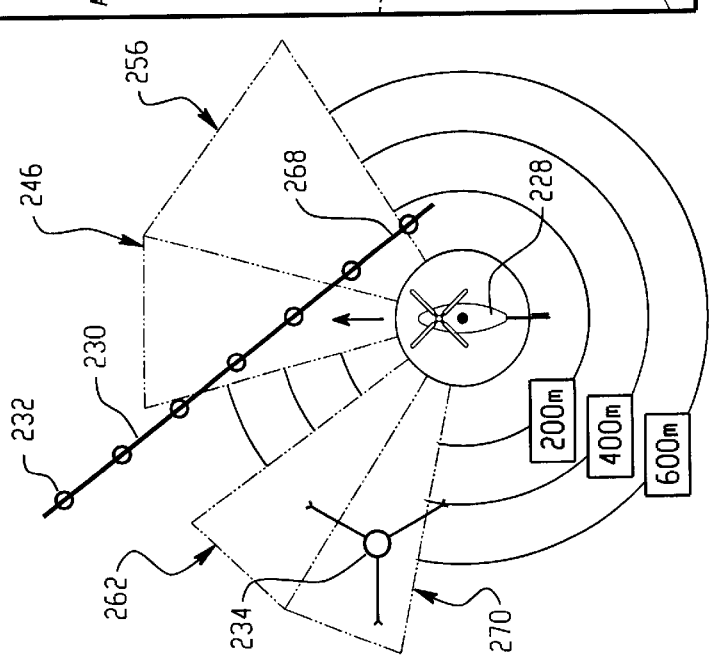

In the time slice of FIG. 13D, the aircraft has moved closer to the power line 230 and tower 234 and indicates this to the operator through the vertical bar images overlays 218 and 220 as shown by the screen of corresponding FIG. 14D. Note that the vertical bar image 218 has increased to the height 264 indicating that the obstacle is at an elevation close to the altitude of the aircraft 228 although more than 600 meters in range. Also, the vertical bar image 220 has increased to a height 266 beyond the center line of the display to indicate that the detected obstacles in azimuth sectors 256 and 250 are at an elevation above the altitude of the aircraft and the risk of a collision with such obstacles has increased. In the time slice of FIG. 13E, the aircraft 228 has moved even closer to the power line 230, a portion 268 of which now detected by the LOAS of the aircraft to be within 200 meters in range. In response, the LOAS lights the vertical bar image 220 with a red color (illustrated by dark gray) at a height 272 well beyond the center line of the screen. This indicates to the pilot that the power line is within 200 meters and at the altitude of the aircraft. In other words, collision of the aircraft 228 with the portion 268 of the power line is imminent unless immediate evasive action is taken. On the other hand, the LOAS of the aircraft also detects the tower 234 in an azimuth sector 270 within 600 meters in range of the aircraft and indicates through the lighting of the vertical bar image 218, its range by color and elevation by height. Note that the vertical bar image 218 depicts the detected elevation of the tower 234 approximately at the altitude of the aircraft, represented by the center line of the screen. So, the pilot is also aware of the tower 234 and its range and elevation and can avoid it in the evasive action taken to avoid the power line portion 268.

Therefore, the foregoing description of FIGS. 13A–13E and 14A–14E illustrate by way of example the operation of the wide field scanning LOAS in use on-board an aircraft and the enhanced situational awareness it provides to the pilot and/or operator in the form of a dynamically changing display that extends beyond the visual field of view or a field of view of an MFD of the aircraft. Without the aid of the LOAS on-board the aircraft and the displayed overlaid images of detected obstacles and their locations with respect to the flight path and altitude of the aircraft, the pilot and/or operator of the aircraft may not be made aware of the risk of imminent collision of the aircraft with such obstacles and collision may not be otherwise avoided.

While the wide field scanning LOAS described above provides an enhanced awareness to the operator, the ability to avoid a detected obstacle in the flight path of the aircraft may be further improved knowing the wind conditions around the aircraft as well. So, combining a wide field scanning LOAS for detecting obstacles in the vicinity of the aircraft with a laser air data system, like a light detection and ranging (LIDAR) system, for example, for measuring the wind velocity at points around the aircraft and particularly, at the detected obstacle or at a launch point of a weapon for a military platform is desirable. A suitable embodiment of such a combined system is shown in the block diagram schematic of FIG. 15.

Figure 15:
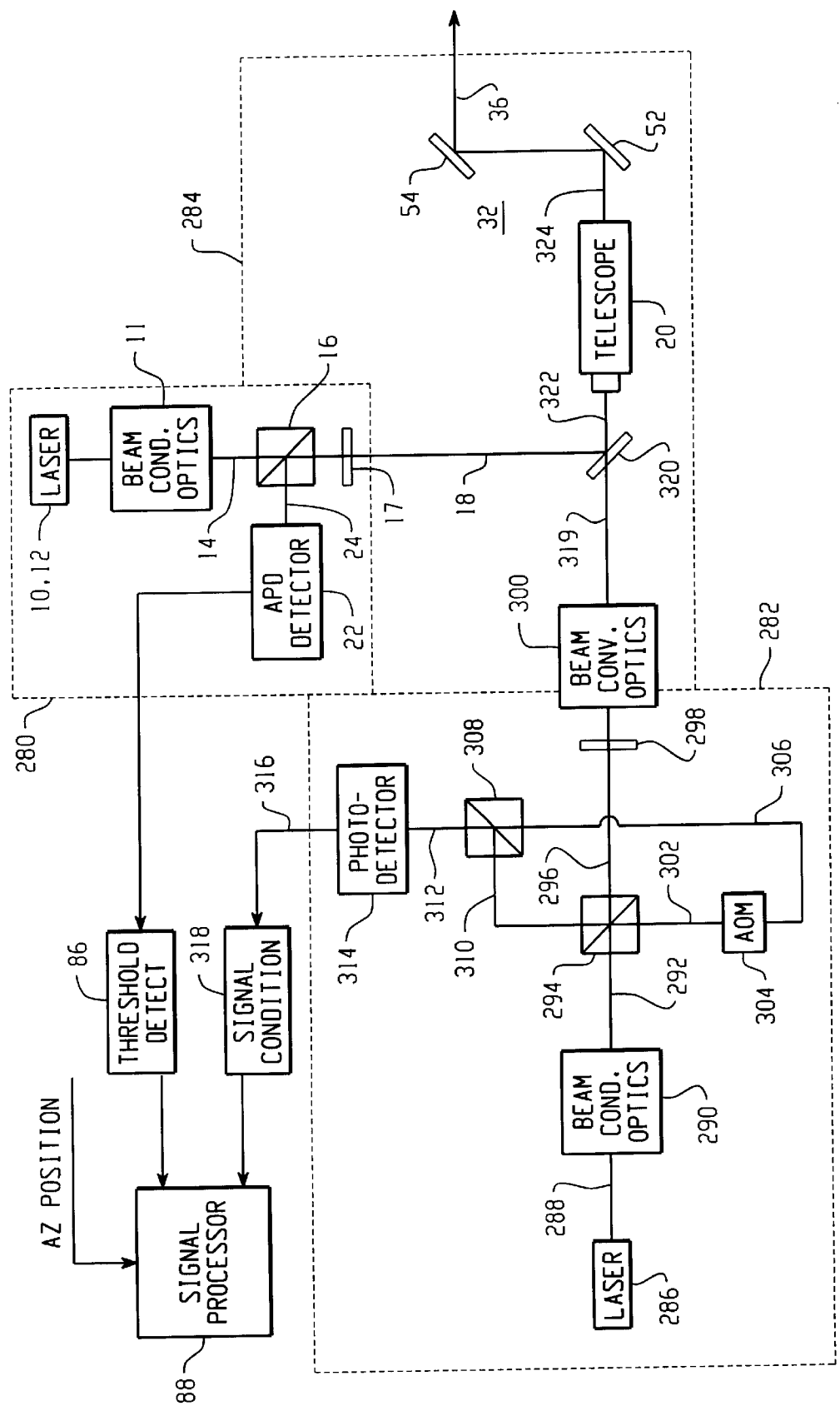
FIG. 15 is a block diagram schematic of a combined LOAS and LIDAR system suitable for embodying another aspect of the present invention.

Referring to FIG. 15, the pulsed laser beam transmitting and receiving optical elements of a LOAS is shown in the dashed line enclosed block 280, the continuous wave (CW) laser beam transmitting and receiving optical elements of a LIDAR system is shown in the dashed line enclosed block 282, optical elements common to the LOAS and LIDAR systems 280 and 282 are shown in the dashed line block 284. Like reference numerals will be used for those elements already described in connection with the LOAS embodiment of FIGS. 1–6 herein above. For example, in block 280, a pulsed laser source of the present embodiment may comprise the elements of the laser driver 10 and laser diode 12. Beam conditioning optics for collimating and expanding the generated pulsed laser beam width along optical path 14 is shown by block 11. Beam splitter 16 and the quarter wavelength plate 17 pass the pulsed laser beam along path 18 with a circular polarization. A portion of the generated pulsed laser beam is reflected by the splitter 16 over path 24 to the light detector 22 which may be an APD, for example. The electrical signals generated by the light detector 22 are provided to the threshold detector or comparator circuit 86 which is coupled to the processor 88. Azimuth position data may be provided to the processor 88 in a similar manner as that described for the embodiment depicted by FIG. 3, for example.

In the LIDAR block or module of elements 282, a laser source 286 is controlled to generate a linearly polarized CW laser beam at a wavelength substantially different from wavelength of the pulsed laser beam of the LOAS elements 280. The LIDAR generated laser beam may be at one wavelength in the range of 850 to 1550 nanometers, for example, and the LOAS laser beam may be at a different wavelength in the range of 850–1550 nanometers, for example. However, it is understood that other wavelength ranges may work just as well and the present invention is not limited to any specific wavelength or wavelength range. The CW laser beam is generated along an optical path 288 to beam conditioning optics 290 which collimate and expand the CW beam before passing it along an optical path to a polarizing beam splitter 294. Most of the linearly polarized light is passed by the beam splitter 294 along path 296 to a one-quarter wavelength (λ/4) plate 298 which converts the linearly polarized light to circularly polarized light before passing the beam along an optical path to beam converging optics 300. Back at polarizing beam splitter 294, a small portion, like on the order of 2% or so, of the generated CW beam is reflected along an optical path 302 to an acousto-optical modulator (AOM) 304 which shifts the frequency of the reflected beam by a predetermined frequency which may be on the order of 80 MHz, for example. The reason for this frequency shift is to avoid a directional measurement ambiguity as a result of the heterodyning operation which will become more evident from the following description. The frequency shifted beam exiting the AOM 304 is optically guided along an optical path 306 by one or more optical elements to another polarizing beam splitter 308.

Reflected light from an aerosol particle, for example, at a predetermined distance from the combined system is returned through optics 300, the λ/4 plate 298, and along optical path 296 to the beam splitter 294 wherein it is reflected along an optical path 310 to the beam splitter 308. The returned beam is combined, i.e. heterodyned, with the transmitted (shifted frequency) beam portion in the beam splitter 308 to effect a light beam with a Doppler frequency content caused by the reflection off of the particle in space. In the present embodiment, if the returned beam is unshifted in Doppler frequency, the heterodyning will result in a combined light beam signal at the center frequency for heterodyne processing which may be set at 80 MHz, for example. Thus, if the returned beam is Doppler shifted, the heterodyning process will result in a combined beam with Doppler frequency content of either greater than or less than 80 MHz. In this way, the process will not be confused by negative Doppler frequency shifts caused by receding targets, which are indistinguishable from the positive Doppler frequency shifts caused by approaching targets if the heterodyning light beam is unshifted in frequency. The combined beam with the Doppler frequency content is guided along an optical path 312 to a light detector 314 which may be a photodiode, for example. The photodiode 314 converts the combined light beam into a time varying analog electrical signal 316 which is passed on to the processor 88 via signal conditioning circuit 318. If the processor 88 is a digital signal processor, the time varying analog signal 316 may be digitized by the signal conditioning circuit 318 according to a predetermined sampled data rate for processing by the processor 88.

The beam converging optics 300 may be a variable laser air data range module which includes a group of focusing elements that permits adjustably setting the focal point for the LIDAR generated beam at a spot in space which may vary from say 5 meters to 20 meters, for example, from the system. This focal spot is space is where the beam reflections from one or more particles flowing in space are concentrated: In one embodiment, the optics 300 includes the selection of a particular focusing lens to effect the desired distance to the focal spot in space. Each different lens will provide for focusing to a spot in space a discrete predetermined distance or range from the system. This lens selection process may be performed manually by.plugging in the desired focusing lens or electro-mechanically by apparatus comprising a mechanical carousel having different lens, for example, which carousel may be controlled to rotate to the selected focusing lens. In another embodiment, the optics 300 may include a lens which is electronically controlled to change its focusing characteristics to effect the desired range of the focal spot in space.

In the common optical elements block or module 284, the coherent CW light beam exiting the optics 300 is guided along an optical path 319 to a dichroic filter optical element 320. The pulsed coherent light beam along optical path 18 is also guided to the dichroic filter 320. With proper alignment, the two coherent light beams of different wavelengths may be guided to the dichroic filter 320 such that one is reflected and the other is passed along a common optical path 322 towards the entrance aperture of the beam expander or telescope 20 which is aligned to accept and expand the two coherent beams and exit the expanded coherent beams along another common optical path 324 at an output thereof. The expanded coherent beams are guided along common path 324 to be incident upon the at least one optical element 32 as described in connection with the embodiment of FIG. 1. The at least one optical element 32 in turn directs the two beams from the system into space. Reflections of the CW coherent beam from particles at the focal spot and reflections of the pulsed coherent beam from obstacles are all returned to the at least one optical element 32 which receives such reflections and directs them along path 324 back to the beam expander 20 wherein they are focused to a focal point of the beam expander 20 along path 322. The dichroic filter 320 may be disposed in the vicinity of the focal point of the beam expander 20 along path 322 to receive the focused reflections and separate the focused light reflections corresponding to the pulsed coherent beam from the focused light reflections corresponding to the CW coherent beam based on the different wavelengths thereof.

Separated light reflections corresponding to the pulsed coherent beam are directed back to the LOAS module 280 along path 18 for use in detecting one or more objects as described in connection with the embodiments of FIGS. 1–6, for example. In addition, separated light reflections corresponding to the CW coherent beam are directed back to the LIDAR module 282 along path 319 for determining flow velocity as will be more fully described. As has been described supra, the at least one optical element 32 comprises at least one common rotationally operated optical element which may direct both of the CW and pulsed coherent beams incident thereon from the system, the CW beam being directed from the system with a first predetermined pattern and the pulsed beam being directed from the system with a second predetermined pattern. In the embodiment described above in connection with FIGS. 1–6, the at least one rotationally operative element 32 comprises optical elements 52 and 54 which together may be configured and rotationally operated to direct both of the CW and pulsed coherent beams substantially colinearly from the system along path 36 with the azimuthally steered, conical beam pattern that is depicted in FIG. 2. In this manner, the first and second patterns will be substantially the same and directed substantially to common azimuth positions in the azimuthal scan . An embodiment for directing the two coherent beams from the system with different first and second patterns will be described herein below.

Separated light reflections that are guided along path 319 back to the LIDAR module 282 will pass through the beam converging optics 300 to the λ/4 plate 298 wherein the circularly polarized light is converted back to linearly polarized light and passed on to the beam splitter 294 over path 296. However, since the circular polarization direction of the transmitted beam is reversed upon reflection from a particle, the converted linear polarization state of the reflected light will be at right angles to the linear polarization state of the transmitted beam. Accordingly, instead of being passed by the beam splitter 294, the returned light reflections will be reflected along path 310 and heterodyned with the transmitted beam (shifted in frequency) in splitter 308 as has been described herein above. The processor 88 may compute the flow velocity in the vicinity of the aircraft at various azimuth positions from the time varying electrical burst signals converted by the light detector 314 using Doppler signal processing, like Fast Fourier Transform (FFT) processing, for example, which is well-known to all those skilled in the pertinent art. The flow velocity may be computed in one or more axes as will become more evident from the description found herein below. Azimuth position may also be determined by the processor 88 from inputs of azimuth determining apparatus as described in connection with the embodiment of FIG. 3, for example. Accordingly, flow velocity may be correlated with azimuth position in the processor 88. And, since the light reflections of the CW beam and the pulsed beam are at common azimuth positions in the present embodiment, flow velocity may be computed at the azimuth position of a detected obstacle as well as in other azimuth positions.

Figure 16:
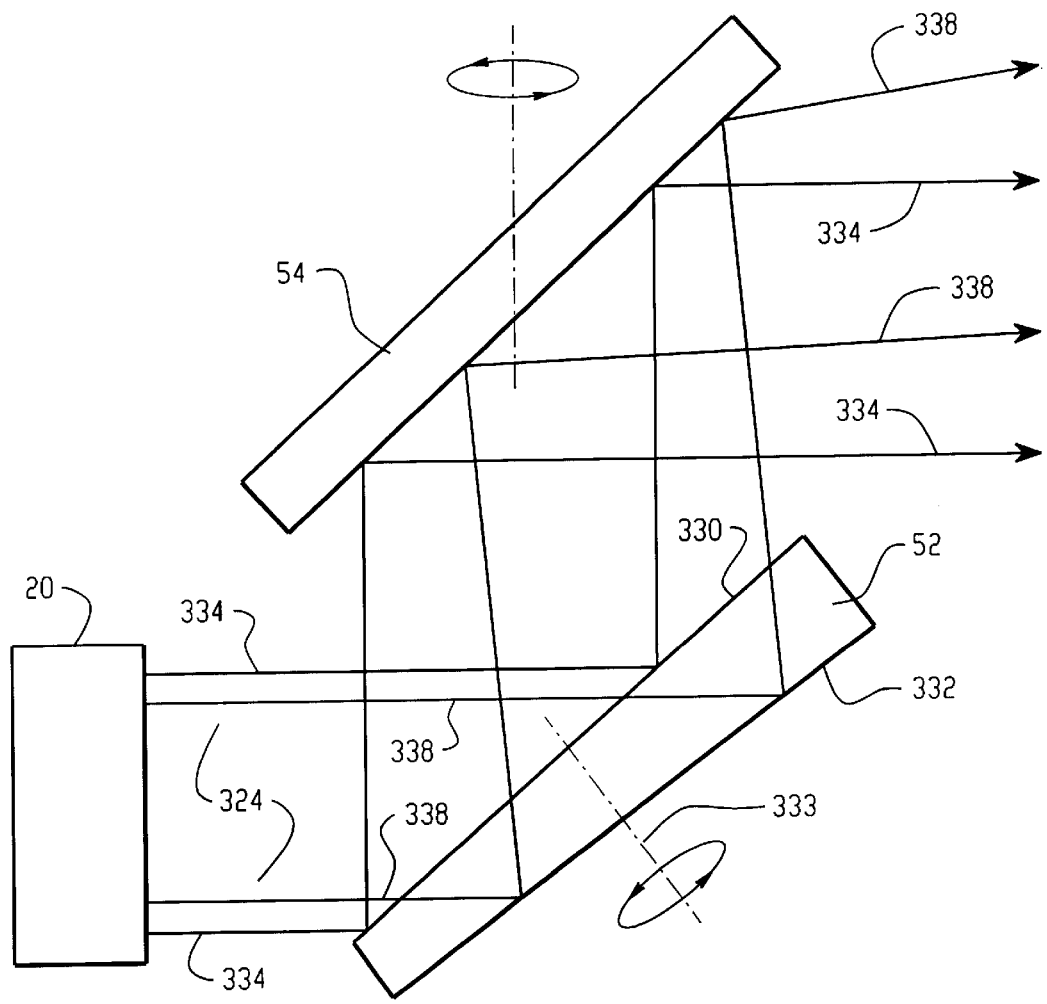
FIG. 16 is a sketch of a rotationally operative optical element suitable for use in the embodiment of FIG. 15 for directing two beams from the combined system with different predetermined scan patterns.
Figure 16A:
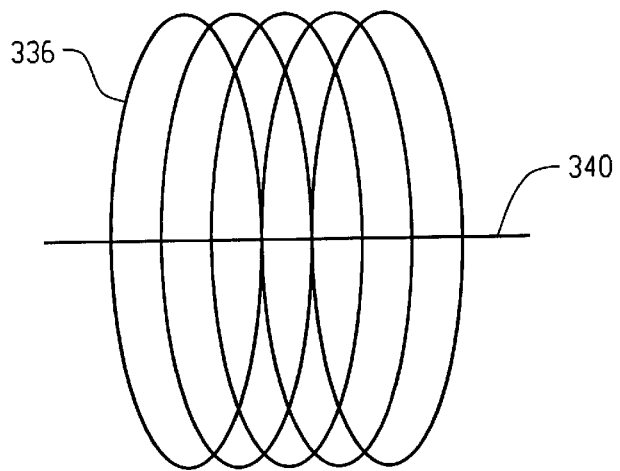

In some applications, having the CW beam and pulsed beam directed from the system colinearly with substantially the same predetermined pattern is not desirable, particularly where single dimensional flow velocity will suffice. An exemplary embodiment for directing the two beams from the system with different predetermined patterns is shown in the illustrations of FIGS. 16 and 16A. In the embodiment exemplified in FIG. 16, the rotational operative optical element 52 comprises a dichroic wedge optical element including a wedged surface 330 and a flat surface 332. The optical element 52 may be rotated about an axis normal to the flat surface 332 shown by the dashed line 333. The wedged surface 330 may be coated with a dichroic coating which has the characteristics of passing light substantially at the wavelength of the CW beam and reflecting light substantially at the wavelength of the pulsed beam, for example. And, the flat surface 332 may be coated with a reflective coating, like gold or silver, for example, which reflects light substantially at the wavelength of the CW beam. Referring to FIG. 16, the pulsed beam exiting from the beam expander 20 along path 324 illustrated by the rays 334 is reflected from the wedged surface 330 of the optical element 52 with a conical pattern towards the mirrored optical element 54 which steers the conical pattern of the pulsed beam azimuthally to effect a helical-like pattern such as the pattern 336 shown in FIG. 16A. In addition, the CW beam exiting from the beam expander 20 along path 324 illustrated by the rays 338 is passed through the wedged surface 330 of the optical element 52 to the flat surface 332 where it is reflected towards the element 54. Note that no pattern is imparted to the CW beam because the reflective surface is flat and the optical element 52 is being rotated about an axis normal to the flat surface 332. Therefore, the optical element 54 will reflect and steer the CW beam in a line pattern through an azimuthal scan like the pattern 340 shown in FIG. 16A, for example. In this manner, the CW beam and pulsed beam may be directed from the combined system with two different patterns steered azimuthally.

While the foregoing described embodiment of FIG. 16 describes the optical element 52 as including a wedged optical element, it is understood that other optical elements may be used to serve substantially the same function. For example, a dichroic wobble mirror may be used as optical element 52 for reflecting light of one wavelength from one surface thereof and directing light of another wavelength from another surface thereof. Accordingly, there are a variety of other similar optical elements or combinations of optical elements that could be used as the element 52 just as well as the ones described to impart different predetermined patterns for the CW and pulsed beams.(*) It is further understood that even a single rotationally operated optical element, wedged or otherwise, may be rotated and steered azimuthally to impart the different predetermined patterns to the CW and pulsed beams without deviating from the broad principles of the present invention.

Figure 17:
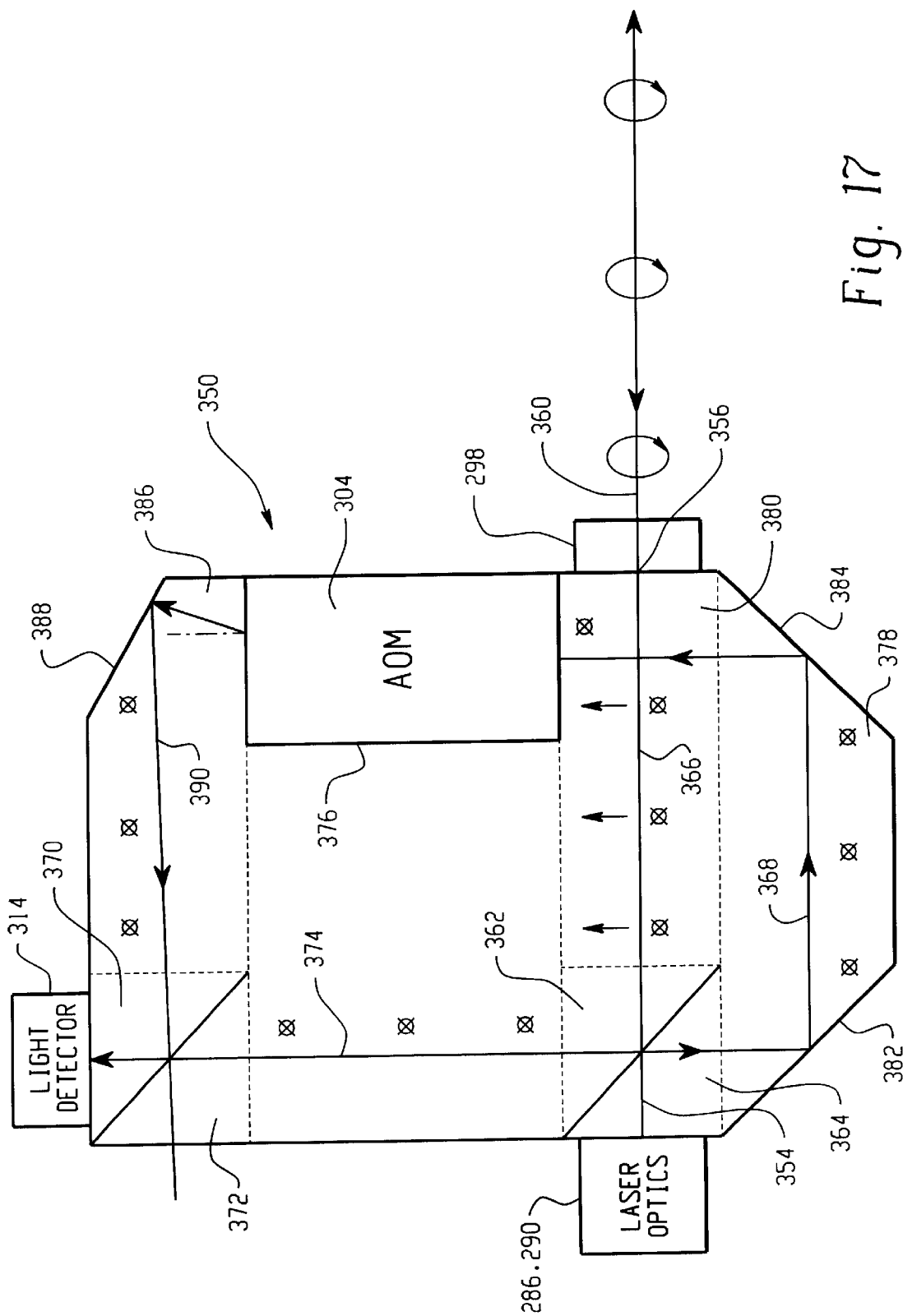
FIG. 17 is a sketch of a block arrangement of optical elements of a LIDAR system suitable for embodying another aspect of the present invention.

In accordance with yet another aspect of the present invention, the optical elements of the LIDAR module 282 may be configured in a block arrangement 350 such as illustrated in FIG. 17, for example. Referring to the embodiment of FIG. 17, the block 350 is comprised of a plurality of glass modules, delineated by dashed lines, which are aligned together to form a plurality of optical paths in the block and secured together to maintain the alignment. The collimated light source 286, which may comprise the laser diode 286 and beam conditioning optics 290 (see FIG. 15), for example, may be secured to the block 350 for generating a coherent beam of light over at least one optical path 354 in the block 350 which guides the coherent beam of light to an exit point 356 thereof. The light detector 314 is also secured to the block 350 which is operative to receive the return coherent beam of light over an optical path 360 and configured to conduct the return coherent beam to the light detector 314 over at lest one other optical path formed therein. Accordingly, the block 350 may be disposed in a LIDAR system on-board an aircraft as a whole and endure the shock and vibration environment of the aircraft without substantial loss of alignment or at least reduce the number of realignments over its lifetime. Thus, once the optical elements are secured in place, the alignment between the optical elements of block 350 should be maintained.

Referring to FIG. 17, two of the glass modules 362 and 364 of the plurality are secured together, preferably by cementing, to form the beam splitter 294 (see FIG. 15) that is disposed in the optical path 354 for passing light in a first polarization state along an optical path 366 to exit the block at point 356 and reflecting light in a second polarization state along an optical path 368. The quarter wavelength plate 298 may be secured, preferably by cementing, to the block 350 at the exit point 356 for converting the polarization of the exiting beam over path 360. The beam splitter 294 is also formed in the path 366 of the return coherent beam of light. Another pair of glass modules 370 and 372 of the plurality are secured together, preferably by cementing, to form the beam splitter 308 that is formed in an optical path 374 of the return beam. The AOM 304 is disposed in a cavity 376 and secured in place, preferably by cementing. Another module 378 of the plurality comprises a dove prism which is cemented to at least one other module 380 of the plurality to form the optical path 368 that guides the light reflected from the beam splitter 294 to the AOM. The dove prism 378 includes polished surfaces 382 and 384 for forming the optical path 368 by internal light reflections. Light exiting the AOM enters another glass module 386 which has a polished surface 388 for reflecting the light exiting the AOM along an optical path 390 to the beam splitter 308.

Figure 18:
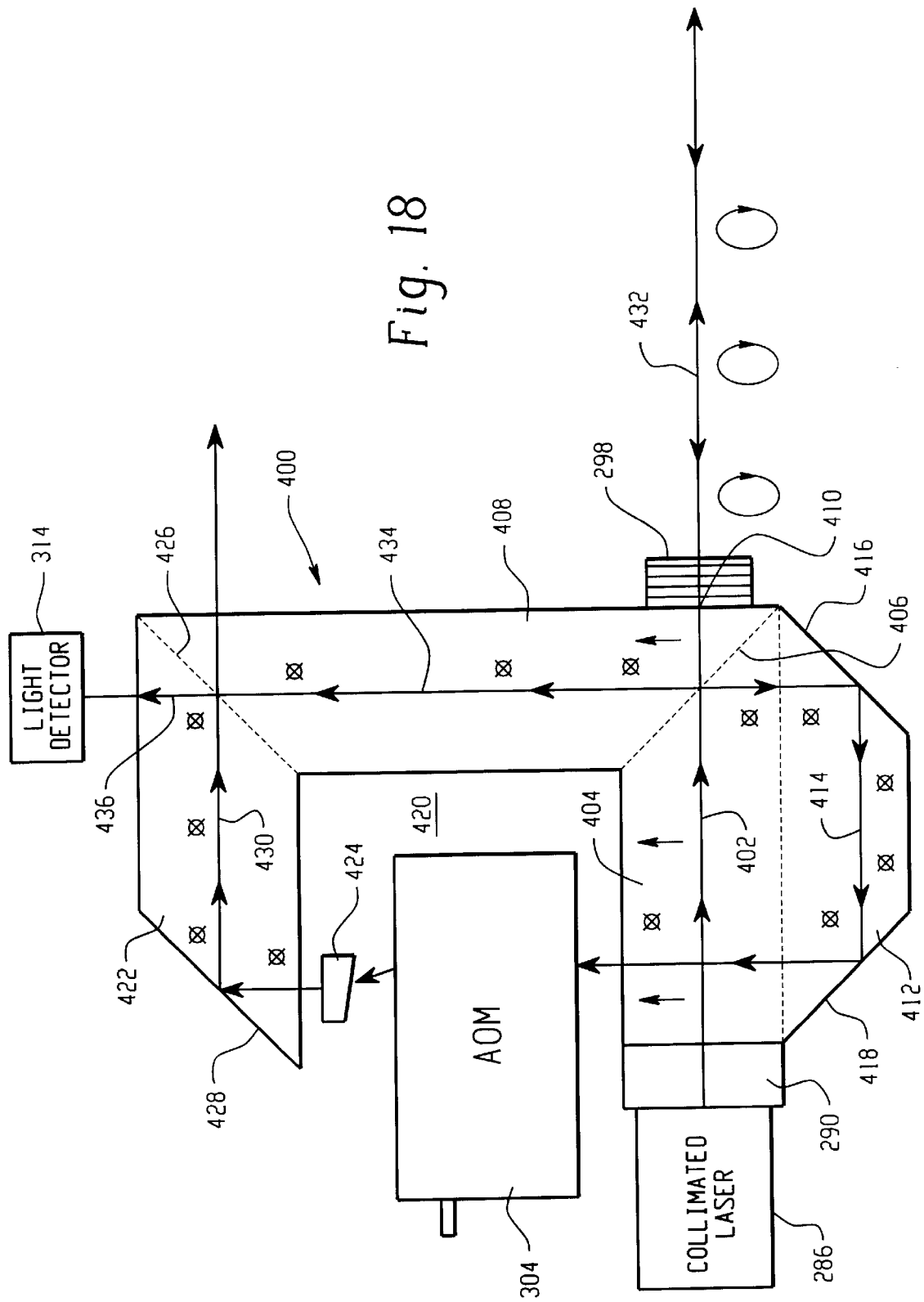
FIG. 18 is a sketch of an alternate block arrangement of optical elements of a LIDAR system.

An alternate embodiment of a block arrangement 400 for the LIDAR optical elements 282 is shown in the illustration of FIG. 18. Referring to FIG. 18, the laser source 286 and optics 290 are secured to the block 400 at one side of a glass module 404 for generating a coherent beam of light which is guided along an optical path 402 through the module 404. A surface 406 of module 404 is cemented to a surface of another glass module 408 to form the beam splitter 294 in the path 402 of the coherent laser beam. Light of one polarization state of the coherent beam is passed through the beam splitter 294 and exits the block 400 at point 410 where the λ/4 plate 298 is secured. Light of another polarization state of the coherent beam is reflected from the beam splitter 294 into a dove prism glass module 412 which is cemented to the glass module 404. The dove prism 412 includes two polished surfaces 416 and 418 which reflect the reflected light from the beam splitter 294 along an optical path 414. The AOM 304 is disposed and secured in an opening or cavity 420 which is formed by the sides of the glass blocks 404, 408 and a third glass block 422. Light reflected from the polished surface 418 is passed through glass module 404 and into the AOM 304. A beam correction optical element 424 may be affixed to the exit end of the AOM 304 to compensate for or readjust the position and angle of the light beam exiting the AOM 304. A surface 426 of the glass module 422 is cemented to a like surface of the glass module 408 to form the beam splitter 308. One side 428 of the module 422 is polished to reflect the beam existing the beam correction element 424 along an optical path 430 to the beam splitter 308. The return beam along path 432 is converted to a linear polarization state by the plate 298 and passed to the beam splitter 294 wherein it is reflected along an optical path 434 through the module 408 to the beam splitter 308 to be combined with the beam from path 430. The combined beam is directed along an optical path 436 through module 422 to the light detector 314 which is secured to module 422.

Some or all of the glass modules of block 350 or block 400 may be secured together by cementing using an adhesive, preferably an ultraviolet cured optical adhesive, for example. Note that for both glass block embodiments, 350 and 400, the collimated light source 286 is secured to one side of the block and the exit point of the transmitted collimated light beam is at another side of the block. In addition, the alignment of the glass modules of each block 350 and 400 forms a direct line optical path between the collimated light source 286 and the exit point of the block. In addition, the light detector 314 of each block embodiment 350 and 400 is secured to a side of the block other than the side to which the laser source is secured. Still further, the optical paths of the transmitted and return coherent light beams are co-linear within the block.

The illustrations of FIGS. 17 and 18 also depict by symbols the various polarization states of the light beams as they are guided along their respective optical paths. For example, the circled X symbol represents light in a state or plane of linear polarization going into the page parallel to the optical path along which it is guided and the directional arrow symbol represents light in a state or plane of linear polarization going into the page perpendicular to the optical path along which it is guided, that is, at right angles to the circled X polarization state. Also, light in a circularly polarized state is depicted by an arrowed rotation symbol, the direction of rotation is depicted by the arrow. Knowledge of these polarization symbols will yield a better understanding of the operation of the optical elements of the exemplary block embodiments 350 and 400, which operation having been described in connection with the block diagram embodiment of FIG. 15 herein above.

In accordance with yet another aspect of the present invention, a LIDAR system having an embodiment similar to the embodiment described in connection with FIG. 15, for example, is operative to measure flow velocity in three axes of a predetermined coordinate system as will become more evident from the following description. A suitable embodiment of the 3-axis flow velocity determination elements is shown in the block diagram schematic of FIG. 19. Reference numerals of elements previously described for azimuth determination, scan position determination, display and processing for the embodiment depicted by the block diagram embodiment of FIG. 3 will remain the same for the embodiment of FIG. 19. Accordingly, these elements will operate structurally and functionally the same or similar to that described for the embodiment of FIG. 3 except that their use in the embodiment of FIG. 19 will be for flow velocity measurement and display. Those elements of the block diagram of FIG. 19 not previously described will now be described.

Figure 19:
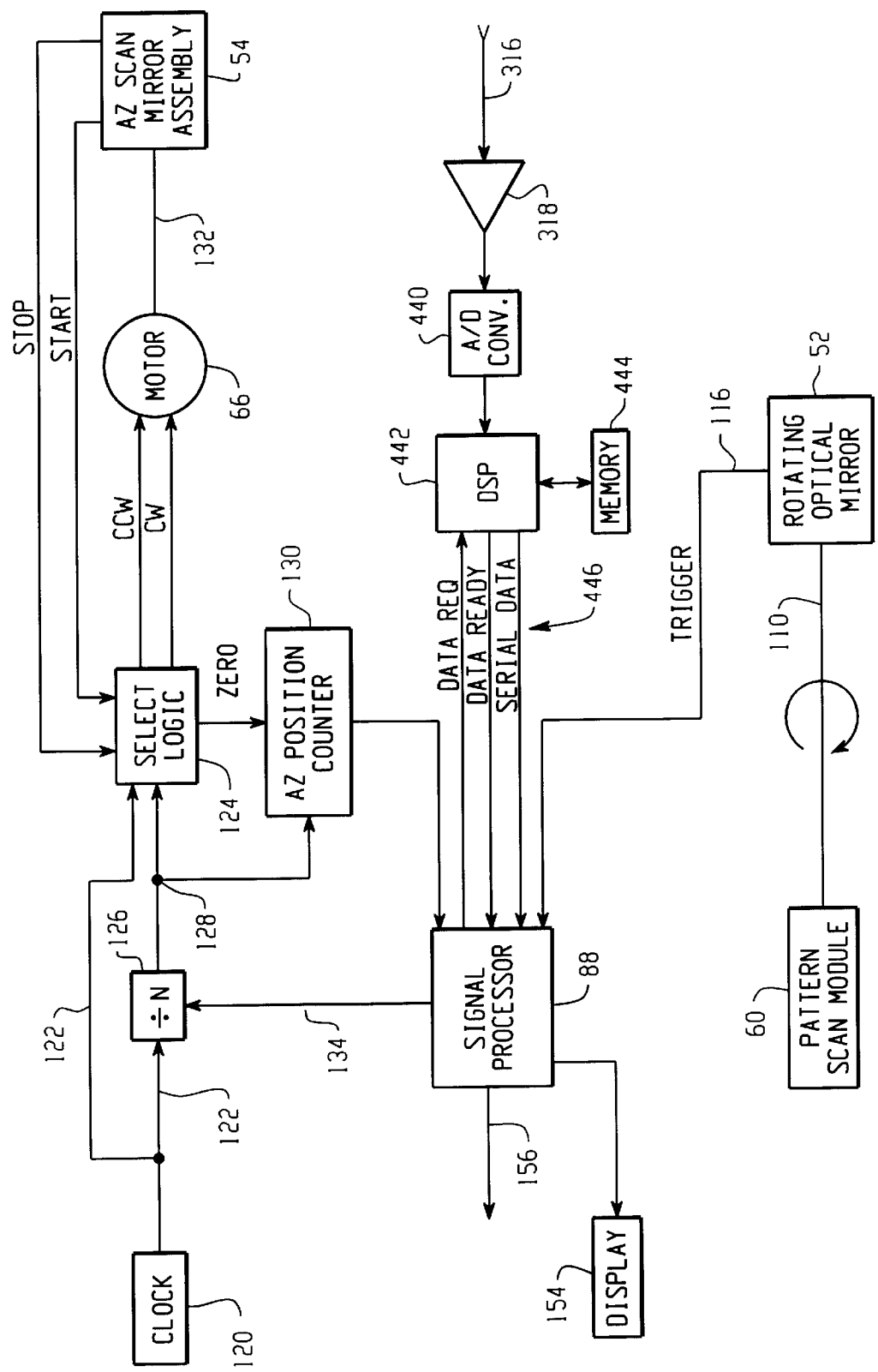
FIG. 19 is a block diagram schematic of a LIDAR system for determining 3-axis flow velocity suitable for embodying yet another aspect of the present invention.

Referring to FIG. 19, as previously described for the LIDAR system embodiment of FIG. 15, electrical return signals which are generated by the light detector 314 in response to light reflections from a particle along the predetermined scan pattern of the transmitted CW laser beam are passed over signal line 316 to the signal conditioning circuit 318 which may comprise conventional amplification and filtering circuits appropriate for conditioning the electrical signals. These electrical signals will be burst signals of Doppler frequency content lasting as long as a particle is within the width of the transmitted laser beam which will herein after be referred to as a "hit". After the signal conditioning of the circuitry 318, each burst of electrical signaling is sampled and digitized in an analog-to-digital (A/D) converter 440 in accordance with a predetermined sampled data rate which may be on the order of one-hundred and seventy-five million samples per second (175 MSPS), for example. The resultant data samples of each hit are provided to a digital signal processor (DSP) 442 for processing to determine the Doppler frequency associated therewith which is stored in a memory 444 thereof in the form of a data word for retrieval by the processor 88 as will be more fully described herein below. The processing of the digitized data samples of a burst or hit may take the form of a Fast Fourier Transform (FFT) algorithm or autocorrelator algorithm, for example, programmed into the DSP 442. Signal lines 446 coupled between processor 88 and DSP 442 provide for handshaking and data word transfers as will become evident from the following description. In the present embodiment, the processors 88 and 442 may be DSPs of the type manufactured by Texas Instruments bearing model numbers TMS320-C33 and TMS320-C6201, respectively, for example. It is understood that separating out and performing the system functions in two digital processors in the present embodiment offer design convenience and ease and that in an alternate embodiment, the functions of the DSP 442 may be programmed into a single DSP, like the processor 88, for example, which may perform by itself the functions of both processors 88 and 442. It is also possible that more than two processors may be used to embody the overall processing functions. Accordingly, this aspect of the present invention should not be limited to the number of processors, which will be determined based on the particular application of the invention.

FIGS. 20 and 20A illustrate functionally the processing involved for the determination of flow velocity in the 3-axes of the predetermined coordinate system. As has been described herein above, in one embodiment, the LIDAR system projects a laser beam 450 of a predetermined width in a conical pattern as shown in the illustration of FIG. 20. In FIG. 20, a plane 452 which is circular in cross-section (see FIG. 20A) is taken through the conical pattern at a range R from the LIDAR system where a hit 454 occurs. This plane or slice 452 is referred to herein as a scan circle brought about by the rotation of the optical element 52, for example. As described herein above in connection with the embodiment of FIG. 3, each time the optical element 52 is rotated past a reference point of the cyclic rotation, a trigger signal is generated. This reference point is referred to as the trigger position 456 of the scan circle. In the present embodiment, Y and Z quadrature axes of the predetermined coordinate system exist in the plane of the scan circle. More particularly, the Y-axis is along a line 458 drawn from the center 460 of the scan circle to the trigger position 456 and the Z-axis is along a line 462 drawn from the center 460 of the circle 452 90° counter-clockwise from the Y-axis. The X-axis of the coordinate system is along a line 464 drawn perpendicular to the scan circle plane 452 through the center 460 thereof. Accordingly, the X-axis is projected from the apex of the conical pattern as it exits the LIDAR system through the center 460 of the plane 452. Now that the ground-work has been laid, the concept of determining the flow velocity in three axes, Vsx, Vsy, and Vsz, may be described.

Each time a hit like at point 454, for example, is detected from the resulting electrical signal burst, a Doppler frequency is determined from the data samples of the associated burst. Knowing the wavelength of the laser beam, a one-axis flow velocity V1 for the hit may be determined from the corresponding Doppler frequency. In addition an angle al on the scan circle corresponding to the hit point 454 may be determined in relation to the Yaxis based on the elapsed time from the last trigger signal and the scan circle period, i.e. the total time to complete a scan of the circle pattern, which will become more evident from the description found herein below. The angle t that the hit makes with the X-axis remains substantially fixed for the circular scan pattern. Accordingly, a set of three equations may be established for three hits H1, H2 and H3 around the scan circle based on their single axis velocities V1, V2 and V3 and scan circle angles a1, a2 and a3 (angle t being fixed for the present embodiment) using trigonometric identities as shown by way of example in FIG. 20B. Referring to FIG. 20B, the top, middle and bottom equations may be each solved for flow velocities Vsx, Vsy and Vsz along the X-axis, Y-axis, and Z-axis, respectively. Also, knowing the azimuth position of the scan circle pattern from which the three hits are taken will establish a reference point in azimuth of the 3-axis flow velocity.

One complication arises by not knowing when a hit will occur, i.e. a hit may not be forced to occur. Rather each hit occurs naturally as a particle, such as dust or gaseous or vapor condensation, for example, crosses the width of the laser beam as it is guided along its predetermined pattern. Another complication arises as a result of the large number of hits likely to occur and the burden on the processor should all of the detected hits be processed. Thus, a selection criteria is desirable to determine which of the detected hits along the path of the scan pattern should be processed and which of the processed hits should be used to determine the 3-axis flow velocity. These selection criteria will be described in greater detail in the following paragraphs.

Figures 21, 21A:
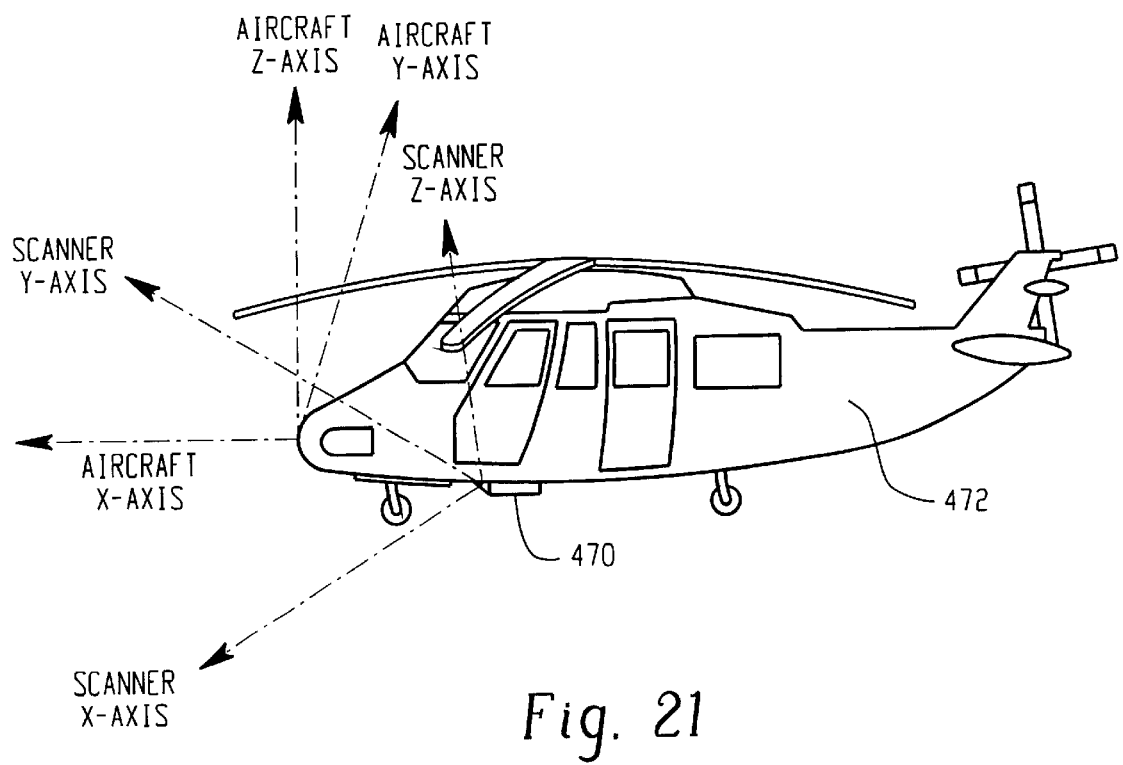
FIG. 21 is an illustration of an embodiment of the present invention mounted to an aircraft with it own coordinates.
FIG. 21A depicts a set of three equations suitable for use in transforming a 3-axis flow velocity from one coordinate system to another.

In addition, the predetermined coordinate system described above for determining the 3-axis flow velocity is referenced to the LIDAR system and may not be the same as the flight coordinate system of the aircraft on-board which LIDAR system is mounted. FIG. 21 exemplifies a LIDAR system 470 mounted on-board an aircraft 472, which, for this example, is a helicopter, with the two coordinate systems of the LIDAR and aircraft being not the same. That is, the LIDAR scanner 470 has its X, Y and Z coordinate system as described herein above and the aircraft 472 has its own X, Y and Z coordinate system. Since it may be important that the pilot or operator know the flow velocity based on the aircraft's coordinate system, the flow velocity of the LIDAR system Vsx, Vsy and Vsz may be converted to a flow velocity referenced to the aircraft's coordinate system Vax, Vay, and Vaz using a set of three equations shown by way of example in FIG. 21A. Transformation constants $a_{ij}$ may be formed into a 3×3 matrix, where i represents the column and j represents the row of the matrix. This 3×3 conversion matrix may operate on the LIDAR velocity vector which is expressed as a single column matrix comprising the velocity components of the LIDAR coordinate system to obtain the aircraft's velocity vector which is also expressed as a single column matrix comprising the velocity components of the aircraft's coordinate system.

Figure 22:
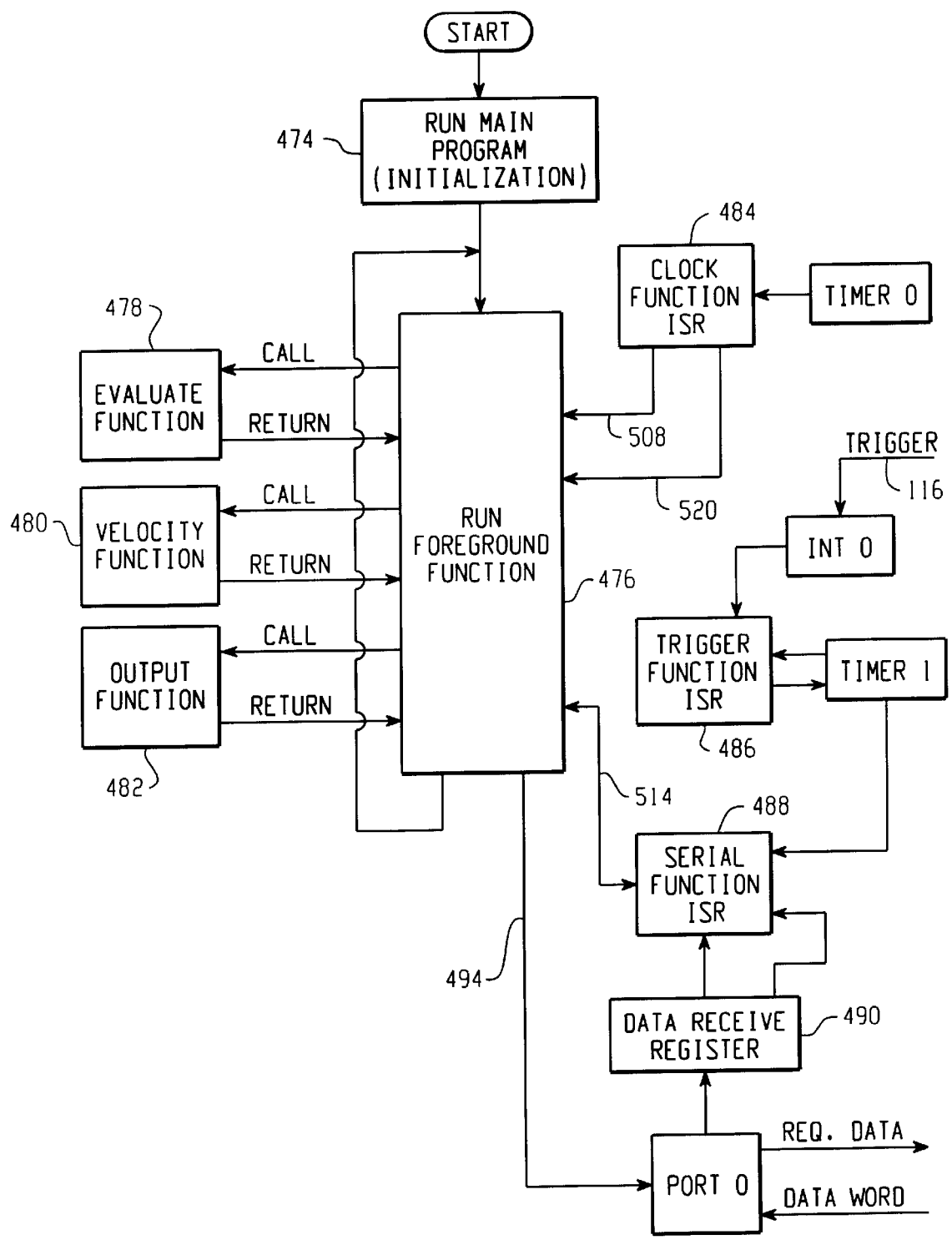
FIG. 22 is an exemplary program organization for use in programming a processor for determining a 3-axis flow velocity measurement.
Figure 23:
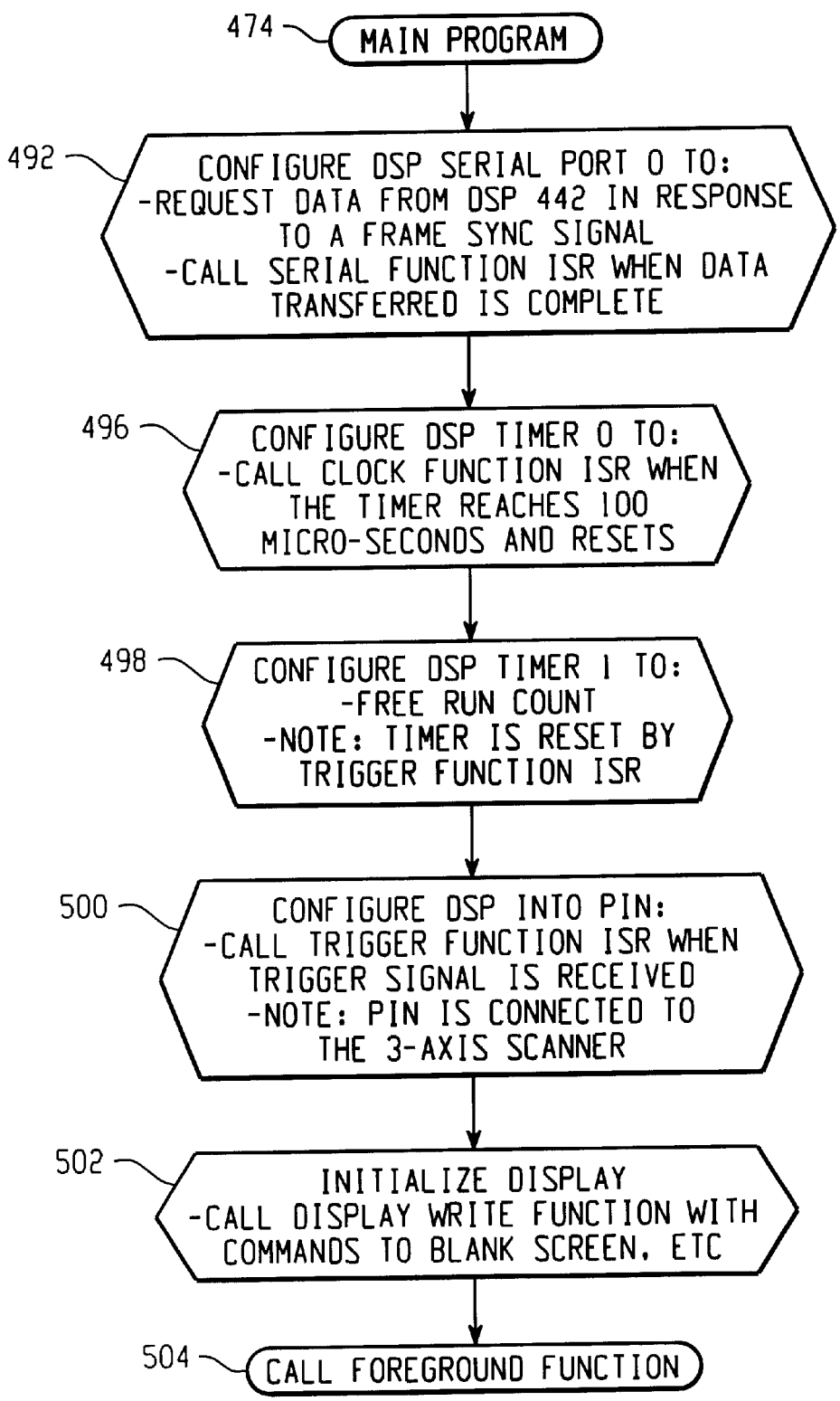
FIG. 23 is an exemplary software flow diagram of a main program suitable for use in the program organization of FIG. 22.

An exemplary program flow organization for programming the processor 88 to determine 3-axis flow velocity measurements is shown by the block diagram of FIG. 22. Referring to FIG. 22, upon turning on processor 88, a main program, which will described more fully in connection with the flow diagram of FIG. 23, is run to initialize the processor in block 474. Next, the processor enters a foreground program in block 476 which will be more fully described in connection with the flow diagram of FIG. 24. The foreground program 476 is executed continuously to call various other programs like an evaluate function program 478 (see FIG. 28), a velocity function program 480 (see FIG. 29), and an output function program 482 (see FIG. 30) based on a plurality of interrupt service routines (ISRs), like a clock function ISR 484 (see FIG. 25), a trigger function ISR 486 (see FIG. 26), and a serial function ISR 488 (see FIG. 27). In the present program organizational example, that which triggers the clock function ISR 484 is a Timer 0 which may be a designated register of processor 88 configured to count through a total count which represents a predetermined time period. Each time Timer 0 counts through its predetermined time period, which may be 100 microseconds, for example, the function clock ISR 484 is executed. Another register of processor 88 may be designated as Timer 1 and configured to start counting from zero each time the processor 88 receives the trigger signal 116 described in connection with the embodiment of FIG. 19 through a an interrupt port INT 0. The trigger signal 116 causes the trigger function ISR 486 to execute. Also, when a data word is received from DSP 442 via a serial Port 0, it will be stored in a register of the processor 88 designated as a data receive register 490 as will be more fully described below. Upon completion of the transfer of the data word into processor 88, the serial function ISR 488 is executed.

Referring to FIG. 23 which includes an exemplary software flow diagram of the main program 474, in block 492, the serial Port 0 is configured to be the port through which requests for data words are made to the DSP 442 in response to the generation of a Frame Sync Signal 494 by the foreground function routine 476 (see FIG. 22). Port 0 is also configured by block 492 to receive the data word from the DSP 442 and store it into register 490 and call serial function ISR 488 upon completion of the data word transfer. In block 496, Timer 0 is configured to call the clock function ISR 484 each time it counts through a count representative of 100 microseconds, for example. In block 498, Timer 1 is configured to count freely until reset by the trigger function ISR 486. In block 500, the INT 0 port is configured to call the trigger function ISR 486 each time a trigger signal 116 is received over a line coupled thereto from the scan pattern scanner 52 (see FIG. 19). In block 502, a display write function of processor 88 is initialized with certain commands well-known to all those skilled in the pertinent art to form text messages and control the screen of the display 154. Once the initialization tasks of the main program 474 are complete, the foreground function routine 476 is called by block 504.

Figure 24:
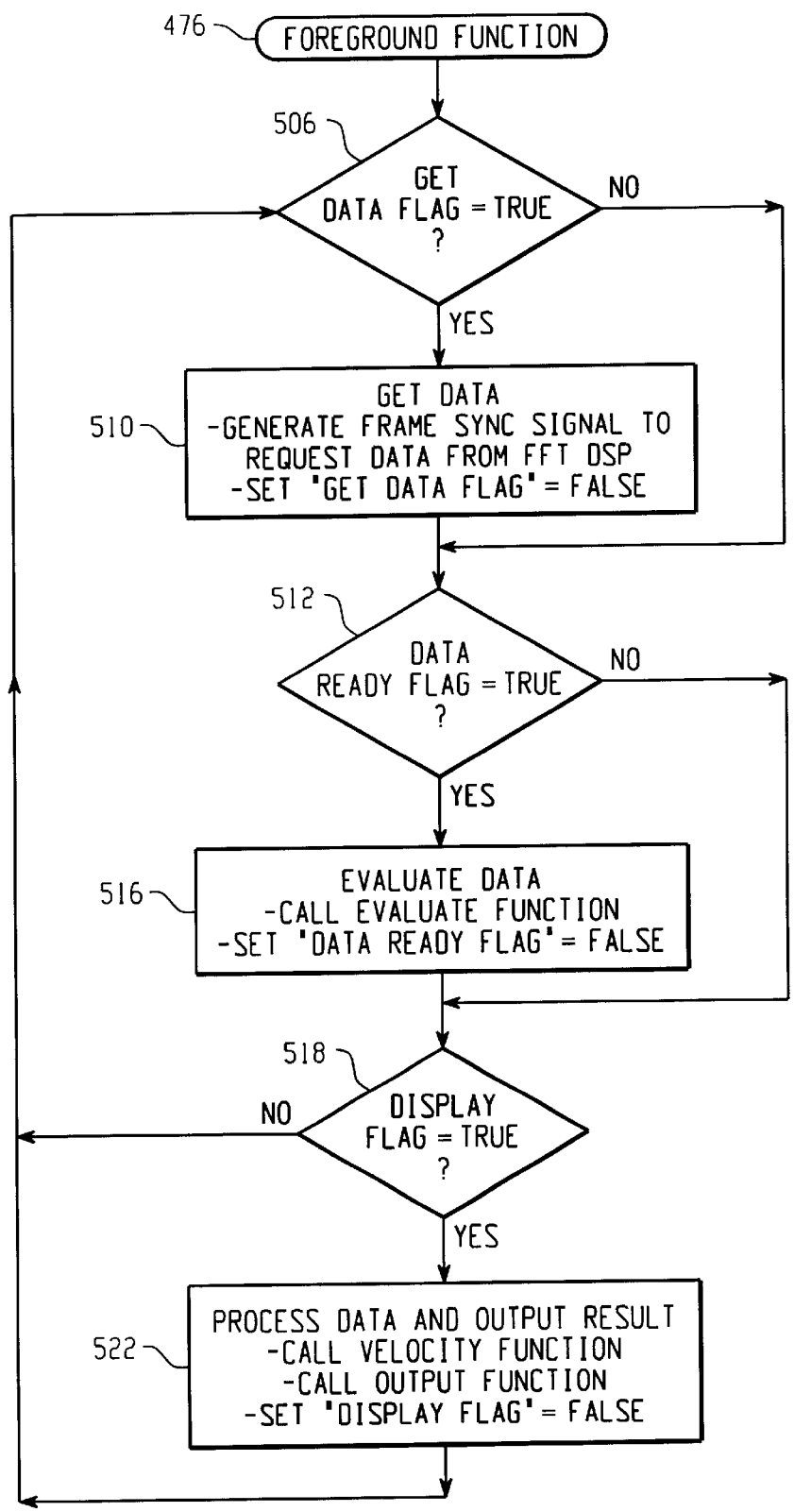
FIG. 24 is an exemplary software flow diagram of a foreground function routine suitable for use in the program organization of FIG. 22.

Referring to FIG. 24, in block 506, it is determined whether or not a "Get Data Flag" 508 is set true which is effected every 100 microseconds by the clock function ISR 484. If true, block 510 generates the Frame Sync Signal 494 to Port 0 to initiate the request for a data word from the DSP 442, sets the Get Data Flag 508 false, and executes decisional block 512. If the Get Data Flag 508 is determined to be false by block 506, the execution of block 510 is bypassed and decisional block 512 is executed. In block 512, it is determined whether or not a Data Ready Flag 514 is set true by the serial function ISR in response to the completion of the transfer of the data word into register 490. If true, the evaluate function routine 478 is called for execution by block 516. Upon completion of the tasks of the evaluate function 478, program execution is returned to 516 whereupon the Data Ready Flag 514 is set false and block 518 is executed. If the Data Ready Flag 514 is determined to be false by block 512, then block 516 is bypassed and decisional block 518 is executed. In block 518, it is determined whether or not a Display Flag 520 is set true by the clock function ISR 484. If true, block 522 calls the velocity function routine 480 for execution and when its tasks are complete, program execution is returned to block 522. Block 522 next calls the output function routine 482 for execution and when its tasks are complete, program execution returns to block 522 which next sets the Display Flag 520 false. Upon completion of the execution of block 522 or if the Display Flag 520 is determined to be false by block 518, program execution is returned to decisional block 506 and the program flow repeated. In this manner, the foreground function 476 is continuously executed.

Figure 25:
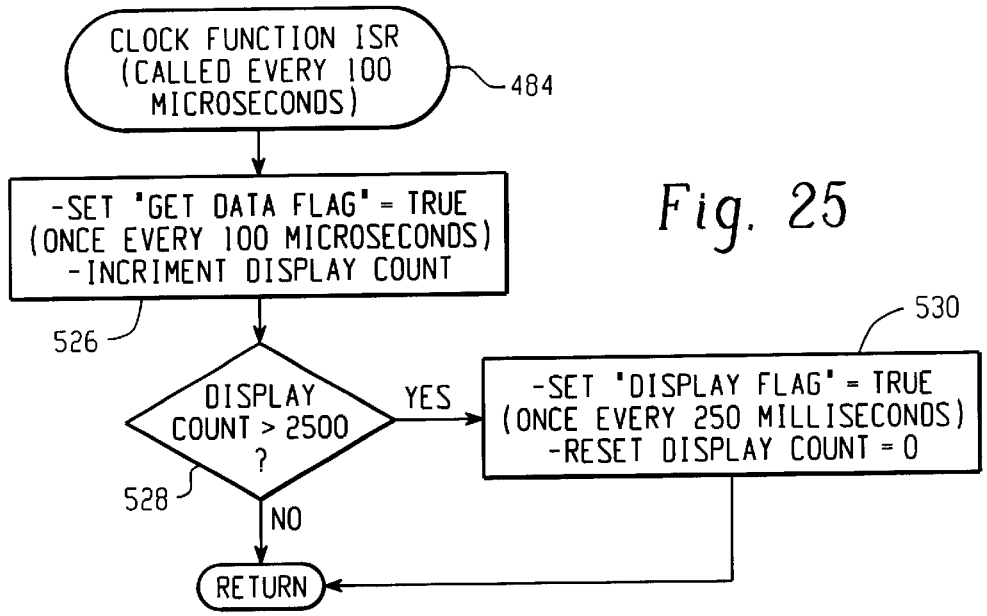
FIG. 25 is an exemplary software flow diagram of a clock function interrupt service routine (ISR) suitable for use in the program organization of FIG. 22.

Referring to the flow diagram of FIG. 25, each time the Timer 0 counts through its predetermined count, i.e. every 100 microseconds, program execution is interrupted and the clock function ISR 484 is called for execution. In block 526, the Get Data Flag is set true and a Display counter which may be a designated register of the processor 88 is incremented by one count. Next, in block 528, it is determined whether or not the count of the Display counter has reached a desired count which is indicative of an increment of time. For example, if the Display counter is incremented one count every 100 microseconds and the increment of time desired is 250 milliseconds, then the desired count would be 2500. Accordingly, the Display counter is a vehicle used to establish time increments of 250 milliseconds in the present embodiment. Thus, every 250 milliseconds as determined by block 528, block 530 sets the Display Flag true and resets the Display counter to zero. Thereafter, program execution returns to where it was interrupted and the clock function ISR 484 sits idle waiting for the next internal interrupt from Timer 0.

Figure 26:
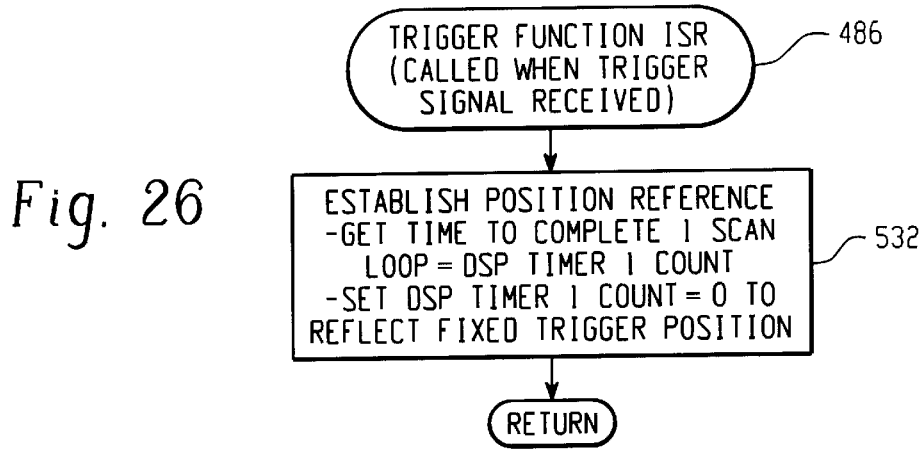
FIG. 26 is an exemplary software flow diagram of a trigger function ISR suitable for use in the program organization of FIG. 22.
Figure 27:
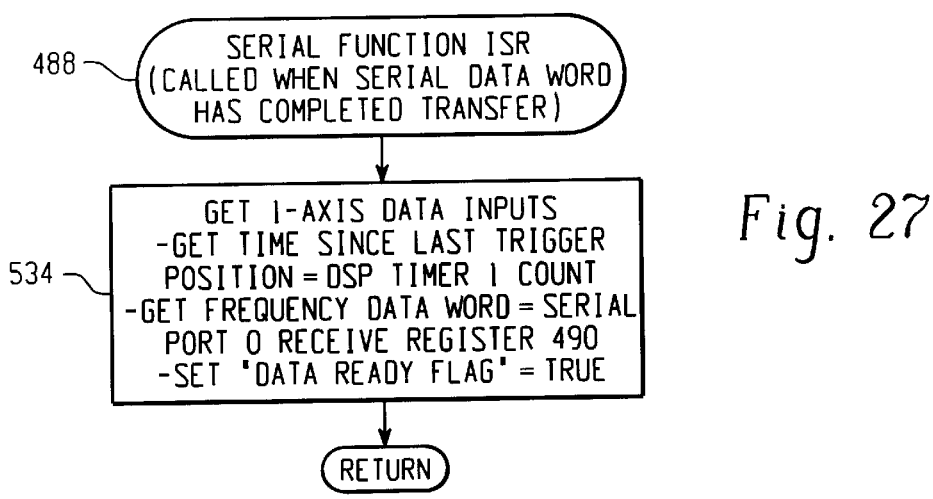
FIG. 27 is an exemplary software flow diagram of a serial function ISR suitable for use in the program organization of FIG. 22.

Referring to the flow diagram of FIG. 26, each time the trigger signal 116 is received by the interrupt port INT 0, program execution is interrupted and the trigger function ISR 486 is called for execution. In block 532, the count in Timer 1 which is representative of a period of one scan cycle is read and stored in a designated register of processor 88 and Timer 1 is reset to zero count. Thereafter, program execution continues from its interruption point and the trigger function ISR sits idle waiting for the next external interrupt signal 116. Referring to the flow diagram of FIG. 27, each time the data word transfer is completed, the serial finction ISR 488 is called for execution. In block 534, the data word of register 490 which is indicative of the Doppler frequency of the hit and the count of Timer 1 which is indicative of the corresponding scan circle angle al of the hit are read and stored in designated registers of the processor 88 and the Data Ready Flag is set true. Thereafter, program execution continues from its interruption point and the serial function ISR sits idle waiting for reception of the next internal interrupt signal.

In accordance with the foregoing described embodiment, the processor 88 requests and inputs a data word from the DSP 442 every 100 microseconds. Since it is unknown whether or not a hit has occurred during the most recent 100 microsecond interval, it is not known if the received data word from the DSP 442 for the current 100 microsecond interval is the same data word received for the previous 100 microsecond interval, i.e. no hit during the current interval. Thus, some indication should be provided to the processor 88 to indicate that at least one hit occurred during the current interval. In the present embodiment, this indication is provided in the form of one of the bits of the data word designated as "New Bit" being set to a "1" to indicate that the data word is representative of the Doppler frequency of a hit during the current interval. Accordingly, with each received data word from the DSP 442, an evaluation thereof is performed by the evaluate function 478, a flow diagram of which being shown in FIG. 28.

Figure 28:
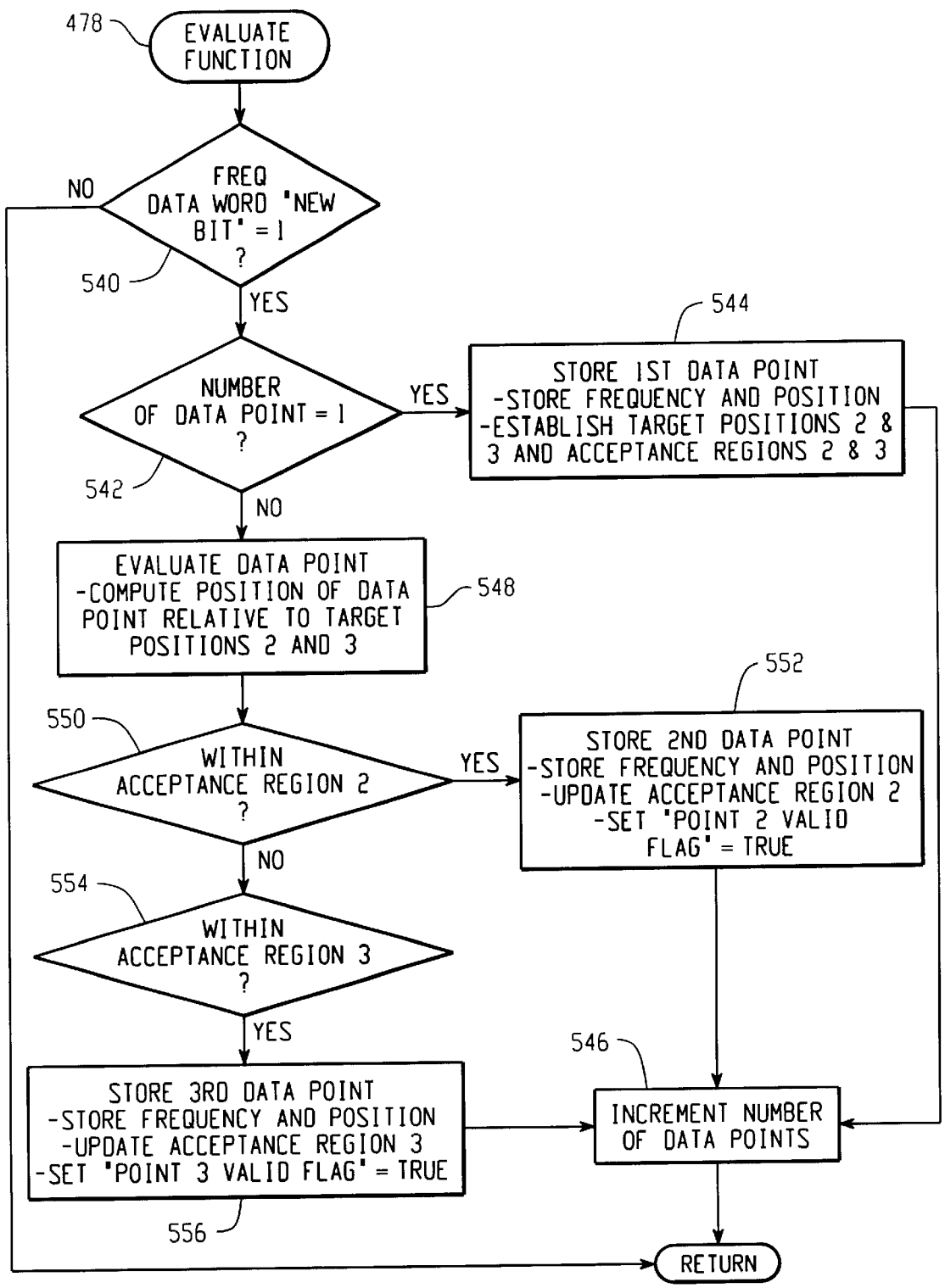
FIG. 28 is an exemplary software flow diagram of an evaluate function routine suitable for use in the program organization of FIG. 22.

Referring to the flow diagram of FIG. 28, in block 540, it is determined whether or not New Bit is set to a "1" in the received data word. If not, program execution of the evaluate function routine 478 is aborted and execution is returned to block 516 of the foreground routine 476. Otherwise, it is next determined in block 542 if the new data word is the first hit or data point for the current evaluation period. If so, in block 544, the data word (Doppler frequency) and angular position of the first hit or data point is stored and designated as belonging to the first data point. Also, in block 544, and target positions for the 2nd and 3rd hits along with acceptance regions therefor are established. In the present embodiment, the target positions for the 2nd and 3rd hits may be approximately 120° and 240°, respectively, in relation to the position of the first data point and the acceptance regions of each may be on the order of ±60°, for example. Then, in block 546, a data point counter of processor 88 having a count indicative of the number of data points received for the present evaluation period is incremented by one. Program execution is then returned to block 516.

If, in block 542, it is determined that the most recent data point is not the first, then, in block 548, its angular position is determined from a ratio of the count of Timer 1 corresponding to the recent hit and the count representative of the period of the scan cycle. The angular position of a data point subsequent the first data point is subtracted from the angular position of the first data point. Next, in block 550, it is determined if the difference in angular position is within the target and acceptance region for the 2nd data point or 120° ±60°, for example. If so, in block 552, the data word (Doppler frequency) and its corresponding angular position are stored and designated as belonging to the 2nd data point. Also, in block 552, after each 2nd data point with an acceptable target and acceptance region is determined, the acceptance region is tightened. For example, after the first 2nd data point, the acceptance region may be set to ±50°, and after the second 2nd data point, the acceptance region may be set to ±40°, and so on until no more 2nd data points fall within the region. This evaluation process ensures that only the closest 2nd data point to the target of 120°, for example, will be used in the determination of the 3-axis flow velocity. Further, in block 552, a "Point 2 Valid Flag" is set true to indicate that a 2nd data point is found valid for processing. If it is determined that a subsequent data point to the first data point is found not to be within the target and acceptable regions set for the 2nd data point, then in blocks 554 and 556, the same processing as for blocks 550 and 552 is repeated for the 3rd data points to establish a 3rd data point within the closest acceptable region of the set target angle or 240°, for example, in relation to the first data point. After each execution of either block 552 or block 556, the data points counter is incremented by one in block 546 so that its total count is representative of the total number of data points evaluated for the current evaluation period which may be on the order of 250 msec., for example. In this manner, three data points are selected from all of the data points processed in each 250 msec. period and their respective angular positions are the closest to being 120° apart along the scan circle pattern.

Figure 29:
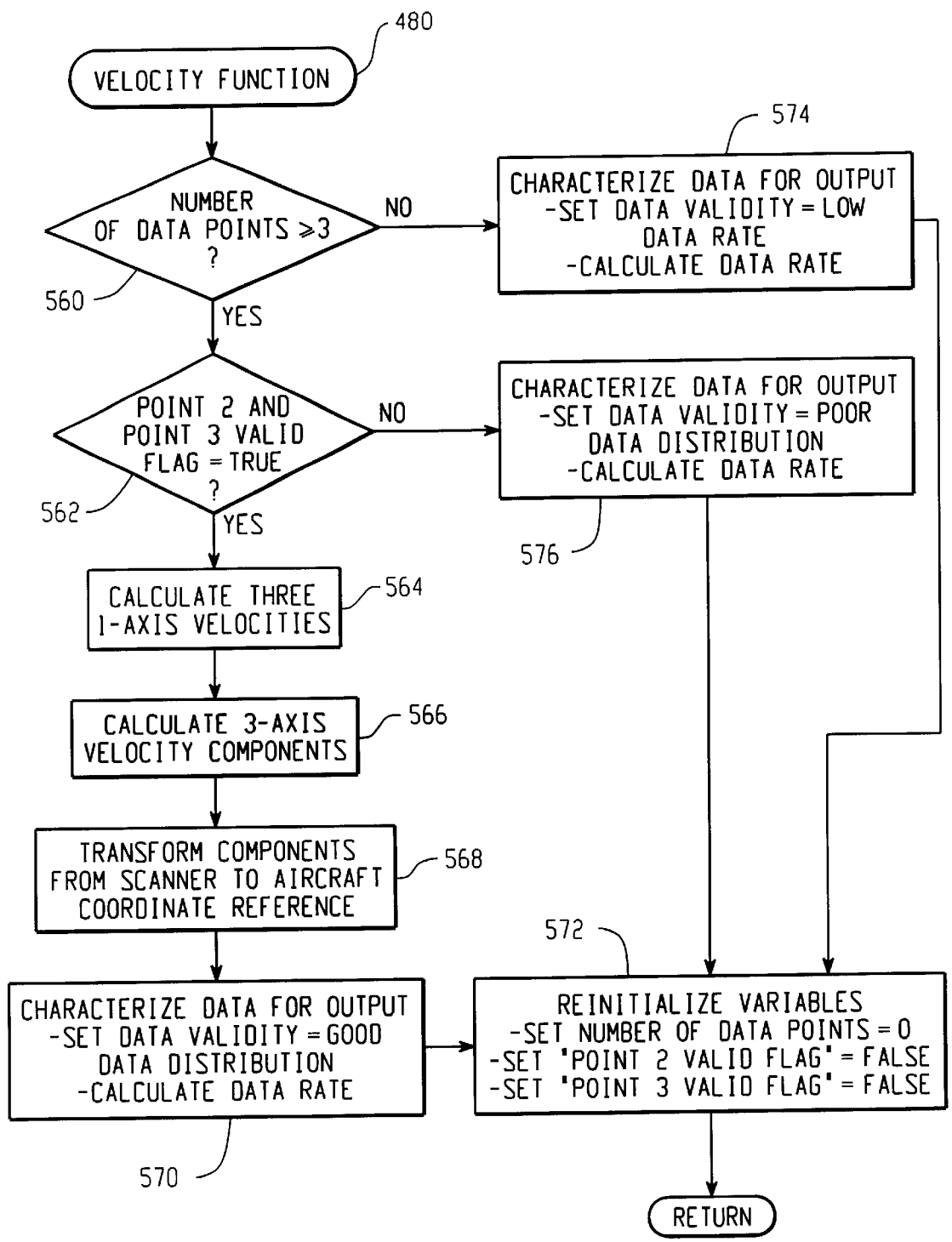
FIG. 29 is an exemplary software flow diagram of a velocity function routine suitable for use in the program organization of FIG. 22.

An example flow diagram of the velocity function routine 480 which is run every 250 msec. in the present embodiment is shown in FIG. 29. Referring to FIG. 29, in block 560, the data point counter is read to determine if at least three data points were processed in the preceding evaluation period. If so, in block 562, it is determined if the Valid Flags for the 2nd and 3rd data points are set true which is an indication that there are three data points which fall within the predetermined acceptance criteria of relative angular positions about the scan circle, i.e. the selected data points. If so, then three single axis velocities V1, V2 and V3 are determined in block 564 from the Doppler frequencies (data words) of the selected three data points. Thereafter, in block 566, a 3-axis flow velocity measurement is determined from the three single axis velocities V1, V2 and V3 and their respective angular positions a1, a2 and a3 (t being fixed for all 3 data points) in accordance with the exemplary equations of FIG. 20B, for example. The velocity components Vsx, Vsy and Vsz based on the predetermined coordinate system of the LIDAR may be converted to velocity components Vax, Vay and Vaz of the aircraft on-board which the LIDAR system is mounted in block 568. And, in block 570 the data used in the aforementioned calculations may be characterized in some manner. For example, a data validity flag may be set to good data, if the data point distribution in the acceptance regions is considered good, and a data rate may be calculated. Finally before returning execution to block 522 of the foreground function routine, all of the flags set by the evaluate function routine 478 in the previous evaluation period are reset in block 572 for the next evaluation period.

Now, if it is determined in block 560 that in the previous evaluation period less than three data points were processed, then, the data quality will be characterized by setting data validity to a low data rate, for example, and calculating the data rate in block 574. Also, if it is determined in block 562 that there are not three valid data points for processing based on the current acceptance criteria for data point distribution, then, in block 576, the data may be characterized by setting data validity to poor data distribution, for example, and calculating the data rate. After either block 574 or 576, program execution is passed to block 572 for resetting the flags as previously described.

Figure 30:
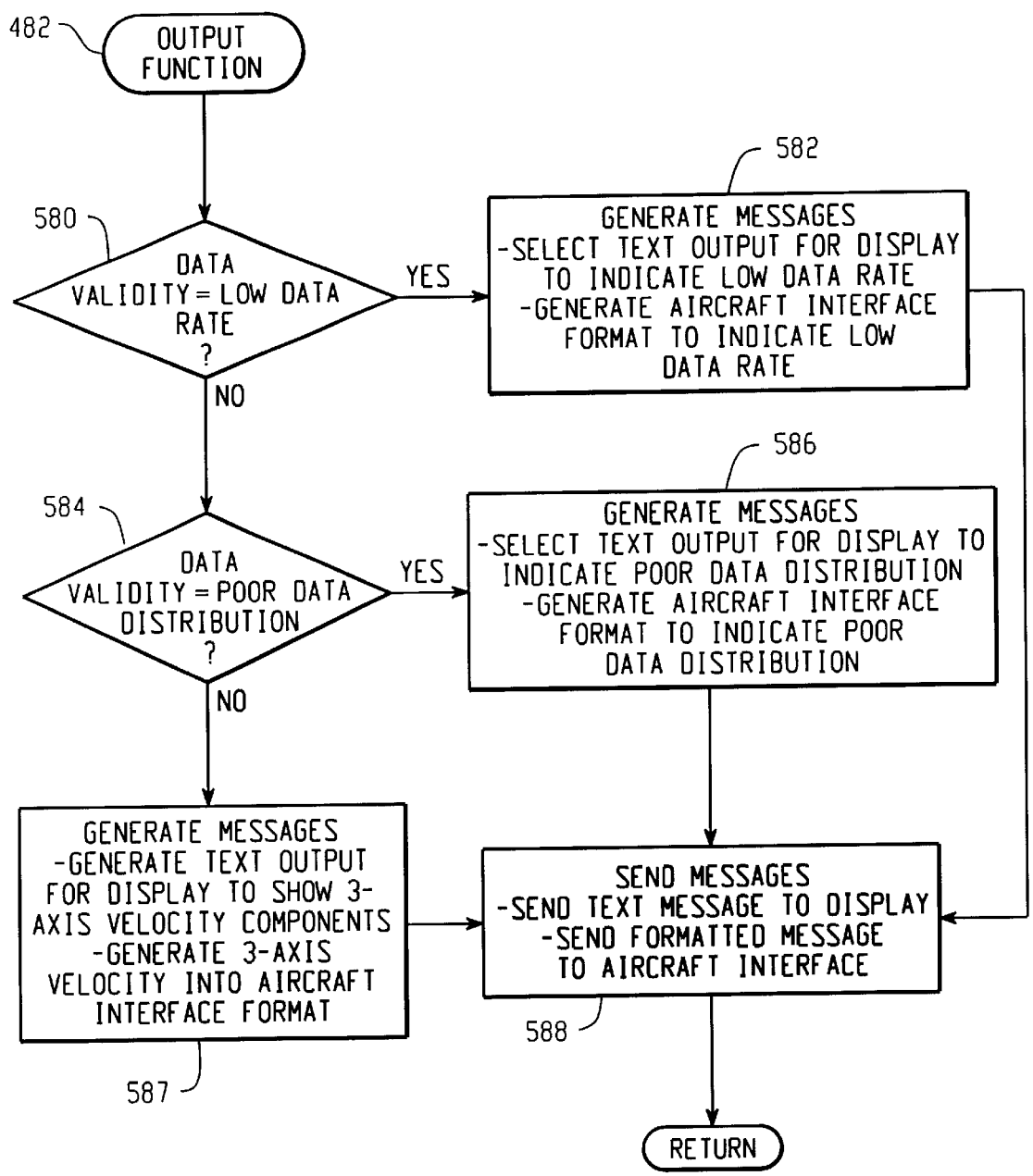
FIG. 30 is an exemplary software flow diagram of an output function routine suitable for use in the program organization of FIG. 22.

An exemplary flow diagram of an output function routine 482 suitable for use in describing the programmed processing of the processor 88 is shown in FIG. 30. This routine 482 is also called every 250 msec., for example, after the velocity function routine 480 is executed. Referring to FIG. 30, in block 480, it is determined if data validity was set at low data rate and if so, certain message text is selected for display on the screen of the display 154 in block 582. For example, a text message which displays an indication of Low Data Rate may be generated and sent to the display by blocks 582 and 588. Also, a signal which is formatted to indicate low data rate may be generated and provided to an interface to other aircraft avionics by blocks 582 and 588. Similarly, if it is determined in block 584 that data validity was set to poor data distribution, then an appropriate text message may be generated and sent to the display and formatted for distribution to other aircraft avionics to indicate this condition by blocks 586 and 588. If neither block 580 nor block 584 determine a true or affirmative condition, blocks 587 and 588 generate and send a text output or message indicative of the 3-axis flow velocity measurement to the display screen, and also, format the velocity measurement and send it to other aircraft avionics over signal line(s) interfaced with the processor 88, for example. After block 588 completes its tasks, program execution is returned to block 522 of the foreground function routine 476.

Figure 31:
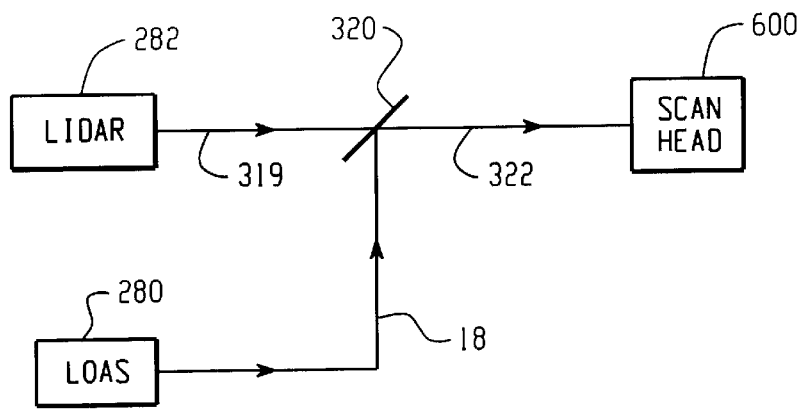
FIG. 31 is a block diagram schematic of a combined LOAS and LIDAR system wherein the scan optical elements are embodied in a scan head in accordance with another aspect of the present invention.
Figure 37:
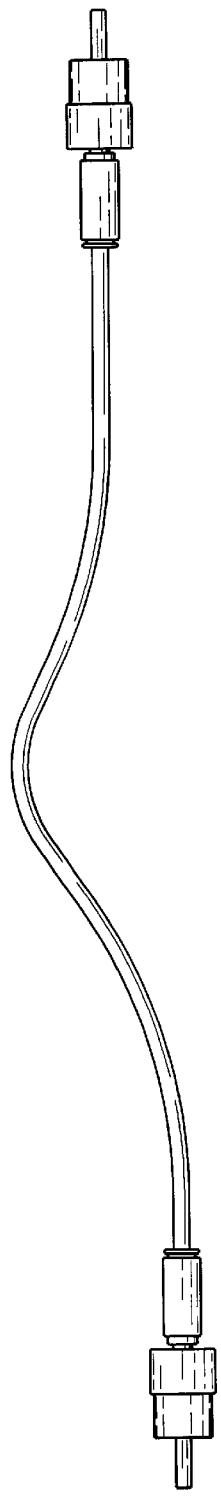
FIGS. 37 and 37A are illustrations of a fiber optic cable in isometric and cross-sectional view, respectively, which is suitable for use in the embodiments of FIGS. 31 and 34.
Figure 37A:
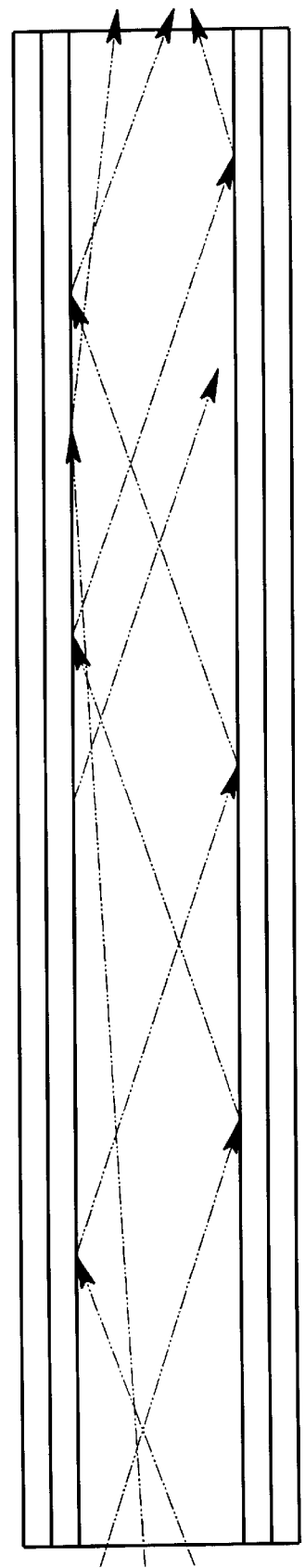

While an embodiment of a combined LOAS and LIDAR system has been described herein above in connection with the block diagram of FIG. 15, it is understood that from a practical perspective when applied to a moving vehicle like a helicopter or UAV, for example, the common optical elements 284 may be embodied in a scan head 600 remotely located from the optical elements of a single LOAS 280 or the combined LOAS 280 and LIDAR system 282 such as shown in the exemplary block diagram schematic of FIG. 31. Common elements between the embodiments of FIGS. 15 and 31 will have like reference numerals. In the embodiment of FIG. 31, the optical elements of 280 and 282 may be disposed within the vehicle and well supported and protected from the environment of the vehicle. Conventional fiber optic cabling, like that shown in isometric view in FIG. 37 and cross-sectional view in FIG. 37A, for example, may be used for the optical paths 18 and 319 leading to and aligned with the dichroic filter optical element 320 which was previously described for the embodiment of FIG. 15. A further fiber optic cable (see FIGS. 37 and 37A) provides for the optical path 322 from the dichroic filter 320 to the scan head 600 which includes the common optical elements 284. The fiber optic cabling for the optical path 322 may take a circuitous route within the vehicle to reach the scan head 600 which may be mounted to the external surface of the vehicle to permit the beam scan patterns to be projected out from the vehicle. More than one scan head may be used in the present embodiment as will become more evident from the description found herein below.

Figure 32:
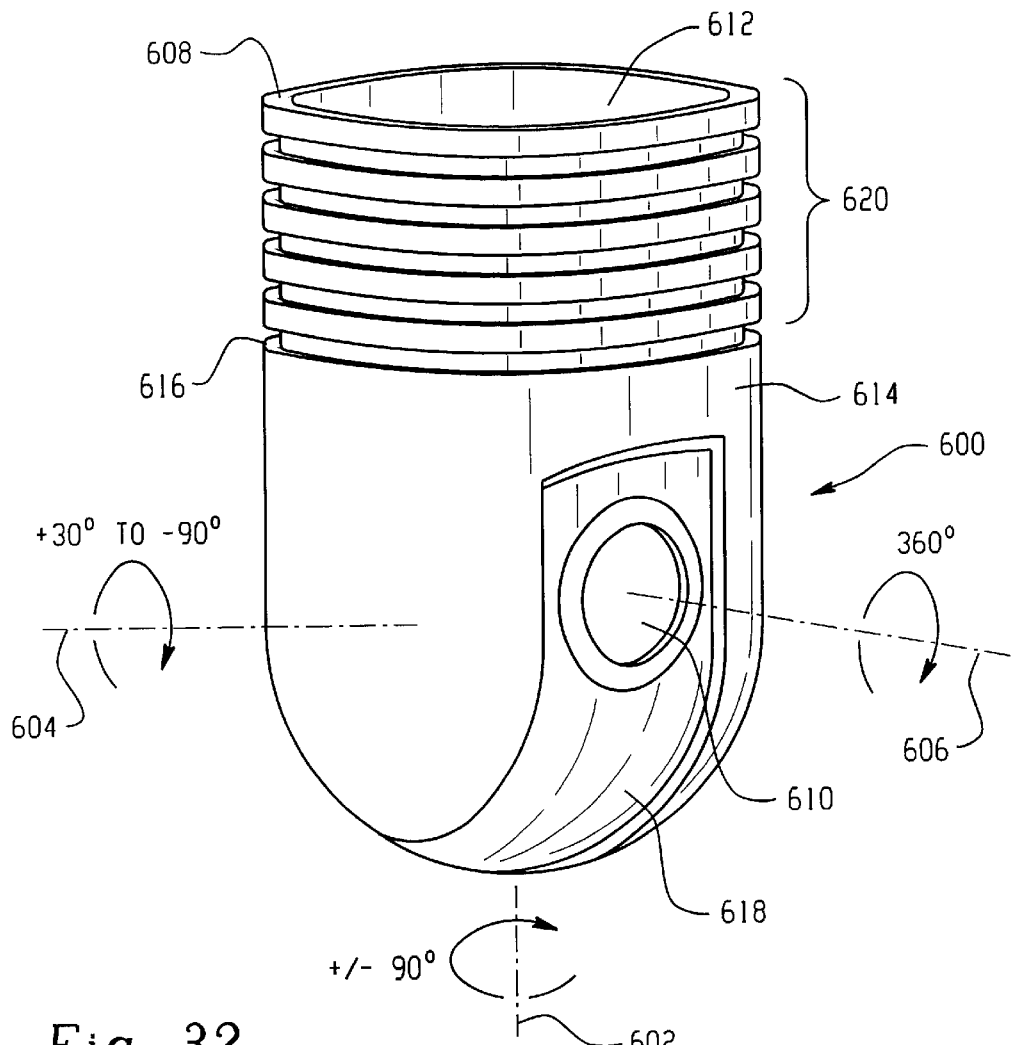
FIG. 32 is a sketch of an embodiment of a scan head suitable for use in the embodiment of FIG. 31.

A suitable embodiment of the scan head 600 is shown in the sketch of FIG. 32. This scan head controls movement of the optical beam scan patterns along three axes 602, 604 and 606. A top 608 of the scan head 600 may be mounted to a surface of the vehicle, like the front underbelly of a helicopter or UAV, for example, such as shown in the sketch of FIG. 21. A window area 610 of the scan head 600 through which the beam scans are emitted would be pointed in the direction of movement of the vehicle or flight path, if the vehicle is an aircraft. The fiber optic cable of the optical path 322 may be passed through a hole in the skin of the vehicle and into the scan head 600 through an opening 612 at the top 608 thereof. The optical elements within the scan head 600 which will be described in greater detail herein below cause the beams passed by the path 322 to be scanned 360° about the axis 606. A conventional motor assembly (not shown) within the scan head 600 controls movement of a lower portion 614 thereof ±90° about the axis 602 azimuthally with respect to the flight path of the vehicle. This movement occurs along a seam 616 between the top and bottom portions, 608 and 614, respectively, and effectively moves the axis 606 along with the lower portion 614 which projects the beam scan pattern through a helical pattern much the same as that described in connection with the example of FIG. 2.

Another portion 618 of the scan head 600 which includes the window area 610 and falls within the portion 614 moves azimuthally with the portion 614. Another conventional motor (not shown) disposed within the scan head 600 controls movement of the portion 618 about the axis 604 +30° to −90° in elevation, for example, with respect to the flight path or direction of the vehicle. This movement causes the axis 606 and scan patterns to move in elevation with the portion 618. In the present embodiment, the window area 610 of the portion 618 may be controlled to move upward and inside the portion 614 to protect it from the environment when not in use. The corrugated skin or surface in the area 620 at the top portion 608 acts as a heat sink to improve the transfer of heat away from the scan head 600 during operation thereof.

Figure 33:
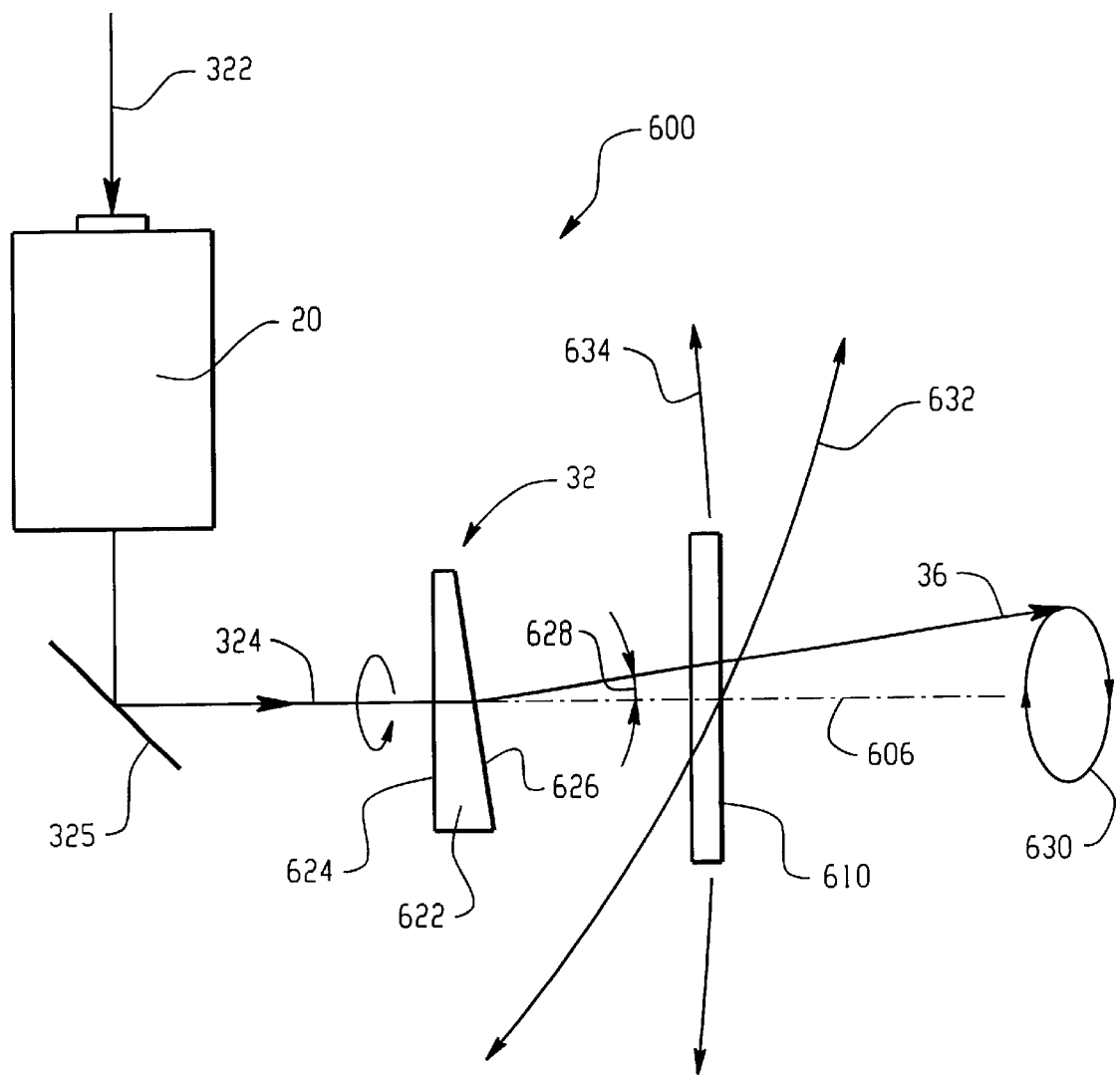
FIG. 33 is an illustration of the scan optical elements disposed in the scan head embodiment of FIG. 32.

A sketch exemplifying the common optical elements inside the scan head 600 is shown in FIG. 33. Referring to FIG. 33, the fiber optic cabling of the optical path 322 is aligned with the axis of the input aperture of the beam expander 20. The beam exiting the expander 20 may be reflected from a fold mirror 325 over an optical path 324 and passed into the rotating optical element 32. In the present embodiment, the rotating optical element 32 comprises a rotating optical wedge element 622 centered and rotated about the axis 606 and having a flat surface 624 at its input side and a surface inclined at a predetermined angle at its output side. It is understood that other elements may be used for the rotating optical element 32, like a transparent liquid crystal scanner, for example, without deviating from the broad principles of the present invention.

The beam conducted over path 324 is aligned with the axis 606 and passed from the input side to the output side of the wedge element 622. The light beam is refracted in its path through the wedge element 622 and exits perpendicular to the inclined output surface 626 thereof. This refraction of the light beam causes it to exit the scan head 600 as beam 36 through the window area 610 at an angle 628 to the axis 606. Accordingly, as the wedge optical element 622 is rotated 360° about the axis 606, the beam 36 is projected conically from the scan head 600 to form the scan pattern 630. Return beams will follow the same optical paths as their emitted beams as described herein above. The window area 610 may comprise a clear, flat, zero power optical element made of a material like glass, for example, so as not to interfere substantially with the scan pattern of the exiting beam 36. In the present embodiment, the wedge optical element 622 and window 610 are structurally coupled to move together along the azimuth path 632 and elevation path 634 to cause the optical axis 606 to move along therewith. In this manner, the scan pattern 630 is forced to move in azimuth and elevation with the portions 614 and 618 of the scan head 600.

Figure 34:
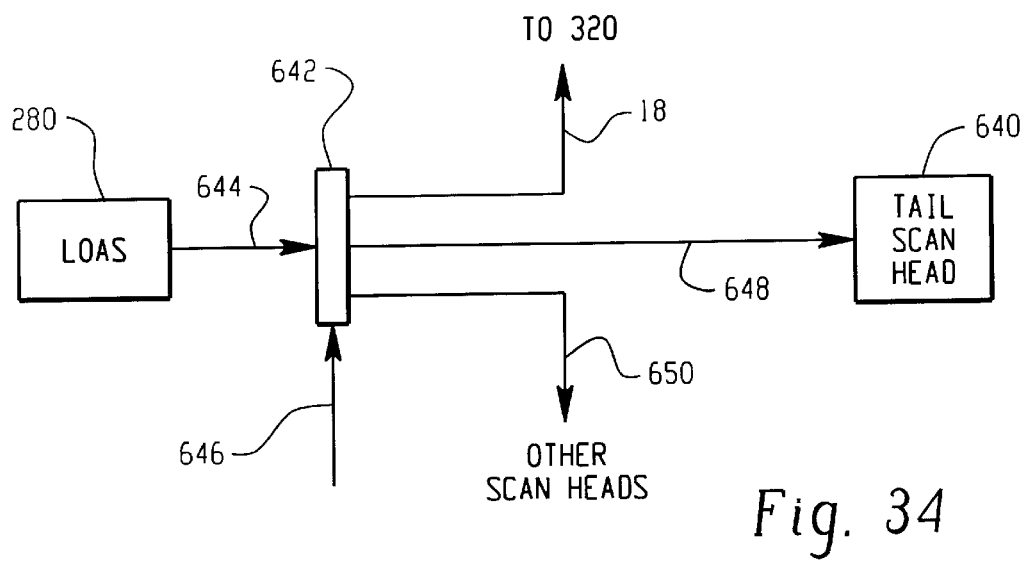
FIG. 34 is an illustration of a LOAS embodying multiple scan heads in accordance with another aspect of the present invention.

As noted above, the present invention may be embodied to include more than one scan head mounted at different locations on the vehicle. Depending on the application, some of the scan heads may utilize fewer optical elements and less scan angle than that described for the embodiment of FIGS. 32 and 33. In one application, the scan head 600 may be mounted at the front under belly of a helicopter or UAV as described herein above to detect objects and wind conditions at the front and sides of the aircraft, for example, and a second scan head 640 may be mounted at the tail section of the helicopter, for example, to detect objects at the rear and sides of the aircraft. A system suitable for embodying this application is shown in the block diagram schematic of FIG. 34. In this embodiment, an optical switch 642 is disposed in the output optical path 644 of the LOAS 280. The path 644 may be formed by a fiber optic cable (see FIGS. 37 and 37A). The optical switch 642 may be controlled by a signal 646 to direct the beam of path 644 to one of a plurality of optical paths. For example, the optical switch 642 may be controlled to direct the LOAS beam over the fiber optic cable of path 18 to the dichroic filter 320 and on to the scan head 600 as described herein above in connection with FIG. 31, or to direct the beam over an optical path 648, which may be formed by a fiber optic cable (see FIGS. 37 and 37A), to the tail scan head 640, or to direct the beam to other scan heads (not shown) mounted elsewhere on the vehicle over other optical paths 650. The return beam will follow substantially the same optical path as the directed beam.

Figure 35:
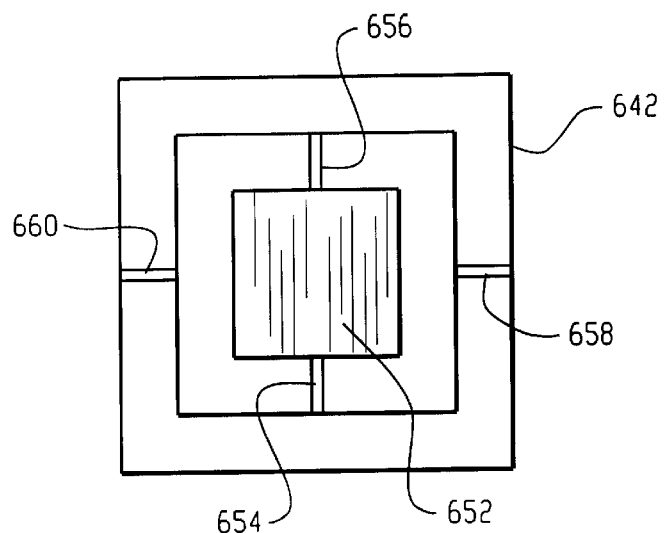
FIG. 35 is an illustration of an exempalry optical switch suitable for use in the embodiment of FIG. 34.

A suitable embodiment of the high-speed optical switch 642 is shown in the sketch of FIG. 35. In this embodiment, a flip mirrored element 652 is mounted with vertical hinges 654 and 656 to be controlled in a horizontal rotation thereabout and is mounted with horizontal hinges 658 and 660 to be controlled in a vertical rotation thereabout. The optical switch may be fabricated on a substrate using microelectromechanical system (MEMS) techniques with miniature motors coupled to the hinged mountings for controlling the movement of the mirrored element 652 to direct the beam 644 to one of the optical paths 18, 648, or 650 at any given time. Accordingly, the beam 644 and its returns may be multiplexed among the aforementioned paths by controlling the optical switch with the control signal 646 which positions the motors of the switch. It is understood that the embodiment of FIG. 35 is merely an exemplary embodiment of the optical switch 642 and that other embodiments may be used just as well. For example, a rotating disc having a portion that is substantially clear to permit passage of the beam and its returns along one of the paths 18, 648 or 650, and a portion that has a reflective coating to cause the beam and its returns to be reflected along another of such paths may be positioned by a motor controlled by the control signal 646 to direct the beam 644 and its returns to a designated optical path by passage or reflection thereof.

Figure 36:
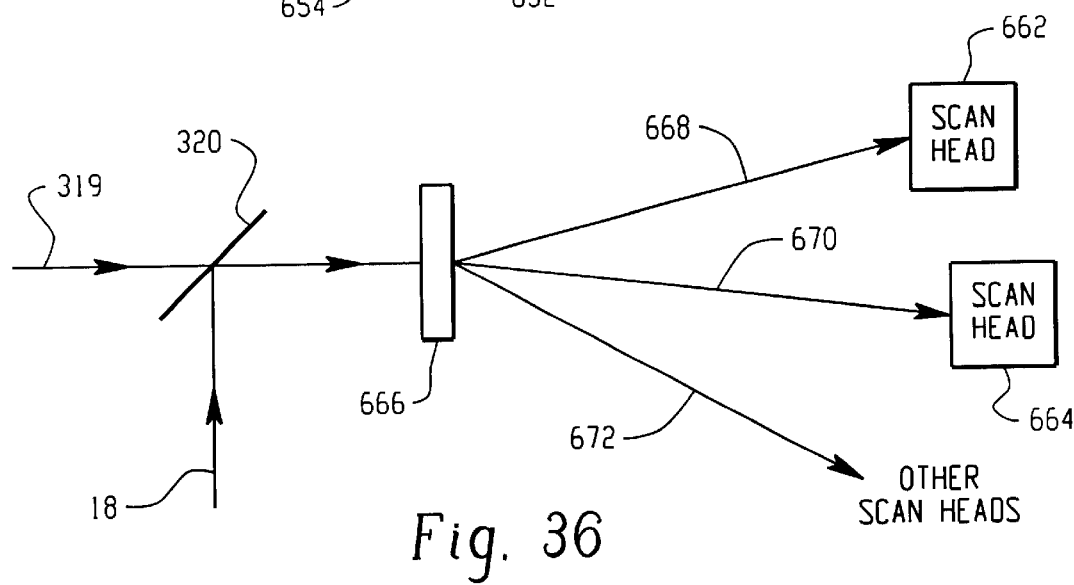
FIG. 36 is an illustration of a combined LOAS and LIDAR system embodying miltiple scan heads in accordance with another aspect of the present invention.

In yet another embodiment as shown by the block diagram schematic of FIG. 36, multiple scan heads may be mounted at various locations on the vehicle to detect objects and determine wind conditions at predetermined regions surrounding the scan head locations. For example, one scan head 662 may be located at one wing of an aircraft or side of a vehicle and another scan head 664 located at the other wing or side. The scan head 662 which may be mounted on the right wing or side with respect to the direction vector of the vehicle may be adjusted to scan azimuthally from 0° to +90° (0° being the direction vector of the vehicle) to cover the front right side region of the vehicle. Similarly, the scan head 664 which may be mounted on the left wing or side with respect to the direction vector of the vehicle may be adjusted to scan azimuthally from 0° to −90° to cover the front left side region of the vehicle. Other scan heads may be mounted at other locations like at the tail of the aircraft or rear of the vehicle, for example. All such scan heads are processed by a single LOAS or a combined LOAS 280 and LIDAR 282 system. For this reason, a high speed optical switch 666 is utilized and controlled to multiplex the emitted beams of the single or combined system and their returns among optical paths 668, 670 and 672 to and from the scan heads 662, 664 and others, respectively. In the present embodiment, the switch 666 may be disposed in line with the optical path of the LOAS and/or LIDAR beams exiting the dichroic filter 320 and may be the same or similar to the type of optical switch used for the embodiment of FIG. 35 described herein above.

While the aspects of the present invention have been described herein above in connection with a variety of embodiments, it is understood that these embodiments were merely provided by way of example and should not be considered limiting to the present invention in any way, shape or form. Rather, the present invention and all of the inventive aspects thereof should be construed in accordance with the recitation of the appended claims hereto.

What is claimed is:

1. A combined system of a laser obstacle awareness system (LOAS) and a light detection and ranging (LIDAR) system for obstacle detection and flow velocity measurement, said combined system comprising:

a LIDAR arrangement of optical elements for generating a first coherent beam of light at a first predetermined wavelength;

a LOAS arrangement of optical elements for generating a second coherent beam of light at a second predetermined wavelength;

a beam expander;

a dichroic filter optical element for directing said first and second coherent beams of light substantially on a first common optical path towards an aperture of said beam expander, said beam expander being aligned to accept and expand said first and second coherent beams and exit said expanded first and second coherent beams along a second common optical path at an output thereof;

at least one output optical element, said second common optical path being incident on said at least one output optical element which directs both of said expanded first and second coherent beams of light from said system, said at least one output optical element also for receiving reflections of said first and second coherent beams of light and directing said reflections to said beam expander wherein said beam reflections are collected;

said dichroic filter optical element for separating the collected light corresponding to said first coherent beam from the collected light corresponding to said second coherent beam, the separated light corresponding to said first coherent beam being directed back to said LIDAR arrangement of optical elements, and the separated light corresponding to said second coherent beam being directed back to said LOAS arrangement of optical elements;

a first light detector for converting light representative of the separated light corresponding to said first coherent beam to first electrical signals representative thereof;

a second light detector for converting light representative of the separated light corresponding to said second coherent beam to second electrical signals representative thereof; and processing means coupled to the first and second light detectors for detecting at least one object and determining flow velocity using said first and second electrical signals.

2. The combined system of claim 1 including beam converging optics disposed between the LIDAR arrangement of optical elements and the dichroic filter optical element for focusing the first coherent beam of light substantially at a spot in space a predetermined range from said system; and wherein said at least one output optical element for receiving reflections of said first coherent beam of light from at least one particle at said spot in space and directing said particle reflections to said beam expander wherein said beam reflections are collected.

3. The combined system of claim 2 wherein the beam converging optics is operative to vary the range of the spot in space on which the first coherent beam of light is focused.

4. The combined system of claim 1 wherein the at least one output optical element comprises at least one common rotationally operated optical element, said second common optical path being incident on said at least one common rotationally operated optical element which directs both of said expanded first and second coherent beams of light from said system, said expanded first coherent beam of light being directed with a first predetermined pattern and said expanded second coherent beam of light being directed with a second predetermined pattern.

5. The combined system of claim 4 wherein the at least one common rotationally operated optical element also for receiving reflections of said second coherent beam of light from at least one object along said second predetermined pattern and directing said beam reflections to the beam expander wherein said beam reflections are collected.

6. The combined system of claim 4 wherein the first and second patterns are substantially the same.

7. The combined system of claim 4 wherein the at least one common rotationally operated optical element also for directing the expanded first coherent beam of light with the first predetermined pattern and the expanded second coherent beam of light with the second predetermined pattern in an azimuthal scan.

8. The combined system of claim 7 wherein the expanded first coherent beam of light with the first predetermined pattern and the expanded second coherent beam of light with the second predetermined pattern are directed substantially to common azimuth positions in the azimuthal scan.

9. The combined system of claim 7 wherein the second light detector converts the light reflections of the second coherent beam to the second electrical signals representative thereof for use by processing means in detecting at least one object; and including means for determining substantially the azimuth position of the directed second coherent beam of light in the azimuthal scan thereof; and wherein processing means is coupled to said azimuth position determining means for determining a location of the at least one detected object in range and azimuth.

10. The combined system of claim 7 wherein the LIDAR arrangement of optical elements includes optical elements for producing heterodyned light reflections of the first coherent beam; wherein the first light detector converts said heterodyned light reflections to third electrical signals representative thereof for use by processing means in determining flow velocity; and including means for determining substantially the azimuth position of the directed first coherent beam of light in the azimuthal scan thereof; and wherein processing means is coupled to said azimuth position determining means for determining the flow velocity at different azimuth positions in the azimuthal scan.

11. The combined system of claim 4 wherein the at least one rotationally operated optical element includes:
   a first rotationally operated optical element for receiving the expanded first and second coherent beams of light and directing said received beams therefrom with their respectively corresponding first and second predetermined patterns; and
   a second rotationally operated optical element for receiving the first and second beams from said first rotationally operated optical element and directing said received beams with their predetermined patterns in an azimuthal scan.

12. The combined system of claim 11 wherein the first rotationally operated optical element comprises a mirrored optical element rotated at a predetermined nutation angle; and wherein said expanded first and second coherent beams of light being received and reflected from a surface of said mirrored optical element.

13. The combined system of claim 11 wherein the first rotationally operated optical element comprises a dichroic wedge optical element which directs light substantially of the first coherent beam from a one surface thereof and directs light substantially of the second coherent beam from another surface thereof.

14. The combined system of claim 11 wherein the first rotationally operated optical element comprises a dichroic wobble mirror optical element which reflects light substantially of the first coherent beam from one surface thereof and directs light substantially of the second coherent beam from another surface thereof.

15. The combined system of claim 11 wherein the first rotationally operated optical element comprises a mirrored optical element having one surface inclined at a predetermined angle relative to a surface opposite thereto, said optical element being rotated about an axis normal to said opposite surface; and wherein said expanded first and second beams being received and reflected from said inclined surface of said mirrored optical element.

16. The combined system of claim 11 wherein the first rotationally operated optical element comprises a Palmer mirror; and wherein said expanded first and second beams being received and reflected from a surface of said Palmer mirror.

17. The combined system of claim 11 wherein the second rotationally operated optical element comprises a mirrored optical element; and wherein the directed beams from said first rotationally operated optical element are received and reflected from a surface of said mirrored optical element.

18. The combined system of claim 11 wherein the second rotationally operated optical element is configured as a fold mirror.

19. The combined system of claim 11 wherein the first rotationally operated optical element is configured as a fold mirror.

20. The combined system of claim 11 wherein the first rotationally operated optical element is rotated at a rotational speed substantially greater than the rotational speed of the second rotationally operated optical element.

21. A block arrangement of optical elements for use as a transmitter/receiver for a light detection and ranging (LIDAR) system, said block arrangement comprising:
   a plurality of glass modules aligned together as a block to form a plurality of optical paths therein and secured together to maintain said alignment;
   a collimated light source for generating a coherent beam of light over at least one optical path in said block which guides said coherent beam of light to an exit point of said block;
   a light detector;
   said block for receiving a return coherent beam of light and configured to conduct said return coherent beam of light to said light detector over at least one other optical path formed in said block; and
   wherein said block includes an opening for securing an acousto-optic modulator (AOM).

22. The block arrangement of claim 21 including a quarter wavelength plate secured at said exit point of said block; wherein the generated beam of light exits the block through said quarter wavelength plate; and wherein the return beam of light is received by the block through said quarter wavelength plate.

23. The block arrangement of claim 22 wherein the quarter wavelength plate is cemented to said block at said exit point thereof.

24. The block arrangement of claim 21 wherein two of the glass modules of the plurality are cemented together to form a first beam splitter that is disposed in the optical path of the generated coherent beam of light for passing light in a first polarization state and reflecting light in a second polarization state.

25. The block arrangement of claim 24 wherein the first beam splitter is also disposed in the path of the return coherent beam of light.

26. The block arrangement of claim 25 wherein the AOM is disposed in the optical path of the light reflected from the first beam splitter.

27. The block arrangement of claim 26 wherein another two glass modules of the plurality are cemented together to form a second beam splitter that is disposed in the optical paths of the return coherent beam of light and light exiting the AOM, said second beam splitter configured to guide portions of both of the return coherent beam of light and light exiting the AOM to the light detector.

28. The block arrangement of claim 26 wherein one of the glass modules of the plurality comprises a dove prism which is cemented to at least one other glass module to form an optical path for guiding the light reflected from the first beam splitter to the AOM.

29. The block arrangement of claim 21 wherein the plurality of glass modules are secured together by cementing with an adhesive.

30. The block arrangement of claim 29 wherein the adhesive comprises an ultraviolet cured optical adhesive.

31. The block arrangement of claim 21 wherein at least one of the glass modules of the plurality includes at least one polished surface for forming one optical path of the block by internal light reflection.

32. The block arrangement of claim 21 wherein the collimated light source comprises a laser diode.

33. The block arrangement of claim 21 wherein the light detector comprises a photodiode.

34. The block arrangement of claim 21 wherein the collimated light source is secured to one side of the block and the exit point is at another side of the block.

35. The block arrangement of claim 21 wherein the collimated light source is secured to one side of the block and the light detector is secured to another side of the block.

36. The block arrangement of claim 21 including a beam correction optical element disposed in the optical path of light exiting the AOM.

37. The block arrangement of claim 21 wherein two glass modules of the plurality are cemented together to form a beam splitter that is disposed in the optical path of the return coherent beam of light for guiding a portion of the return coherent beam of light to the light detector.

38. The block arrangement of claim 21 wherein the alignment of glass modules forms a direct line optical path for the coherent beam of light between the collimated light source and the exit point of the block.

39. The block arrangement of claim 21 wherein the optical paths of the generated and return coherent beams of light are colinear within the block.

40. A combined system of a laser obstacle awareness system (LOAS) and a light detection and ranging (LIDAR) system for obstacle detection and flow velocity measurement, said combined system comprising:
   a LIDAR arrangement of optical elements for generating a first coherent beam of light at a first predetermined wavelength;
   a LOAS arrangement of optical elements for generating a second coherent beam of light at a second predetermined wavelength;
   a dichroic filter optical element for directing said first and second coherent beams of light substantially along a common optical path;
   a scan head including a beam expander for accepting and expanding light from said common optical path; and at least one output optical element, for directing both of said expanded first and second coherent beams of light from said scan head, said at least one output optical element also for receiving reflections of said first and second coherent beams of light and directing said reflections to said beam expander wherein said beam reflections are collected and returned to said dichroic filter optical element along said common optical path;
   said dichroic filter optical element for separating the collected light corresponding to said first coherent beam from the collected light corresponding to said second coherent beam, the separated light corresponding to said first coherent beam being directed back to said LIDAR arrangement of optical elements, and the separated light corresponding to said second coherent beam being directed back to said LOAS arrangement of optical elements;
   a first light detector for converting light representative of the separated light corresponding to said first coherent beam to first electrical signals representative thereof;
   a second light detector for converting light representative of the separated light corresponding to said second coherent beam to second electrical signals representative thereof; and
   processing means coupled to the first and second light detectors for detecting at least one object and determining flow velocity using said first and second electrical signals.

41. The combined system of claim 40 wherein the at least one output optical element of the scan head comprises at least one common rotationally operated optical element for directing both of said expanded first and second coherent beams of light from the scan head, said expanded first coherent beam of light being directed with a first predetermined pattern and said expanded second coherent beam of light being directed with a second predetermined pattern.

42. The combined system of claim 41 wherein the at least one common rotationally operated optical element also for receiving reflections of said second coherent beam of light from at least one object along said second predetermined pattern and directing said beam reflections to the beam expander wherein said beam reflections are collected and returned to said dichroic filter optical element along the common optical path.

43. The combined system of claim 41 wherein the first and second patterns are substantially the same.

44. The combined system of claim 41 wherein the at least one common rotationally operated optical element being rotated azimuthally by the scan head for directing both the expanded first coherent beam of light with the first predetermined pattern and the expanded second coherent beam of light with the second predetermined pattern in an azimuthal scan.

45. The combined system of claim 44 wherein the expanded first coherent beam of light with the first predetermined pattern and the expanded second coherent beam of light with the second predetermined pattern are directed substantially to common azimuth positions in the azimuthal scan.

46. The combined system of claim 41 wherein the at least one common rotationally operated optical element being rotated in elevation by the scan head for directing both the expanded first coherent beam of light with the first predetermined pattern and the expanded second coherent beam of light with the second predetermined pattern in an elevational scan.

47. The combined system of claim 44 wherein the expanded first coherent beam of light with the first predetermined pattern and the expanded second coherent beam of light with the second predetermined pattern are directed substantially to common azimuth positions in the elevational scan.

48. The combined system of claim 40 wherein the scan head is remotely located from the LOAS arrangement of optical elements and LIDAR arrangement of optical elements; and wherein the optical path to the remote scan head comprises a fiber optic cable.

49. The combined system of claim 40 including a plurality of scan heads; and an optical switch controllable to couple light between the common optical path and. a selected scan head of said plurality along a corresponding optical path.

50. The combined system claim 49 wherein each of the scan heads is remotely located from the LOAS arrangement of optical elements and LIDAR arrangement of optical elements; and wherein each of the corresponding optical paths of the remote scan heads comprises a fiber optic cable.

51. The combined system of claim 49 wherein the optical switch comprises a flip mirror operated to rotate about at least one axis.

52. The combined system of claim 49 wherein the optical switch is fabricated using MEMS techniques.

53. The combined system of claim 40 including a plurality of scan heads; and wherein light is directed between the common optical path and the plurality of scan heads along a corresponding plurality of optical paths.

54. A combined system of a laser obstacle awareness system (LOAS) and a light detection and ranging (LIDAR) system for obstacle detection and flow velocity measurement, said combined system comprising:
   a LIDAR arrangement of optical elements for generating a first coherent beam of light at a first predetermined wavelength;
   a LOAS arrangement of optical elements for generating a second coherent beam of light at a second predetermined wavelength;
   a dichroic filter optical element for directing said first and second coherent beams of light substantially along a common optical path;
   a scan head for accepting light from said common optical path; and including at least one output optical element, for directing both of said first and second coherent beams of light from said scan head, said at least one output optical element also for receiving reflections of said first and second coherent beams of light and directing said reflections to said common optical path wherein said beam reflections are collected and returned to said dichroic filter optical element;

said dichroic filter optical element for separating the collected light corresponding to said first coherent beam from the collected light corresponding to said second coherent beam, the separated light corresponding to said first coherent beam being directed back to said LIDAR arrangement of optical elements, and the separated light corresponding to said second coherent beam being directed back to said LOAS arrangement of optical elements;

a first light detector for converting light representative of the separated light corresponding to said first coherent beam to first electrical signals representative thereof;

a second light detector for converting light representative of the separated light corresponding to said second coherent beam to second electrical signals representative thereof; and processing means coupled to the first and second light detectors for detecting at least one object and determining flow velocity using said first and second electrical signals.

55. The combined system of claim 54 wherein the scan head is remotely located from the LOAS arrangement of optical elements and LIDAR arrangement of optical elements; and wherein the optical path to the remote scan head comprises a fiber optic cable.

56. The combined system of claim 56 including a plurality of scan heads; and an optical switch controllable to couple light between the common optical path and a selected scan head of said plurality along a corresponding optical path.

57. The combined system of claim 56 wherein each of the scan heads is remotely located from the LOAS arrangement of optical elements and LIDAR arrangement of optical elements; and wherein each of the corresponding optical paths of the remote scan heads comprises a fiber optic cable.

58. The combined system of claim 56 wherein the optical switch comprises a flip mirror operated to rotate about at least one axis.

59. The combined system of claim 56 wherein the optical switch is fabricated using MEMS techniques.

60. The combined system of claim 54 including a plurality of scan heads; and wherein light is directed between the common optical path and the plurality of scan heads along a corresponding plurality of optical paths.

61. A combined system of a laser obstacle awareness system (LOAS) and a light detection and ranging (LIDAR) system for obstacle detection and flow velocity measurement, said combined system comprising:

a LIDAR arrangement of optical elements for generating a first coherent beam of light at a first predetermined wavelength;

a LOAS arrangement of optical elements for generating a second coherent beam of light at a second predetermined wavelength;

a dichroic filter optical element for directing said first and second coherent beams of light substantially along a common optical path;

a plurality of scan heads;

an optical switch controllable to couple light between the common optical path and a selected scan head of said plurality along a corresponding optical path;

each scan head for accepting light from said optical switch; and including at least one output optical element for directing both of said first and second coherent beams of light from said scan head, said at least one output optical element also for receiving reflections of said first and second coherent beams of light and directing said reflections to said optical switch wherein said beam reflections are collected and returned to said dichroic filter optical element; and said dichroic filter optical element for separating the collected light corresponding to said first coherent beam from the collected light corresponding to said second coherent beam, the separated light corresponding to said first coherent beam being directed back to said LIDAR arrangement of optical elements for use in determining flow velocity, and the separated light corresponding to said second coherent beam being directed back to said LOAS arrangement of optical elements for use in detecting at least one object.

62. The combined system of claim 61 wherein each of the scan heads is remotely located from the LOAS arrangement of optical elements and LIDAR arrangement of optical elements; and wherein each of the corresponding optical paths of the remote scan heads comprises a fiber optic cable.

63. The combined system of claim 61 wherein the optical switch comprises a flip mirror operated to rotate about at least one axis.

64. The combined system of claim 61 wherein the optical switch is fabricated using MEMS techniques.

* * * * *